(12) United States Patent
Dolan et al.

(10) Patent No.: US 10,671,431 B1
(45) Date of Patent: Jun. 2, 2020

(54) EXTENT GROUP WORKLOAD FORECASTS

(71) Applicant: EMC IP Holding Company LLC, Hopkinton, MA (US)

(72) Inventors: Sean C. Dolan, Southborough, MA (US); Dana Naamad, Brookline, MA (US); Marik Marshak, Newton, MA (US); Hui Wang, Upton, MA (US); Xiaomei Liu, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1203 days.

(21) Appl. No.: 14/496,441

(22) Filed: Sep. 25, 2014

(51) Int. Cl.
*G06F 9/50* (2006.01)
*G06Q 10/06* (2012.01)

(52) U.S. Cl.
CPC ....... *G06F 9/5016* (2013.01); *G06Q 10/0633* (2013.01); *G06Q 10/06316* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 7,779,291 B2 | 8/2010 | Yoder et al. | |
| 7,949,637 B1 | 5/2011 | Burke | |
| 8,583,838 B1 | 11/2013 | Marshak et al. | |
| 8,868,798 B1 | 10/2014 | Marshak et al. | |
| 9,152,349 B2 | 10/2015 | Yochai | |
| 2004/0181370 A1* | 9/2004 | Froehlich | G06F 9/5083 702/187 |
| 2008/0059718 A1* | 3/2008 | Tajima | G06F 3/061 711/148 |
| 2012/0254513 A1* | 10/2012 | Uehara | G06F 3/0616 711/103 |
| 2015/0355837 A1* | 12/2015 | Bish | G06F 3/061 711/114 |

* cited by examiner

*Primary Examiner* — Charles J Choi
(74) *Attorney, Agent, or Firm* — Muirhead and Saturnelli, LLC

(57) ABSTRACT

Forecasting workload activity for data stored on a data storage device includes selecting at least one metric for measuring workload activity, providing at least one grouping of portions of the data according to a workload affinity determination provided for each of the portions at a subset of a plurality of time steps, where the workload affinity determination is based on each of the data portions in the group experiencing above-average workload activity during same ones of the subset of the plurality of time steps, the subset corresponding to at least one business cycle for accessing the data, and forecasting workload activity for all of the portions of data in the group based on forecasting workload activity for a subset of the data portions that is less than all of the data portions.

16 Claims, 43 Drawing Sheets

EXTENT GROUP WORKLOAD FORECASTS

BACKGROUND

Technical Field

This application generally relates to data storage and more particularly to forecasting workloads for stored data.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host systems in a computer system. A host system may perform a variety of data processing tasks and operations using the data storage system. For example, a host system may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

In some instances, it may be desirable to store data that is accessed relatively more frequently in storage tier(s) having faster performance. It is possible to use a current level of access frequency as a predictor of future access so that portions of the data that are currently being accessed relatively frequently are moved to storage tiers having faster performance on the assumption that the portions will maintain the same level of access frequency. However, this assumes that access frequency rates are relatively constant, which may not be the case. It is possible that data that is currently being accessed relatively infrequently may be accessed relatively frequently in the near future. It is desirable to be able to predict the increase in access frequency so that data can be moved to storage tier(s) having faster performance before the increase occurs.

SUMMARY OF THE INVENTION

According to the system described herein, forecasting workload activity for data stored on a data storage device includes selecting at least one metric for measuring workload activity, providing at least one grouping of portions of the data according to a workload affinity determination provided for each of the portions at a subset of a plurality of time steps, where the workload affinity determination is based on each of the data portions in the group experiencing above-average workload activity during same ones of the subset of the plurality of time steps, the subset corresponding to at least one business cycle for accessing the data, and forecasting workload activity for all of the portions of data in the group based on forecasting workload activity for a subset of the data portions that is less than all of the data portions. The at least one business cycle for accessing the data may correspond to particular days of the week. The at least one business cycle for accessing the data may correspond to a pre-planned event. There may be at least two business cycles and different groupings of data portions may be maintained for each of the business cycles. The at least one metric may be a read miss metric, a serial read metric, and/or a write metric. The at least one business cycle for accessing the data may correspond to detecting repeatable patterns in workload activity coherence of the at least one grouping of data. The workload activity coherence may be based on a mean weighted activity ratio of each data portion and the weighted variance of activity ratios of the data portions at each time step, where weighting used for each particular one of the data portions may be an activity workload for the particular one of the data portions at each time step.

According further to the system described herein, forecasting workload activity for data stored on a data storage device includes establishing a precursor/target relationship between a first subset of the data corresponding to a precursor and a second subset of the data corresponding to a target and forecasting an increase in workload of the target in response to a signature workload activity level of the precursor. The first and second subsets of data may be the same. Establishing a precursor/target relationship may be provided using pre-defined rules. The precursor may be a sequence of specific workload activity rates that occur in a specified order within a particular period of time. Forecasting workload activity for data stored on a data storage device may also include detecting the signature workload activity level of the precursor by dividing a time interval into a plurality of sub-intervals and determining a difference between measured workload activity levels at each of the subintervals and expected workload activity levels at each of the subintervals.

According further to the system described herein, a non-transitory computer readable medium contains software that forecasts workload activity for data stored on a data storage device. The software includes executable code that provides at least one grouping of portions of the data according to a workload affinity determination provided for each of the portions at a subset of a plurality of time steps, where the workload affinity determination is based on each of the data portions in the group experiencing above-average workload activity during same ones of the subset of the plurality of time steps, the subset corresponding to at least one business cycle for accessing the data and where the workload activity is based on at least one metric selected for measuring workload activity and includes executable code that forecasts workload activity for all of the portions of data in the group based on forecasting workload activity for a subset of the data portions that is less than all of the data portions. The at least one business cycle for accessing the data may correspond to particular days of the week. The at least one business cycle for accessing the data may correspond to a pre-planned event. There may be at least two business cycles and different groupings of data portions may be maintained for each of the business cycles. The at least one metric may be a read miss metric, a serial read metric, and/or a write metric. The at least one business cycle for accessing the data may correspond to detecting repeatable patterns in workload activity coherence of the at least one grouping of data. The workload activity coherence may be based on a mean weighted activity ratio of each data portion and the weighted variance of activity ratios of the data portions at each time step, where weighting used for each particular one of the data portions may be an activity workload for the particular one of the data portions at each time step.

According further to the system described herein, a non-transitory computer readable medium contains software that forecasts workload activity for data stored on a data storage device. The software includes executable code that establishes a precursor/target relationship between a first subset of the data corresponding to a precursor and a second subset of the data corresponding to a target and executable code that forecasts an increase in workload of the target in response to a signature workload activity level of the precursor. The first and second subsets of data may be the same. Establishing a precursor/target relationship may be provided using pre-defined rules. The precursor may be a sequence of specific workload activity rates that occur in a specified order within a particular period of time. The software may also include executable code that detects the signature workload activity level of the precursor by dividing a time interval into a plurality of sub-intervals and determining a difference between measured workload activity levels at each of the subintervals and expected workload activity levels at each of the subintervals.

The system described herein is scalable, may be used efficiently with both large and small numbers of data portions, and may be characterized as having computational and memory resource costs that are generally a linear function of the number of data portions.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
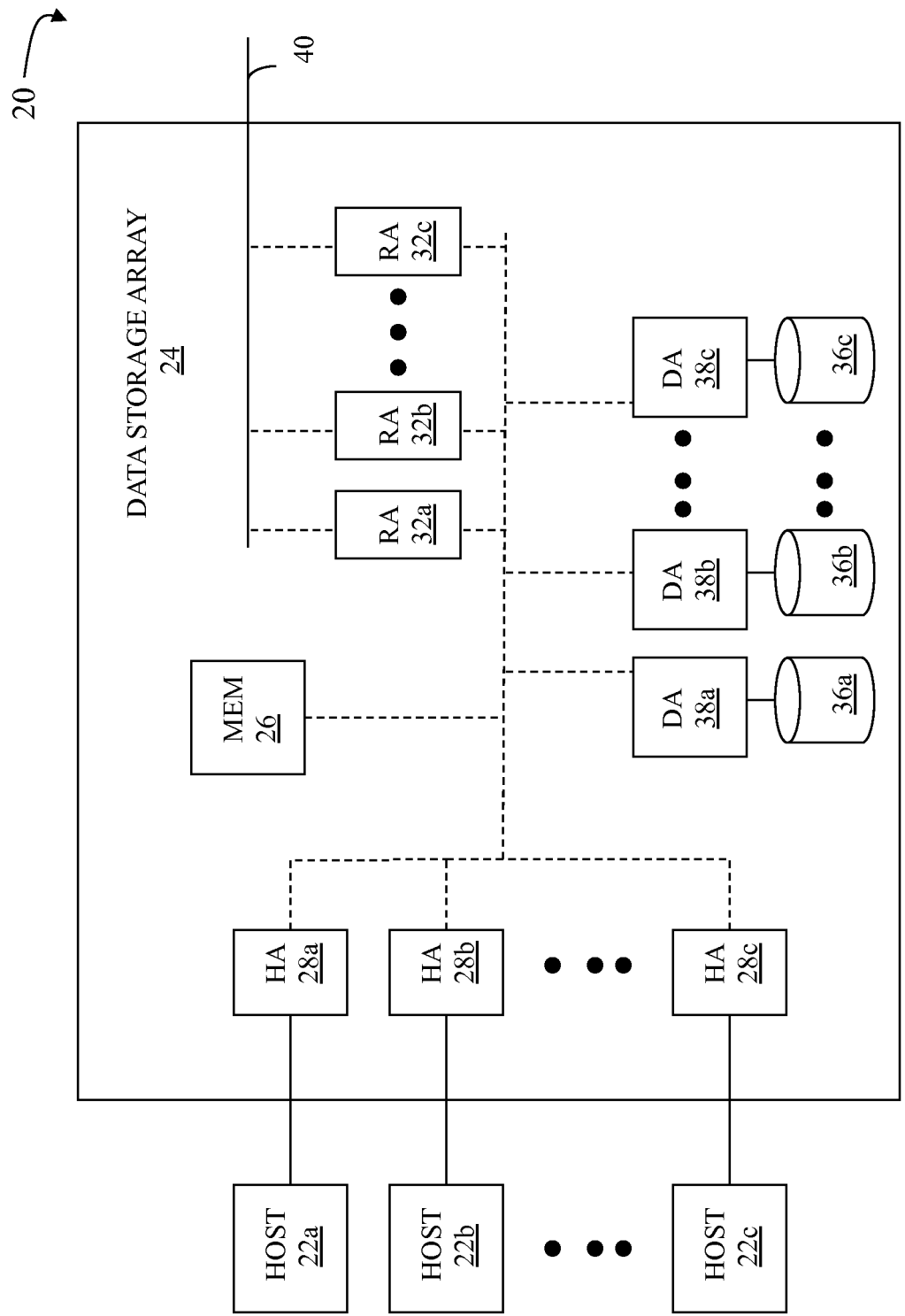
FIG. 1 shows a data storage system according to an embodiment of the system described herein.

Referring to FIG. 1, a diagram 20 shows a plurality of hosts 22a-22c coupled to a data storage array 24 that may be used in connection with an embodiment of the system described herein. Each of the hosts 22a-22c may all be located at the same physical site or may be located in different physical sites and may be coupled to the data storage array 24 using SCSI, Fibre Channel, iSCSI, etc. The data storage array 24 includes a memory 26 that facilitates operation of the storage array 24, as further described elsewhere herein. The data storage array 24 also includes a plurality of host adapters (HA's) 28a-28c that handle reading and writing of data between the hosts 22a-22c and the storage array 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage array 24 may be a Symmetrix storage device, a CLARiiON storage device and/or a VPLEX product produced by EMC Corporation of Hopkinton, Mass., although the system described herein may also operate in connection with any other suitable storage devices and products.

In an embodiment, the storage array 24 may include one or more Remote Data Facility (RDF) adapter units (RA's) 32a-32c. An RDF product produced by EMC Corporation, may be used to copy data from one storage array to another. For example, if a host writes data to a first storage array (e.g., a local storage array), it may be desirable to copy that data to a second storage array provided in a different location (e.g., a remote storage array). The RA's 32a-32c are coupled to an RDF link 40 and are similar to the HA's 28a-28c, but are used to transfer data between the storage array 24 and other storage arrays that are also coupled to the RDF link 40. The storage array 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The storage array 24 may also include one or more disks 36a-36c, each containing a different portion of data stored on the storage array 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage array 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage array 24 may be provided as a stand-alone device coupled to the hosts 22a-22c as shown in FIG. 1 or, alternatively, the storage array 24 may be part of, and/or otherwise coupled to, a storage area network (SAN) that may include a plurality of other storage arrays as well as switches, routers, network connections, etc., as further discussed elsewhere herein.

Figure 2:
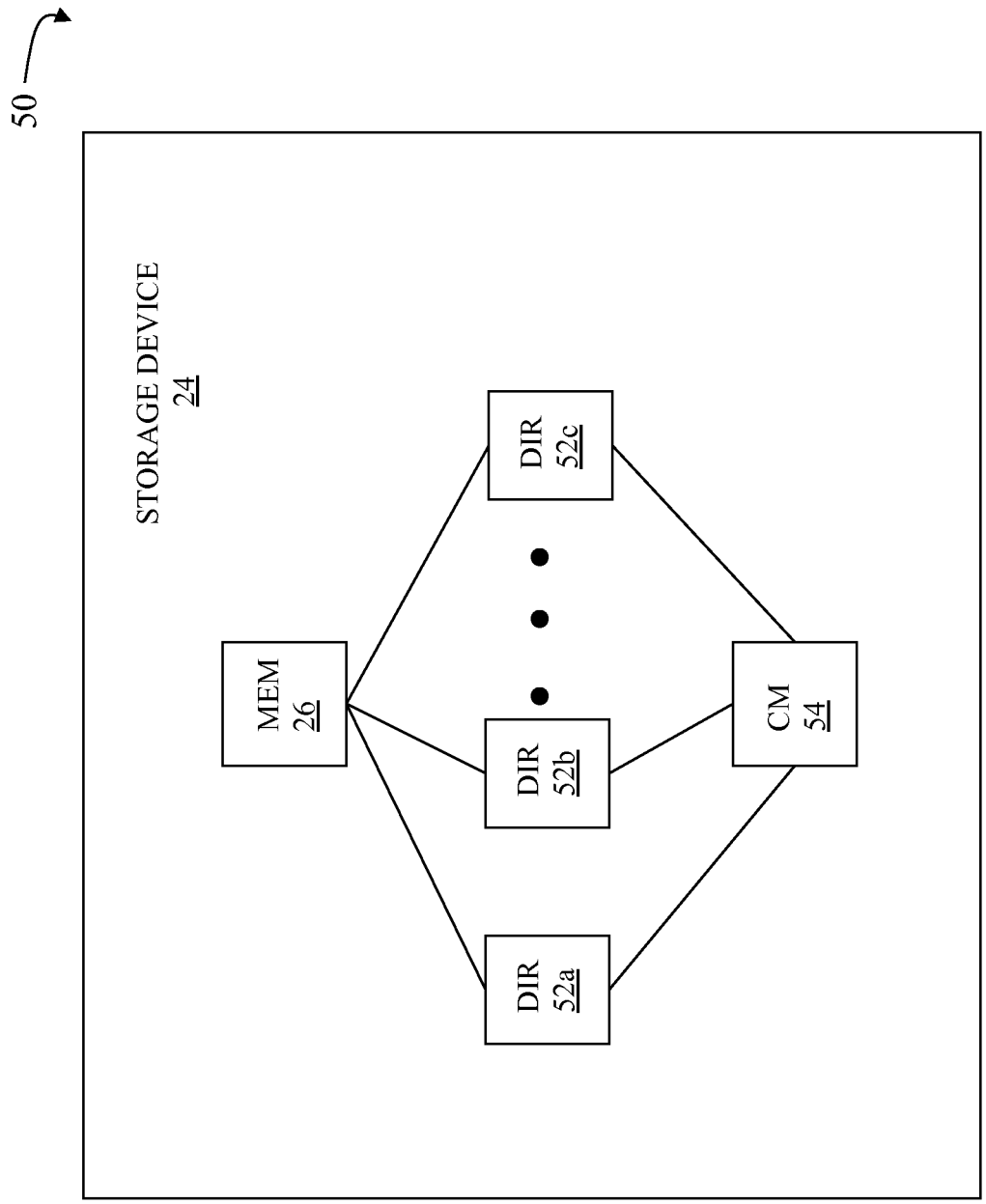
FIG. 2 is a representation of logical internal communications between the directors and memory according to an embodiment of the system described herein.

FIG. 2 is a schematic diagram 50 illustrating an embodiment of the storage array 24 where each of a plurality of directors 52a-52c are coupled to the memory 26. Each of the directors 52a-52c may represent one of the HA's 28a-28c, RA's 32a-32c, and/or DA's 38a-38c. In an embodiment herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage array and accessible by each of the storage arrays.

Note that, although specific storage array configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
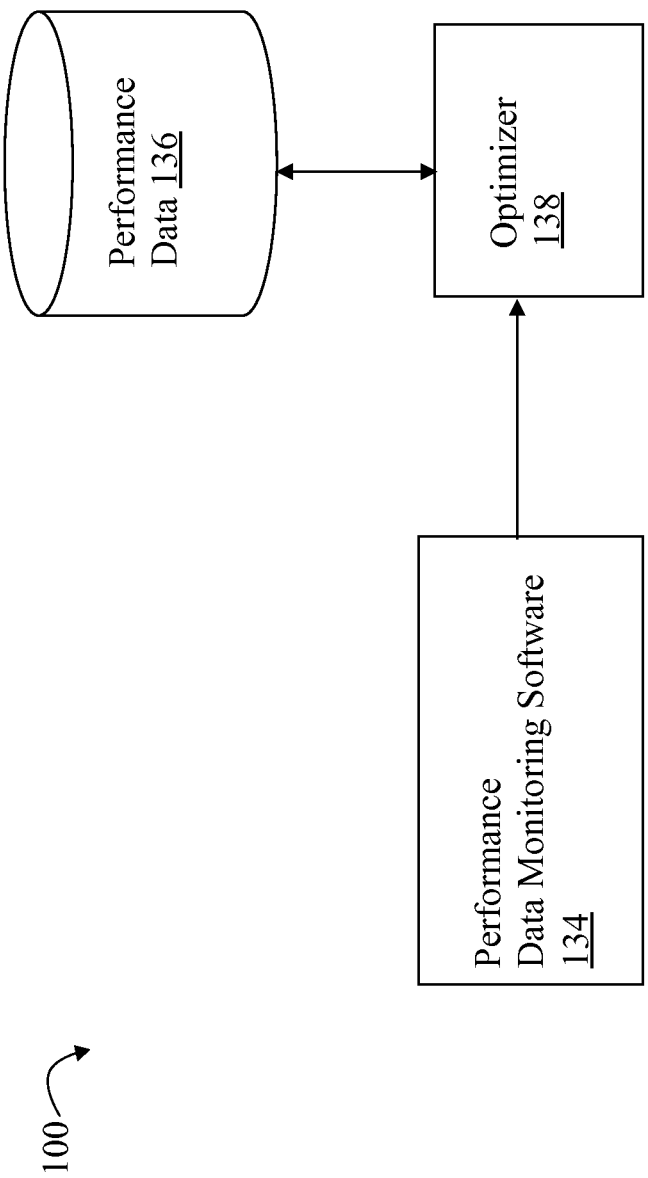
FIG. 3 illustrates components that may be included in a service processor according to an embodiment of the system described herein.

Referring to FIG. 3, a diagram 100 illustrates software that may be included in a service processor (not shown) that may be coupled to the data storage array 24. It should be noted that the service processor may be any one of a variety of commercially available processors/computers, such as an Intel-based laptop computer. Although what is described herein shows details of software that may reside in a service processor, all or portions of the illustrated components may also reside elsewhere such as, for example, on any of the hosts 22a-22c or in the data storage array 24.

Performance data monitoring software 134 gathers and stores performance data about the data storage array 24. The performance data monitoring software 134 forwards the performance data to the optimizer 138 which further stores the data in a performance data file 136. The performance data file 136 may also serve as an input to the optimizer 138, which attempts to enhance the performance of I/O operations. The optimizer 138 may take into consideration various types of parameters and performance data 136 in an attempt to optimize particular metrics associated with performance of the data storage array 24. The performance data 136 may be used by the optimizer 138 to determine metrics described and used in connection with the system described herein. The optimizer may access the performance data, for example, collected for a plurality of logical volumes when performing a data storage optimization. The performance data 136 may be used in determining a workload for one or more physical devices, logical devices or volumes serving as data devices, thin devices (described in more detail elsewhere herein) and/or other virtually provisioned devices, portions of thin devices, etc. The workload may also be a measurement of how busy a device is, for example, in terms of I/O operations (e.g., I/O throughput such as number of I/Os per second, response time (RT), etc.).

The response time for a storage device or volume may be based on a response time associated with the storage device or volume for a period of time. The response time may based on read and write operations directed to the storage device or volume. The response time represents an amount of time it takes the storage system to complete an I/O request (e.g., a read or write request). The response time may be characterized as including two components: service time and wait time. Service time is the actual amount of time spent servicing or completing an I/O request after receiving the request from one of the hosts 22a-22c via one of the HAs 287a-28c, or after the storage array 24 generates an I/O request internally. The wait time is the amount of time the I/O request spends waiting in line or queue waiting for service (e.g., prior to executing the I/O operation).

It should be noted that the operations of read and write with respect to a logical volume, thin device, and the like, may be viewed as read and write requests or commands from one of the DAs 38a-38c, a controller, or other backend physical device interface. Thus, read and write operations may also be characterized as a number of operations with respect to the physical storage device (e.g., number of physical device reads, writes, and the like, based on physical device accesses). This is in contrast to observing or counting a number of particular types of I/O requests (e.g., reads or writes) issued from the host and received by a front end component such as one of the HAs 28a-28c. To illustrate, a host read request may not result in a read request or command issued to a DA if there is a cache hit and the requested data is in cache. The host read request results in a read request or command issued to a DA to retrieve data from the physical drive only if there is a read miss. Furthermore, when writing data of a received host I/O request to the physical device, the host write request may result in multiple reads and/or writes by a DA. For example, if the data storage array 24 implements a RAID data protection technique, such as RAID-5, additional reads and writes may be performed in connection with writing additional parity information for the data. Thus, observed data gathered to determine workload, such as observed numbers of reads and writes, may refer to the read and write requests or commands performed by a DA. Such read and write commands may correspond, respectively, to physical device accesses such as disk reads and writes that may result from a host I/O request received by an HA.

The optimizer 138 may perform processing described herein to determine how to allocate or partition physical storage in a multi-tiered environment for use by multiple applications. The optimizer 138 may also perform other processing such as, for example, determining what particular portions of thin devices to store on physical devices of a particular tier, evaluate when to migrate or move data between physical drives of different tiers, etc. It should be noted that the optimizer 138 may generally represent one or more components that perform processing as described herein as well as one or more other optimizations and other processing that may be performed.

The system described herein determines promotion and demotion thresholds (described below in more detail) to decide what data portions of thin devices to store on physical devices of a particular tier in a multi-tiered storage environment. The data portions of a thin device may be automatically placed in a storage tier after determining which storage tier is optimal for improving data storage system performance. The data portions may also be automatically relocated or migrated to a different storage tier as the workload and observed performance characteristics for the data portions change over time. Analysis of performance data for data portions of thin devices may be performed in order to determine whether particular data portions should have their data contents stored on physical devices located in a particular storage tier. The techniques herein may take into account how busy the data portions are in combination with defined capacity limits and defined performance limits (e.g., such as I/O throughput or I/Os per unit of time, response time, utilization, and the like) associated with a storage tier in order to evaluate which data to store on drives of the storage tier. The foregoing defined capacity limits and performance limits may be used as criteria to determine promotion and demotion thresholds based on projected or modeled I/O workload of a storage tier. Different sets of performance limits, also referred to as comfort performance zones or performance zones, may be evaluated in combination with capacity limits based on one or more overall performance metrics (e.g., average response time across all storage tiers for one or more storage groups) in order to select the promotion and demotion thresholds for the storage tiers.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of FC devices and/or SATA devices may be characterized as a demotion and movement of data from the foregoing second tier to the first tier a promotion. The promotion and demotion thresholds refer to thresholds used in connection with data movement.

As described in following paragraphs, one embodiment may use an allocation policy specifying an upper limit or maximum threshold of storage capacity for each of one or more tiers for use with an application. The partitioning of physical storage of the different storage tiers among the applications may be initially performed in accordance with the foregoing thresholds of the application's allocation policy and other criteria. Allocation of the different storage tiers used to store data for an application may then be determined, and thus the allocation for the application's storage group, subject to the allocation policy and other criteria. Such criteria may also include one or more performance metrics indicating a workload of the application. For example, it is possible to determine one or more performance metrics using collected or observed performance data for a plurality of different logical devices, and/or portions thereof, used by the application. Thus, the partitioning of the different storage tiers among multiple applications may also take into account the workload or how busy an application is. Such criteria may also include capacity limits specifying how much of each particular storage tier may be used to store data for the application's logical devices. As described herein, the criteria may include one or more performance metrics in combination with capacity limits, performance metrics alone without capacity limits, or capacity limits alone without performance metrics. Of course, as will be appreciated by those of ordinary skill in the art, such criteria may include any of the foregoing in combination with other suitable criteria.

As an example, the system described herein may be described with reference to a storage environment having three storage tiers—a first tier of only flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LV's data. However, flash drives tend to be expensive in terms of storage capacity. SATA drives may be a best choice or candidate for storing data of devices requiring a large storage capacity and which are not I/O intensive with respect to access and retrieval from the physical storage device. The second tier of FC disk drives may be characterized as "in between" flash drives and SATA drives in terms of cost/GB and I/O performance. Thus, in terms of relative performance characteristics, flash drives may be characterized as having higher performance than both FC and SATA disks, and FC disks may be characterized as having a higher performance than SATA.

Since flash drives of the first tier are the best suited for high throughput/sec/GB, processing may be performed to determine which of the devices, and portions thereof, are characterized as most I/O intensive and therefore may be good candidates to have their data stored on flash drives. Similarly, the second most I/O intensive devices, and portions thereof, may be good candidates to store on FC disk drives of the second tier and the least I/O intensive devices may be good candidates to store on SATA drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
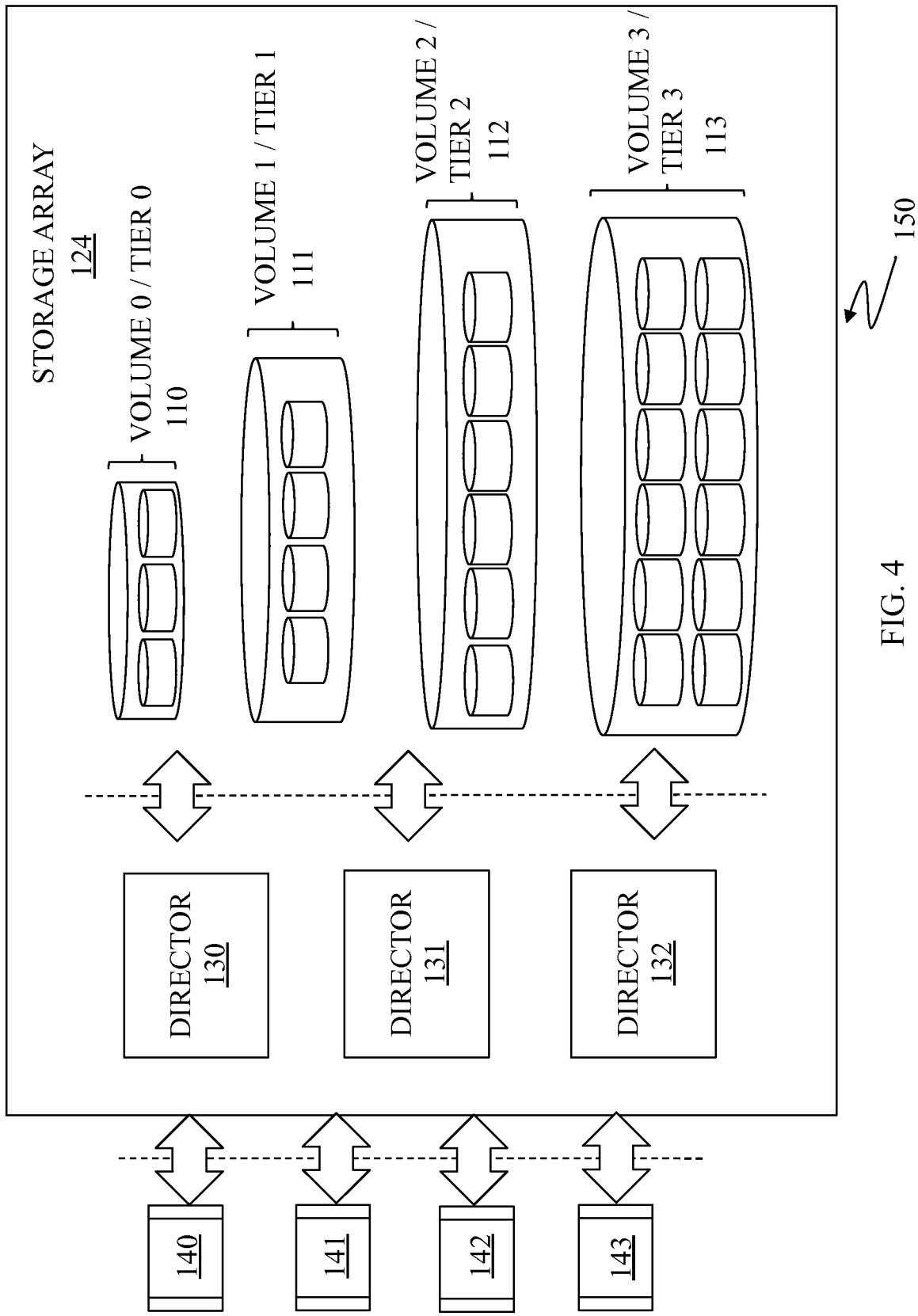
FIGS. 4-6 illustrate a data storage system, such as data storage array, including a plurality of storage tiers according to an embodiment of the system described herein.

FIG. 4 is a schematic illustration showing a storage system 150 that may be used in connection with the system described herein. The storage system 150 may include a storage array 124 having multiple directors 130-132 and multiple storage volumes 110-113, which may be logical volumes (LVs). Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to the system described herein, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. The system described herein may be used to determine amounts or allocations of each storage tier used by each application based on capacity limits in combination with performance limits.

Figure 5:
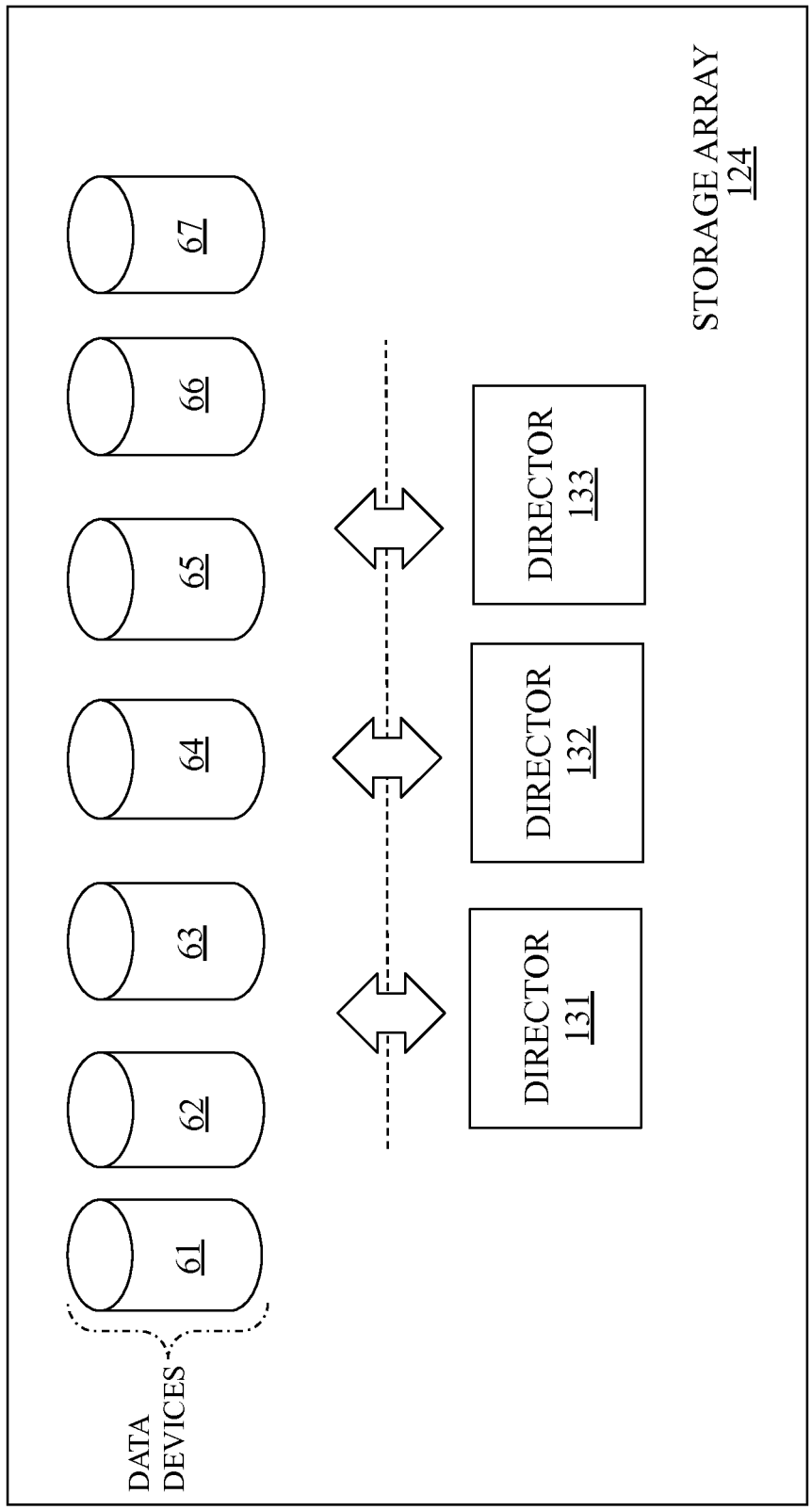

Referring to FIG. 5, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 6:
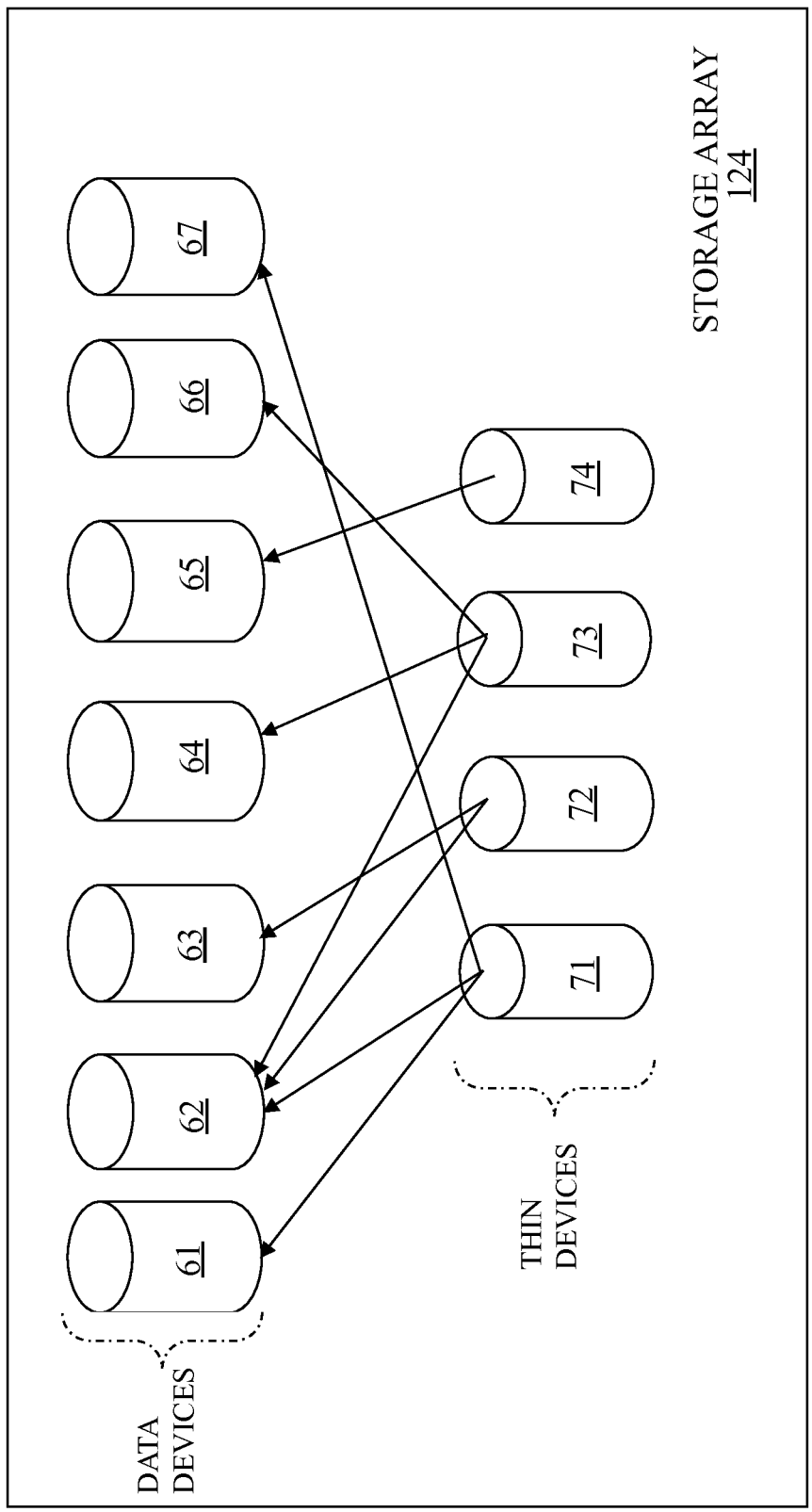

As shown in FIG. 6, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 7:
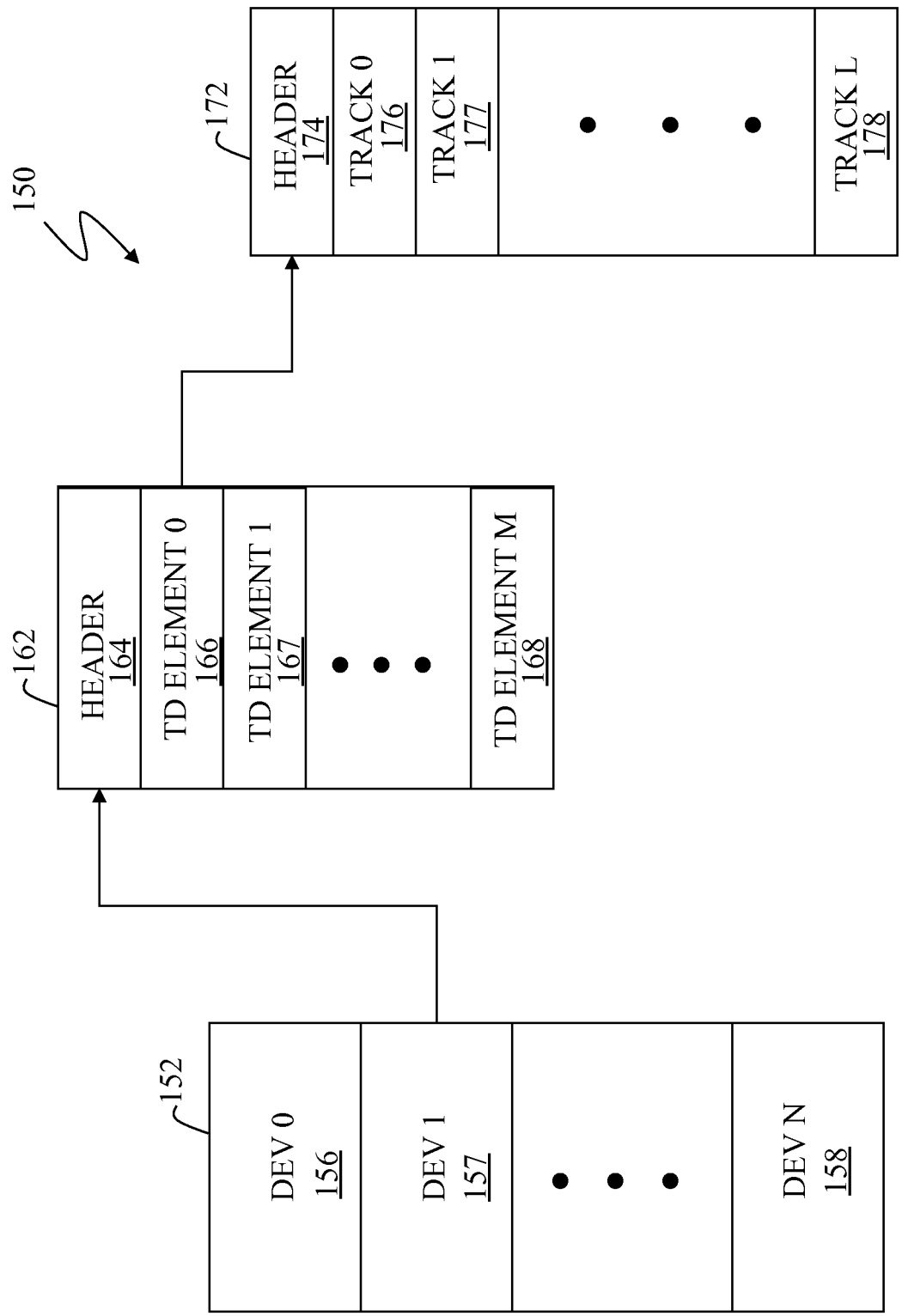
FIG. 7 is a schematic diagram illustrating tables that are used to keep track of device information according to an embodiment of the system described herein.

Referring to FIG. 7, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 8:
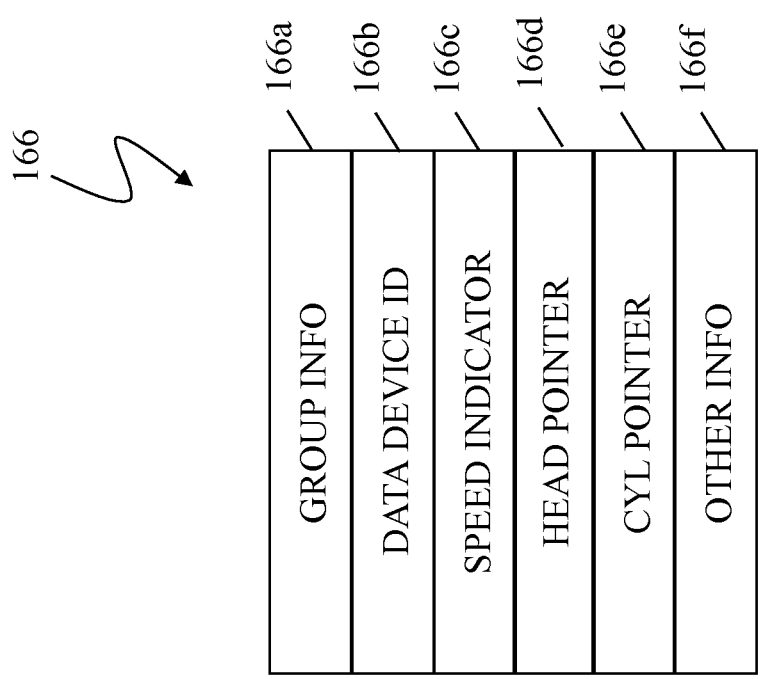
FIG. 8 is a schematic diagram showing a group element of a thin device table according to an embodiment of the system described herein.

Referring to FIG. 8, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with the system described herein, it is possible to allow for locating all of the data of a single logical portion or entity in a same tier or in multiple different tiers depending on the logical data portion or entity. In an embodiment including thin devices, the system described herein may be used where different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with system described herein may have added flexibility in that the first portion of data of the thin device may be located in a different higher performance storage tier than the second portion. For example, the first portion may be located in a tier comprising flash devices and the second portion may be located in a different tier of FC or SATA drives.

Figure 9:
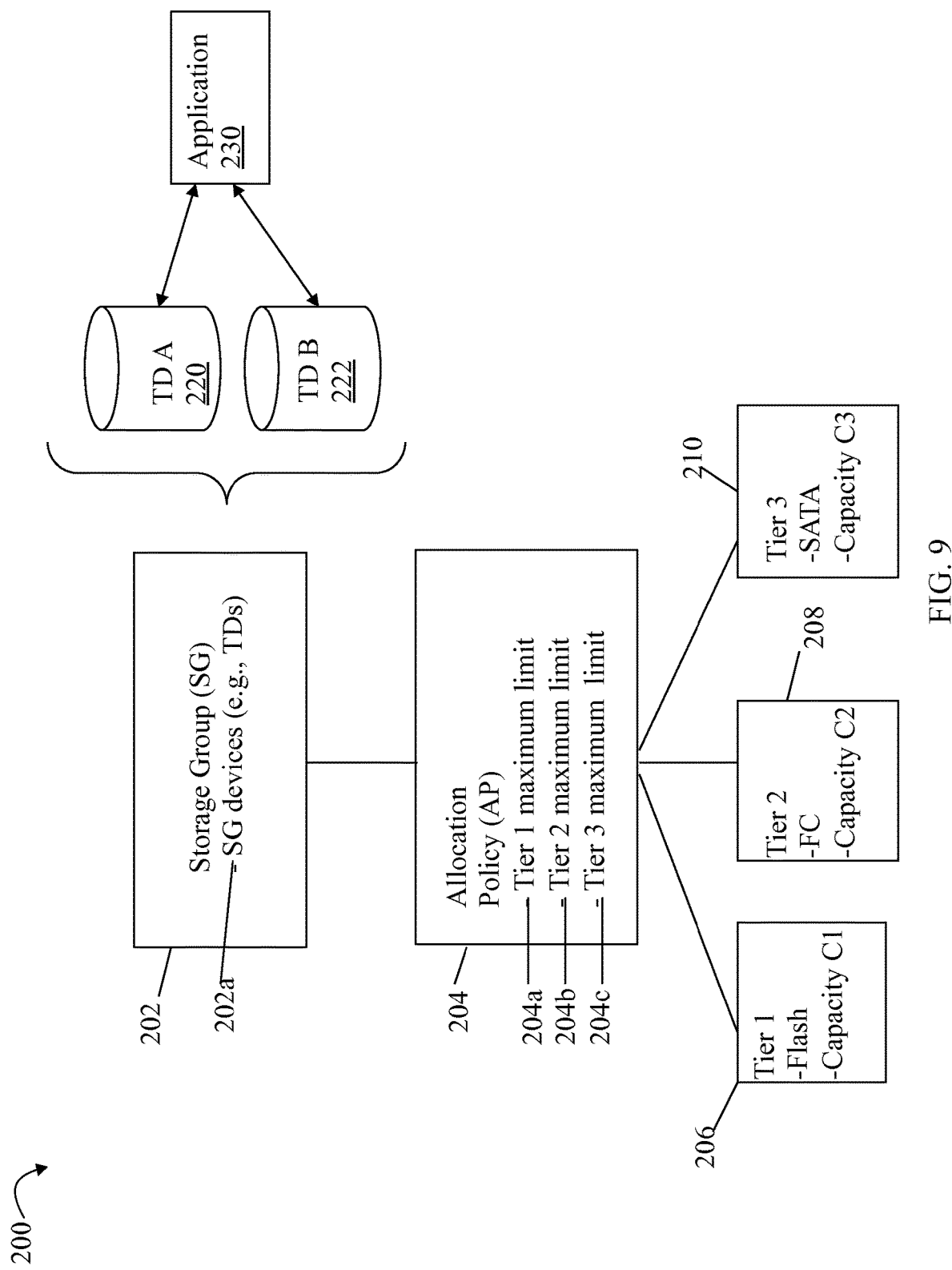
FIGS. 9 and 10 illustrate a storage group, allocation policy and associated storage tiers according to an embodiment of the system described herein.

Referring to FIG. 9, shown is an example illustrating information that may be defined and used in connection with the system described herein. The example 200 includes multiple storage tiers 206, 208, and 210, an allocation policy (AP) 204, and storage group (SG) 202. The SG 202 may include one or more thin devices (TDs), such as TD A 220 and TD B 222, used by an application 230. The application 230 may execute, for example, on one of the hosts of FIG. 1. The system described herein may be used to determine how to partition physical storage of the multiple storage tiers 206, 208 and 210 for use in storing or locating the application's data, such as data of the TDs 220 and 222. It should be noted that the particular number of tiers, TDs, and the like, should not be construed as a limitation. An SG may represent a logical grouping of TDs used by a single application although an SG may correspond to other logical groupings for different purposes. An SG may, for example, correspond to TDs used by multiple applications.

Each of 206, 208 and 210 may correspond to a tier definition as described elsewhere herein. Element 206 represents a first storage tier of flash drives having a tier capacity limit C1. Element 208 represents a first storage tier of FC drives having a tier capacity limit C2. Element 210 represents a first storage tier of SATA drives having a tier capacity limit C3. Each of C1, C2 and C3 may represent an available or maximum amount of storage capacity in the storage tier that may be physical available in the system. The AP 204 may be associated with one of more SGs such as SG 202. The AP 204 specifies, for an associated SG 202, a capacity upper limit or maximum threshold for one or more storage tiers. Each such limit may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes limit 204a identifying a maximum or upper limit of storage for tier1, limit 204b identifying a maximum or upper limit of storage for tier2, and limit 204c identifying a maximum or upper limit of storage for tier3. The SG 202 may be based on an SG definition identifying 202a the logical devices, such as TDs included in the SG.

In connection with the system described herein, the maximum limits 204a, 204b and 204c each represent an upper bound of a storage capacity to which an associated SG is subjected to. The system described herein may be used to partition less than the amount or capacity represented by such limits. An amount of physical storage of a tier allocated for use by an application is allowed to vary up to the tier limit as defined in the AP 204 in accordance with other criteria associated with the application such as, for example, varying application workload. The optimizer may vary the amount of storage in each tier used by an SG202, and thus an application, based on workload and possibly other criteria when performing a cost benefit analysis, where such amounts are subject to the limits of the SG's AP and also performance limits described in more detail elsewhere herein. At a second point in time, the workloads and possibly other criteria for the applications may change and the optimizer may repartition the storage capacity used by each application subject to the capacity limits of APs and performance limits.

Figure 10:
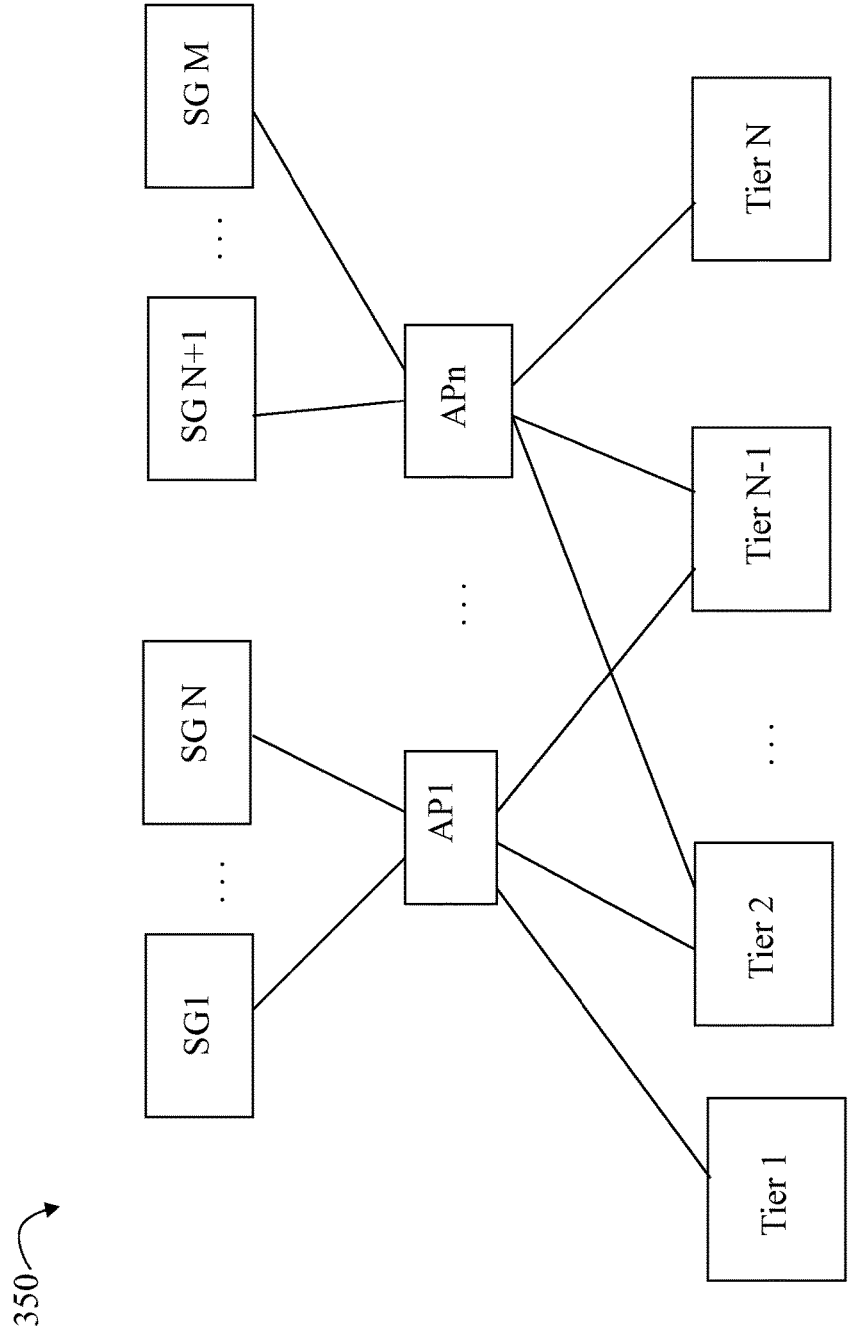

Referring to FIG. 10, shown is an example which more generally illustrates different associations between SGs, APs and tiers in an embodiment in accordance with the system described herein. The example 350 illustrates that an embodiment may have multiple storage tiers (e.g., tiers 1-N), multiple APs (e.g., AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum capacity limit as described in connection with FIG. 9. Each AP may be associated with one or more SGs. For example SGs1-N may be associated with a same AP1, and SGs N+1 through M may be associated with a same APn.

With reference back to FIG. 9, each of the maximum capacity limits may have any one of a variety of different forms. For example, such limits may be expressed as a percentage or portion of tier total storage capacity (e.g., such as a percentage of C1, C2, or C3), as an integer indicating an amount or quantity of storage 410c (e.g., indicating a number of bytes or other number of storage units), and the like.

Data used in connection with the system described herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each TD, and portions thereof. For example, for each TD, and/or portions thereof, an average number of reads occurring within a given time period may be determined, an average number of writes occurring within a given time period may be determined, an average number of read misses occurring within a given time period may be determined, and the like. It should be noted that the operations of read and write with respect to a TD may be viewed as read and write requests or commands from the DA, controller or other backend physical device interface. Thus, these are operations may also be characterized as an average number of operations with respect to the physical storage device (e.g., average number of physical device reads, writes, and the like, based on physical device accesses). This is in contrast to observing or counting a number of particular types of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment of the system described herein may perform movement of data to and/or from physical storage devices using any suitable technique. Also, any suitable technique may be used to determine a target storage device in the target tier where the data currently stored on the target is relocated or migrated to another physical device in the same or a different tier.

An embodiment in accordance with the system described herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple LVs and their associated physical devices. With thin devices, a system in accordance with the system described herein has flexibility to relocate individual chunks as desired to different devices in the same as well as different pools or storage tiers. For example, a system may relocate a chunk from a flash storage pool to a SATA storage pool. In one embodiment using the system described herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such chunks. As such, tracking and managing performance data such as one or more performance statistics for each chunk, across all such chunks, for a storage group of thin devices can be cumbersome and consume an excessive amount of resources. The system described herein may be used in connection with collecting performance data about thin devices where such information may be used to determine which chunks of thin devices are most active relative to others. Such evaluation may be performed in connection with determining promotion/demotion thresholds use in evaluating where to locate and/or move data of the different chunks with respect to the different storage tiers in a multi-storage tier environment. In connection with examples in following paragraphs, details such as having a single storage pool in each storage tier, a single storage group, and the like, are provided for purposes of illustration. Those of ordinary skill in the art will readily appreciate the more general applicability of the system described herein in other embodiments such as, for example, having a storage group including a plurality of storage pools, and the like.

Figure 11:
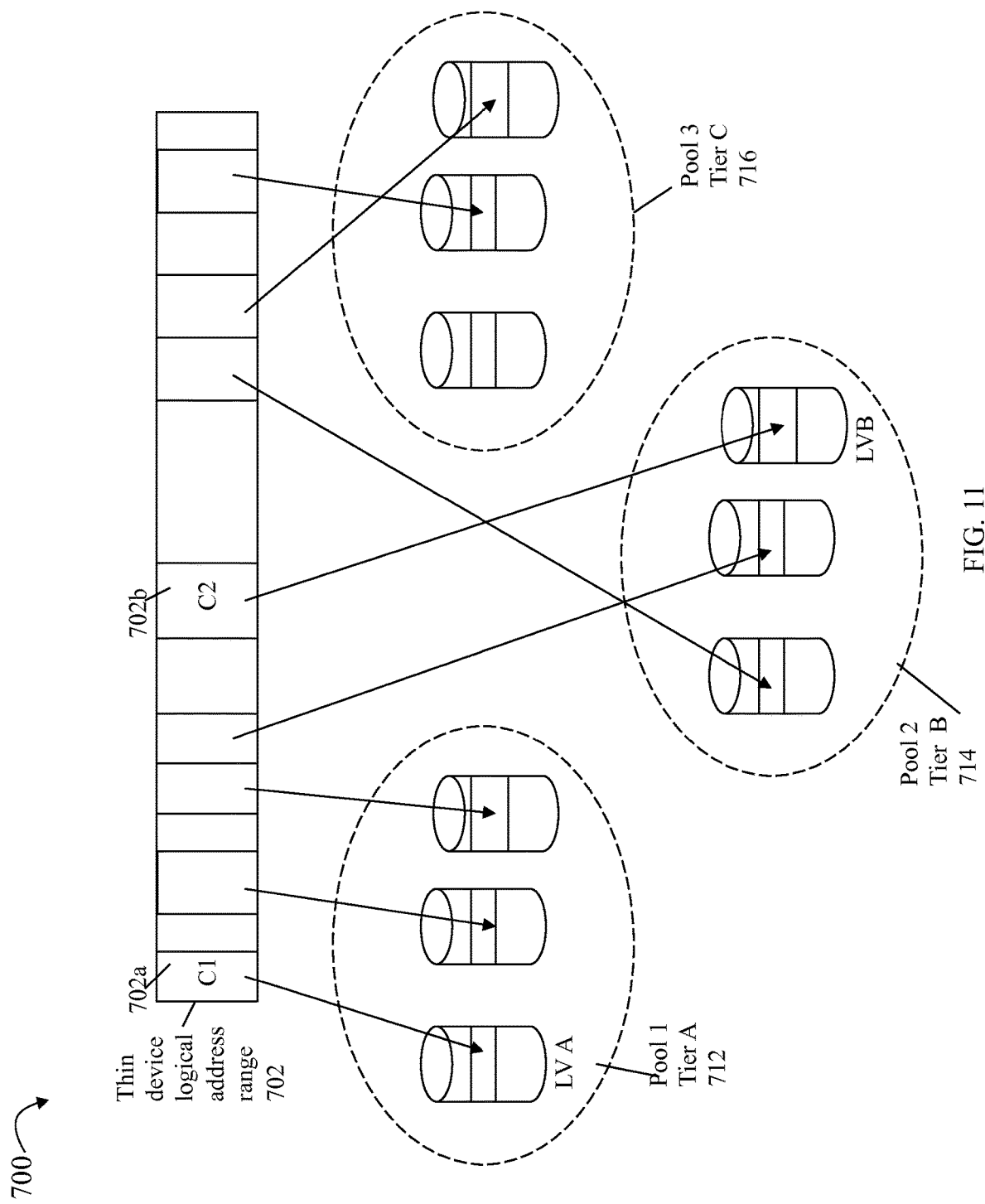
FIGS. 11 and 12 illustrate thin devices and associated structures that may be used according to an embodiment of the system described herein.

Referring to FIG. 11, shown is an example 700 illustrating use of a thin device in an embodiment in accordance with the system described herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 12:
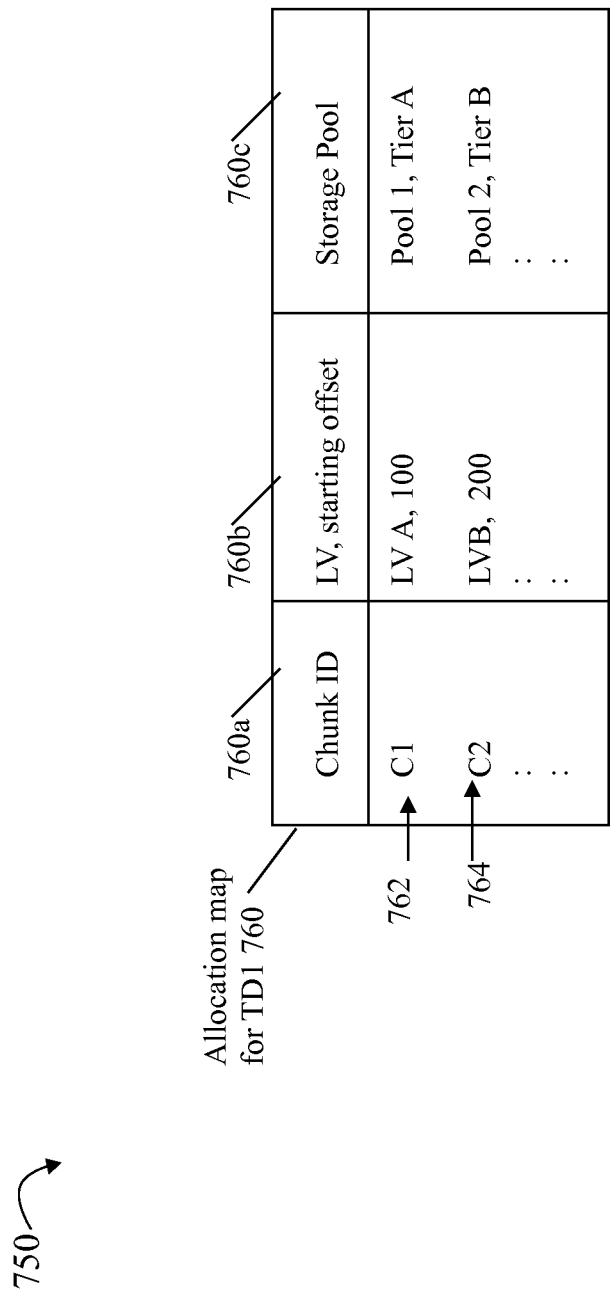

Referring to FIG. 12, shown is an example representation of information that may be included in an allocation map in an embodiment in accordance with the system described herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 11 such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, a second column 760b, indicates information about the LV and offset to which the chunk is mapped, and a third column storage pool 760c denotes the storage pool and tier including the LV of 760b. For example, entry 762 represents chunk C1 illustrated in FIG. 11 as 702a and entry 764 represents chunk C2 illustrated in FIG. 11 as 702b. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 6. Such information as illustrated and described in connection with FIG. 12 may be maintained for each thin device in an embodiment in accordance with the system described herein.

In connection with collecting statistics characterizing performance, workload and/or activity for a thin device, one approach may be to collect the information per chunk or, more generally, for the smallest level of granularity associated with allocation and de-allocation of storage for a thin device. Such statistics may include, for example, a number of reads/unit of time, # writes/unit of time, a number of pre-fetches/unit of time, and the like. However, collecting such information at the smallest granularity level does not scale upward as number of chunks grows large such as for a single thin device which can have up to, for example 300,000 chunks.

Therefore, an embodiment in accordance with the system described herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into sub extents, where each sub extent is a collection of M chunks. M may be, for example 10 in one embodiment. In one embodiment, the sub-extent size may correspond to the smallest granularity of data movement. In other words, the sub extent size represents the atomic unit or minimum amount of data that can be operated upon when performing a data movement such as between storage tiers.

Figure 13:
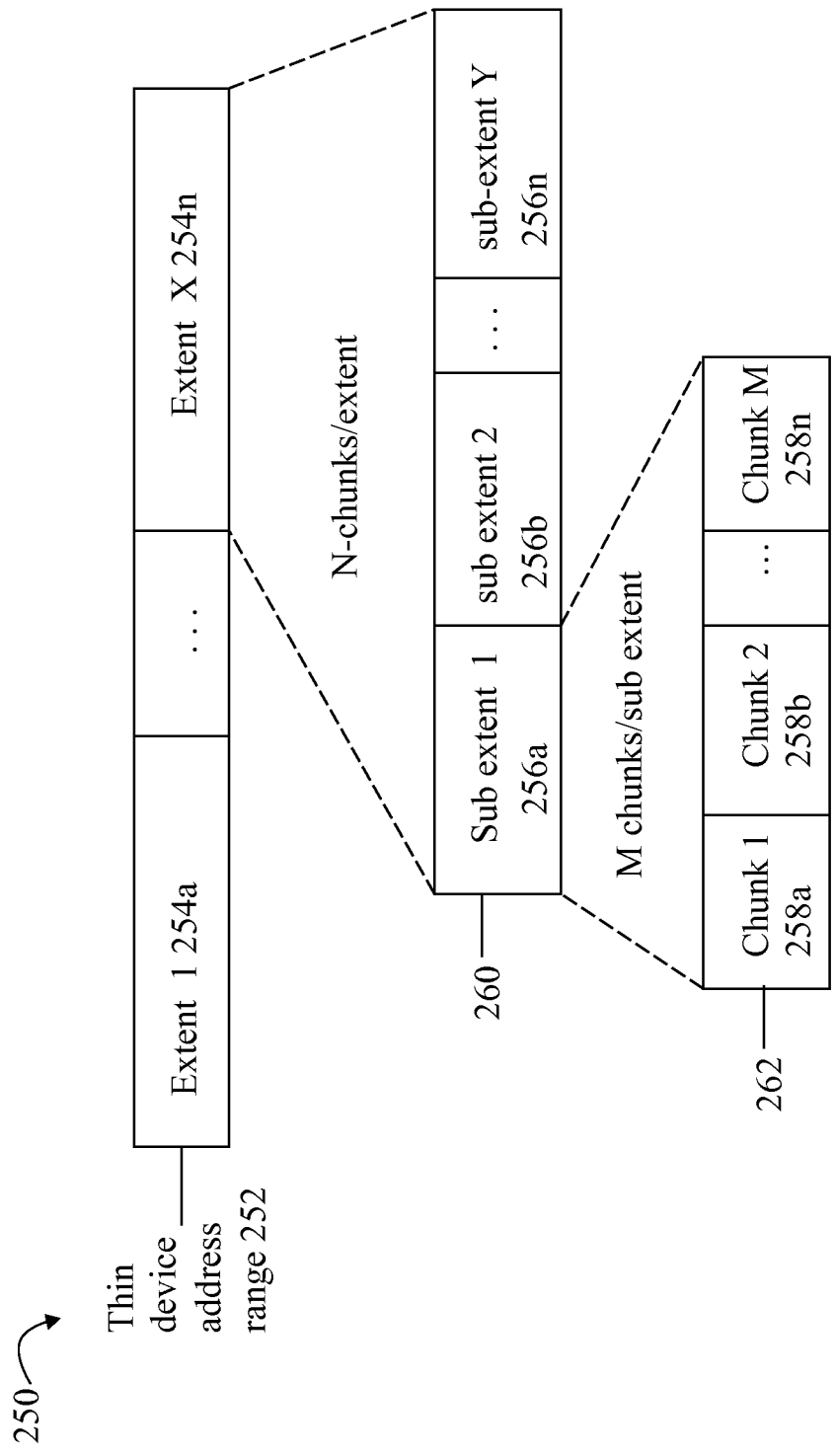
FIG. 13 illustrates data portions of a logical address range of a thin device according to an embodiment of the system described herein.

Referring to FIG. 13, shown is an example illustrating partitioning of a thin device's address space or range in an embodiment in accordance with the system described herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include sub extents 256a-256n. Although only detail is illustrated for extent 254n, each of the other extents of the thin device also includes a same number of sub extents as illustrated for 254n. Each of the sub extents 256a-256n may represent a grouping of "M" chunks. Element 262 illustrates that sub extent 1 256a may include chunks 258a-258n. Although only detail is illustrated for sub extent 256a, each of the other sub extents 256b-256n also includes a same number of "M" chunks as illustrated for 256a. Thus, each of the extents 254a-254n may represent an grouping of "N" chunks, where $$N = \text{\# subextents/extent} * M \text{ chunks/subextent} \quad \text{EQUATION 1}$$

The system described herein may collect statistics for each extent and also other information characterizing activity of each sub extent of a thin device. Statistics for each extent may be characterized as either long term or short term. Short term refers to statistics which may reflect performance, workload, and/or I/O activity of an extent with respect to a relatively short window of time. Thus, short term statistics may reflect recent extent activity for such a short time period. In contrast and relative to short term, long term refers to statistics reflecting performance, workload and/or I/O activity of an extent with respect to a longer period of time. Depending on the evaluation being performed, such as by the optimizer, it may be desirable to place greater weight on short term information than long term, or vice versa. Furthermore, the information maintained per sub extent may be used as needed once particular extents of interest have been identified.

Figure 14:
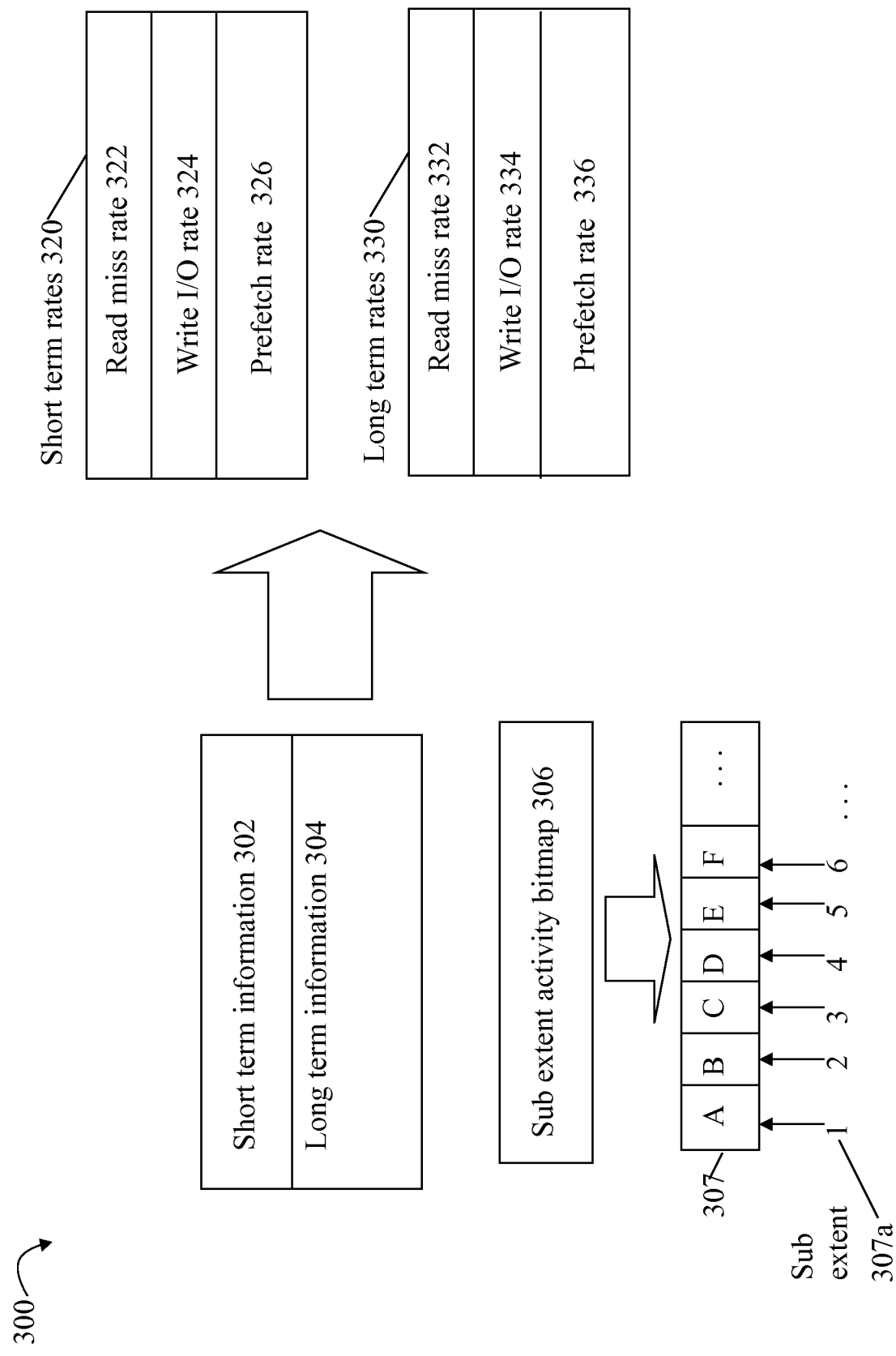
FIG. 14 illustrates performance information that may be determined in connection with thin devices according to an embodiment of the system described herein.

Referring to FIG. 14, a diagram 300 illustrates that information may be collected and used in connection each extent in an embodiment of the system described herein. The diagram 300 illustrates that short term information 302, long term information 304 and a sub extent activity bitmap 306 may be collected for each extent. The short term information 302 and long term information 304 may be used in connection with determining short term rates 320 and long term rates 330 for each extent. The statistics included in 302, 304, 320 and 330 may reflect activity with respect to the entire extent. The activity bitmap 306 is illustrated in further detail by element 307 as including an entry for each sub extent in the associated extent. Entries of 307 are denoted by A, B, C, and the like. Each of the entries of 307 represents aggregated or collective activity information for a corresponding sub extent denoted by the numeric identifiers 307a of 1, 2, 3, etc. Each entry of 307 may include one or more bits used to encode an activity level with respect to all chunks of a corresponding sub-extent. For example, the entry of 307 denoted as A represents an activity level for all chunks in sub extent 1. An embodiment may use any number of bits for each entry of the activity bitmap 306, 307. For example, in one embodiment, each entry of the activity bitmap may be 2 bits capable of representing any of 4 integer values—0, 1, 2, and 3.

As will be described in following paragraphs, the short term rates 320, long term rates 330 and sub extent activity bitmap 306 may be used in connection with a variety of different evaluations such as by the optimizer 138. Generally, the activity level information or data for an extent such as illustrated in FIG. 14 may be referred to as extent activity level information including one or more metrics indicating an activity level for the extent. The extent activity level information may comprise short term activity information (e.g., such as 302 and/or 320) and long term activity information (e.g., such as 304 and 330).

In one embodiment, the short term rates 320 for an extent may include a read miss rate (e.g., random read miss (RRM) rate) 322, a write I/O rate 324 and a pre-fetch rate 326 for the extent. The long term rates 330 for an extent may include a read miss rate 332 (e.g., number of read misses/unit of time, where a read miss refers to a cache miss for a read), a write I/O rate 334 (e.g., number of writes/unit of time) and a pre-fetch rate 336 (e.g., number of pre-fetches/unit of time) for the extent. As known in the art, data may be pre-fetched from a physical device and placed in cache prior to reference or use with an I/O operation. For example, an embodiment may perform sequential stream I/O recognition processing to determine when consecutive portions of a thin device are being referenced. In this case, data of the sequential stream may be pre-fetched from the physical device and placed in cache prior to usage in connection with a subsequent I/O operation. In connection with a portion of data at a first point in a sequential stream associated with a current I/O operation, data subsequent to the first point may be pre-fetched such as when obtaining the portion from a physical device in anticipation of future usage with subsequent I/Os. The short term pre-fetch rate 326, as well as the long term pre-fetch rate 336, may also be referred to as denoting a number of sequential reads or sequential read miss operations performed since such pre-fetching may occur in response to determination that a read operation is performed for data which is not in cache (read miss) and the read operation is for data included in a series of sequentially read data portions as described above. The read miss rates 322 and 332 may represent random read miss (RRM) rates where such read misses (e.g., data requested not currently in cache) are associate with read operations not included in connection with reading data of a sequential stream (e.g., all read misses not used in connection with computing 326 and 336).

Each of the foregoing rates of 320 and 330 may be with respect to any unit of time, such as per second, per hour, and the like. In an embodiment of the system described herein, a decay coefficient may be characterized as a weighting factor given to previous activity information. The higher the coefficient, the greater the weight given to previous activity information for the extent. Thus, the adjusted activity level of an extent at a current time, "An", may be generally represented as a function of a current observed or actual activity level for the current time, "$a_n$", a decay coefficient, "r", and previous adjusted activity level for the previous time period or sampling period, "$A_{n-1}$". In connection with the foregoing, "A" may represent an adjusted activity level, "n" may denote the current time period or sampling period and "n−1" may denote the immediately prior or previous time period or sampling period at which the activity for the extent was determined. In other words, "$a_n$" is adjusted to take into account previous activity as represented by "$A_{n-1}$" and "An" represents the resulting adjusted value of "$a_n$". With respect to a statistic or metric such as a number or read misses, "$a_n$" and "An" may each represent an integer quantity or number of read misses within a current sampling period, "n". The foregoing may generally be represented as:

$$An = a_n + (r * A_{n-1}) \quad \text{EQUATION 2}$$

wherein $a_n$ is the actual observed activity metric for the current or "nth" sampling period, "r" is a decay coefficient, "$A_n$" is the adjusted activity metric for the current or "nth" sampling period, and "$A_{n-1}$" is the adjusted activity metric from the previous or "n−1" sampling period.

Beginning with an initial time period or sampling period, denoted by i="0" (zero), the adjusted activity A0 may be initially that which is observed, a0. Subsequent observed or actual activity levels may be adjusted as described above. Generally, "$a_i$" may denote an actual or observed value obtained for an activity metric for a sampling period "i", where "i" is an integer greater than or equal to 0. "Ai" may similarly denote an adjusted activity metric (or adjusted value for "$a_i$") for a sampling period "i", where "i" is an integer greater than or equal to 0. Thus, for consecutive sample periods at which actual or observed activity metrics are obtained (as denoted by lower case "a,"s), corresponding adjusted activity levels (e.g., "A" values) may be determined as follows:

$A0 = a0/*$Adjusted activity level $A0$, at time=0 or initially*/

$A1 = a1 + (r*A0)/*$Adjusted activity level $A1$, at first sampling period, $i=1*/$ $A2 = a2 + (r*A1)/*$Adjusted activity level $A2$, at second sampling period, $i=2*/$ and so on for subsequent sampling periods 3, 4, and the like, based on EQUATION 2.

In connection with EQUATION 2, $0 \leq r < 1$, where "r" is a decay coefficient or weight given to previous activity. Varying "r" in EQUATION 2 results in accordingly varying the weight given to past or previous activity. If r=0, then no weight is given to previous or historic values. Thus, the closer "r" is to 0, the lesser weight given to previous activity. Similarly, the closer "r" is to 1, the greater the weight given to previous activity. In connection with determining an adjusted activity level, An, using EQUATION 2 for short term and long term, different decay coefficients may be selected. Generally "r" for short term is less than "r" used in connection with long term activity. For example, in one embodiment, "r" used in connection short term activity levels may be 50% or 0.50 or smaller. "r" used in connection with long term activity levels may be 80% or 0.80 or larger. The foregoing are exemplary values that may be selected for "r" in connection with short term and long term activity levels depending on the weight to be given to previous activity. In connection with short term activity, a decay coefficient may be selected in accordance with providing a relatively short term rate of decay for an activity level metric determined at a point in time. For example, a short term rate of decay may provide for a rate of decay for an activity level metric on the order of one or more hours (e.g., less than a day). In connection with long term activity, a decay coefficient may be selected in accordance with providing a relatively long term rate of decay for an activity level metric determined at a point in time. For example, a long term rate of decay may provide for a rate of decay for an activity level metric on the order of one or more days, a week, and the like. Thus, an activity metric at a first point in time may have a weighted or residual effect on an adjusted activity level determined at a later point in time in accordance with the selected decay coefficient indicating the rate of decay of the activity metric.

As mentioned above, EQUATION 2 results in a metric or count, such as a number of read misses, number of writes, or number or pre-fetches during a sample period. It may be desirable to also determine a rate with respect to a unit of time, such as per second, per hour, and the like, for each of the foregoing adjusted activity metrics An. A rate with respect to a unit of time for the adjusted activity level An may be represented as:

$$Ar = An*(1-r)/(1-r^{n-1}) \quad \text{EQUATION 3}$$

where Ar=the adjusted activity rate per unit of time, r=decay coefficient or weight as described above, n=denotes an "nth" sampling period as described above, An=adjusted activity level determined for a given sampling period "n" (e.g. using EQUATION 2 as described above).

Generally, the higher the decay coefficient, r, the slower the change in Ar as may be the desired case with long term Ar values. Thus an embodiment of the system described herein may select decay coefficients for use with long term and short term Ar values so that, when plotted with respect to time, long term Ar values generally have a smaller slope than that associated with short term Ar values.

Figure 15:
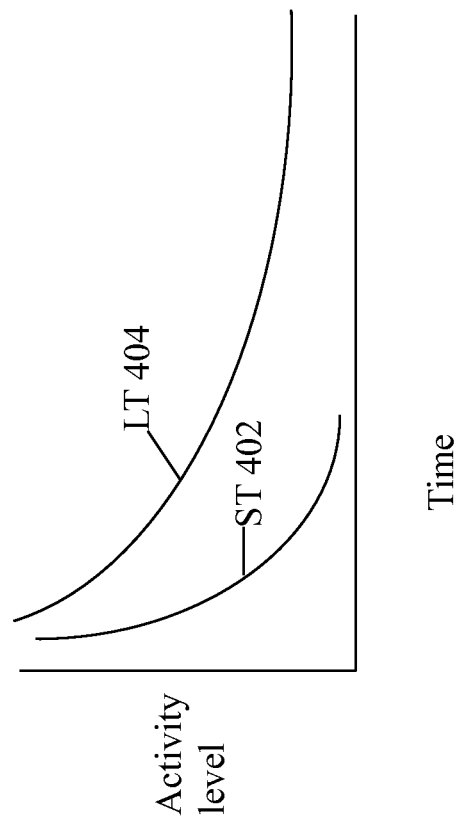
FIG. 15 is a graphical illustration of long term and short term statistics according to an embodiment of the system described herein.

Referring to FIG. 15, shown is an example graphically illustrating the general shape of curves for long term (LT) and short term (ST) values in an embodiment of the system described herein. The activity level values (Y-axis values) are plotted with respect to time (X-axis). The activity level values may be determined using EQUATIONS 2 and/or 3. Curve 402 may be produced using one of EQUATIONS 2 and 3 where a first value for the decay coefficient "r" is selected for ST usage. Curve 404 may be produced using one of EQUATIONS 2 and 3 where a second value for the decay coefficient "r" is selected for LT usage. The values selected for "r" in connection with 402 and 404 may be relative so that the first value for "r" used with 402 is less than the second value for "r" used with 404.

In one embodiment, each of the different An values determined using EQUATION 2 may be converted to a corresponding Ar value using EQUATION 3 when desired.

In connection with the foregoing, for example, with respect to a number of read misses, "$a_n$" represents the number of such operations that have occurred in a current sample period, n. For example, if a sample period=10 minutes so that statistics for an extent are collected and/or computed every 10 minutes, "$a_n$" represents the number of read misses that occurred in the last 10 minute sample period or time interval. $A_{n-1}$ represents the previous or last A calculation (e.g., as determined using EQUATION 2) from the previous sample period, denoted "n−1".

With reference back to FIG. 14, an embodiment of the system described herein may collect short term information 302 as counter values indicating a count or number of each type of operation for a current time period or sampling period "n". The following may represent different "$a_n$" values as included in the short term information 302 for an extent: read miss count (number of read misses for the extent during the sampling period), pre-fetch count (number of pre-fetches for the extent during the sampling period) and write count (number of writes for the extent during the sampling period).

The short term information 302 may also include storing previous A values as determined for the sampling period "n−1" using EQUATION 2 above. For example, short term information 302 may also include storing three (3) previous adjusted activity level values or A values for sampling period "n−1" using EQUATION 2 above for the read miss count, pre-fetch count and write count.

The short term information 302 may also include a timestamp value indicating the timestamp associated with the previous sampling period "n−1".

Using the above-mentioned short term information 302, the system described herein may calculate updated short term rates 320 using EQUATION 3 for a sampling period "n" for a selected "r" as a short term decay coefficient. With each new sampling period, the short term information may be accordingly updated so that which is associated with sampling period "n" subsequently becomes associated with sampling period "n−1".

The long term information 304 may include long term rates or Ar values as determined using EQUATION 3 for a read miss rate (e.g., number of read misses/second), a pre-fetch rate (e.g., number of pre-fetches/second) and a write rate (e.g., number of writes/second). The long term information 304 may also include a time duration interval used for determining an adjusted Ar value for the current time or sampling period "n". For example, the time duration interval may represent the amount of time for which statistics are collected and used in connection with long term Ar values. The system described herein may store a set of long term Ar values rather than calculate such Ar values on demand from other stored information as in the case above for short term rates 320 (e.g., where short term information 302 is stored and used to calculate short term rates 320 on demand). Thus, in such an embodiment, the long term rates 330 may be included the long term information 304 where such long term rates 330 may be updated with each sampling period. In one embodiment with the arrival of a new sampling period "n", the long term information 304 may include Ar values for the foregoing statistics as determined using EQUATION 3 for a sampling period "n−1". These long term Ar values for "n−1" may each be multiplied by the time duration interval to determine $A_{n-1}$, an adjusted metric for the long term time period. The foregoing $A_{n-1}$ value may then be used with EQUATION 2 to determine An for the current sampling period "n" using a selected "r" as a long term decay coefficient. Using An, EQUATION 3 may then be used to obtain updated long term rates Ar values. With each new sampling period, the long term information may be accordingly updated so that which is associated with sampling period "n" subsequently becomes associated with sampling period "n−1".

With reference back to FIG. 14, described above is an activity bitmap 306 having an entry per sub extent where each such entry may indicate an aggregate or collective activity level with respect to all chunks of the associated sub-extent. The number of different activity level states that may be represented for each sub extent depends on the number of bits per entry of the activity bitmap. In one embodiment, each entry of the activity bitmap may be 2 bits as described above so that each entry may be an integer in the inclusive range of 0 . . . 3. Processing may be performed to decrement each entry having a non-zero value by 1 every predetermined time period, such as every 12 hours. Each time there is any I/O operation to a sub extent since the sub extent was located or moved to its current physical location, the sub extent's entry in the activity bitmap 306 may be set to 3. Thus, each entry in the bitmap may represent activity level information for up to 3 of the predetermined 12 hour time periods. The system described herein may also have a different number of bits per entry to represent a larger number of predetermined time periods. Based on the foregoing, the lower the value of a bitmap entry for a sub extent, the longer the amount of time that has lapsed since the sub extent has had any I/O activity.

Figure 16:
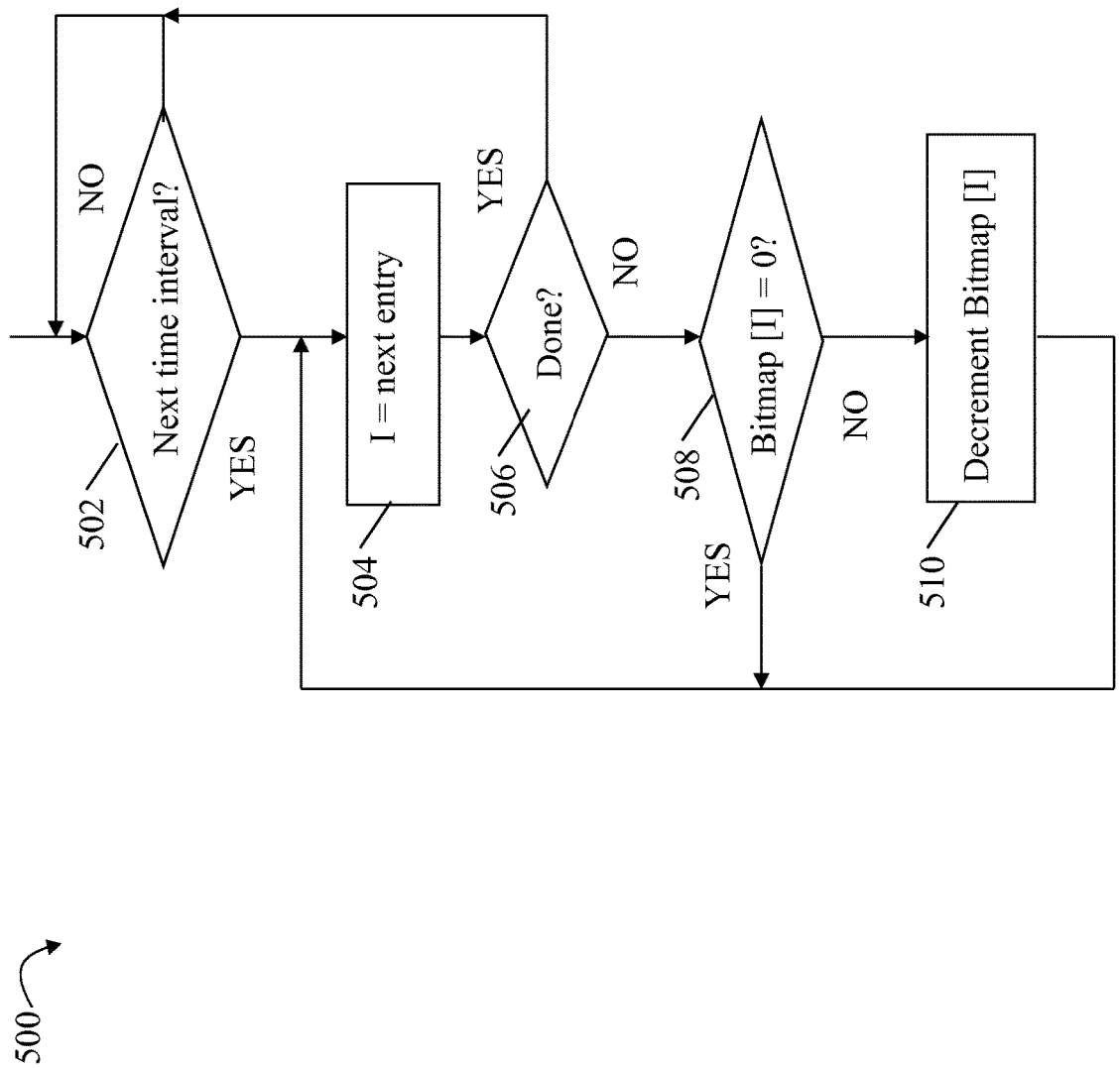
FIG. 16 is a flowchart illustrating processing performed in connection with an activity bitmap according to an embodiment of the system described herein.

Referring to FIG. 16, shown is a flowchart of processing steps that may be performed in connection with each activity bitmap associated with an extent in an embodiment of the system described herein. The flowchart 500 summarizes processing described above where each bitmap for each extent may be traversed with the occurrence of a predetermined time interval, such as every 12 hours. At step 502, a determination is made as to whether the next time interval has lapsed. If not, processing waits at step 502 until step 502 evaluates to yes and control proceeds to step 504. At step 504, I is initialized to the next entry in the bitmap. I represents a loop counter when traversing through the bitmap and denotes the bitmap entry currently selected for processing. At step 506, a determination is made as to whether the entire bitmap has been processed. If step 506 evaluates to yes, control proceeds to step 502 until an amount of time again lapses equal to that of the time interval. If step 506 evaluates to no, control proceeds to step 508 where a determination is made as to whether the current bitmap entry (e.g. bitmap [I]) is zero. If so, control proceeds to step 504. Otherwise, control proceeds to step 510 where the current bit map entry is decremented by one (1) and control proceeds to step 504 to process the next entry in the bitmap.

The activity bitmap may be used in connection with determining an activity level associated with each sub extent, the smallest amount of data that can be associated with a data movement operation to relocate data from one physical device to another. It should be noted that the system described herein may have functionality and capability to physically move data in units or amounts less than a sub extent. However, when performing processing to determine data movement candidates, such as by the optimizer, such processing may consider candidates for data movement which have a minimum size of a sub extent. That is, all data of the sub extent may be either moved or relocated as a complete unit, or remains in its current location. In connection with a sub extent when performing a data movement, it may be that not all chunks of the sub extent are actually moved. For example, suppose a sub extent is 10 chunks and the sub extent is to be moved from a first storage tier, such as from SATA or FC, to a second storage tier, such as flash. It may be that 9/10 chunks of the sub extent are unallocated or already in flash storage with only 1 chunk stored in the first storage tier. In this case, processing only needs to actually move the single chunk from the first storage tier to flash since the remaining 9 chunks are either already in the flash tier or unallocated. With a sub extent, the amount of data actually moved may be at most the size of the sub extent but may be less depending on, for example, whether all chunks of the thin device sub extent are allocated (e.g., actually map to physical storage), depending on the current physical device upon which chunks of the sub extent are located prior to movement, and the like. It should be noted that chunks of a sub extent may be located in different storage tiers, for example, depending on where the chunk's data is stored such as at the time when written as well as the result of other conditions that may vary.

As an example use of the activity bitmap is in connection with promotion and demotion. As an example use of the activity bitmap, the bitmap may be used to determine selective sub extents which exhibit the highest activity level such as those having counters=3 (e.g., "hot" or active areas of the extent). These sub extents may be candidates for promotion or data movement to a higher performing storage tier and may be given preference for such promotion and data movement over other sub extents having activity bitmap entries which are less than 3. In a similar manner, the activity bitmap may be used to identify the "coldest" or inactive sub extents. For example, sub extents having bit map entries=0 may be candidates for demotion to a lower performing storage tier.

In connection with promotion data movements, the system described herein may want to be responsive to a change in workload with respect to the short term. With demotion, the system may not want to move data as quickly as with promotion and may also want to consider longer term workloads prior to moving such data to a lesser performing storage tier. With promotion, the system may give greater weight to ST workload and activity data. With demotion, the system may additionally consider LT workload and activity rather than just such ST information.

The information as described and illustrated in FIGS. 14-16 above may be used for a variety of different purposes and evaluations. For example, an embodiment of the system described herein may use one or more of the short term rates to identify one or more active extents based on such aggregated extent-level activity data. Subsequently, once an active extent is identified such as a candidate for promotion, the extent's activity bitmap may be examined to determine which sub extents are most active. Processing may be performed to selectively move some of the sub extents of the active extent (e.g., those with counters=3) to a higher performing storage tier.

As another example, the activity bitmaps of extents may be used to determine a promotion ranking used to identify which extent may be promoted prior to one or more other extents. To further illustrate, an embodiment of the system described herein may have two extents, both which are candidates for promotion. The two extents may exhibit similar activity levels based on aggregate extent-level information such as based on short term rates 320 for each extent. The extent having the lesser number of active sub extents may have a higher priority for movement than the other extent. For example, processing may be performed to count the number of non-zero bit map entries for each of the two extents. The extent having the lower count may have a higher priority than the other extent having a higher count. In other words, the extents may be ranked or ordered for promotion based on a number or count of non-zero bit map entries. The extent having the lower count may be characterized as also exhibiting the greatest activity level density based on the foregoing counts of the activity bitmaps.

As another example in connection with demotion, an embodiment of the system described herein may use one or more of the short term rates 320 in combination with one or more of the long term rates 330 to identify one or more inactive extents based on such aggregated extent-level activity data. Subsequently, once an inactive extent is identified, the extent's activity bitmap may be examined to determine which sub extents are inactive and should be demoted rather than automatically demoting all sub extents of the inactive extent. Processing may be performed to selectively move some of the sub extents (e.g., those with counters=0, counters less than some threshold such as 1, and the like) to a lower performing storage tier.

One embodiment of the system described herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

The different levels of activity information described herein as obtained at a thin device level, extent level, and sub extent level provide a hierarchical view for characterizing activity of different portions of thin devices. Activity information at higher device levels may be used to first identify devices which may be candidates for data movement, such as between storage tiers (e.g. for promotion and/or demotion). In connection with thin devices, once such a first device is identified, additional detail regarding the first device's activity as reflected in extent activity level information may be used to identify an extent of the first device as a candidate for data movement. Subsequently, the activity bitmap for the extent identified may then be used to determine one or more sub extents of the identified extent for data movement. The system described herein may be used for collecting and tracking activity of thin devices. Use of the decay coefficients and equations for determining adjusted activity levels to account for previous activity levels provides an effective way of tracking workload and activity over time without having to keep a large database of historical statistics and metrics for long and short time periods.

In addition to the activity information described above for each extent and sub extent of a thin device, the system described herein may also track device level activity information for logical devices (e.g., thin devices, LVs, and the like) and physical devices in a data storage system as also noted. Additionally, the system described herein may track activity information for thin device pools. When a DA or other device interface services an I/O, the DA may not typically have any knowledge regarding thin devices as may be known from the host's point of view. In connection with collecting data for use with the system described herein, each DA may be provided with additional mapping information regarding thin devices and where storage for the thin devices is allocated (e.g., such as described by the allocation map). The DA may use this information to determine what thin device (if any) is associated with a given back end I/O request. When the DA is servicing a back end I/O request, the DA may record information about the I/O including information about the thin device associated with the I/O request. Such additional information about the thin device may be used in order to perform statistics collection of activity data for the thin devices in accordance with the system described herein.

In addition to the statistics and activity data described above, the system described herein may also collect and store information regarding expected I/O size information for each extent, thin device (or other logical device), physical device, and the like. Such information may be determined in any one or more suitable ways in the system described herein. For example, it is possible to determine expected I/O sizes that represent the average size with respect each of the particular types of I/O operations for which statistics are collected. In connection with the system described herein, the types of I/O operations for which statistics are collected may be as described above for read miss or random read miss (RRM), pre-fetch (P) or sequential read miss (SRM), and write (W). In a manner similar to that as described elsewhere herein for other statistics, the average I/O sizes may be determined based on size information collected for observed I/O operations. The collected size information based on observed I/Os may be used in determining or modeling expected I/O sizes in connection with equations, such as EQUATION 4, described elsewhere herein when determining various scores. For example, the system described herein may determine a first average I/O size based on I/O sizes of write operations observed for a time period, a second average I/O size based on I/O sizes for SRM operations for a time period, and a third average I/O size based on I/O sizes for RRM operations for a time period. The foregoing average I/O sizes may be tracked with respect to each extent and other levels (e.g., thin device, physical device, etc.) in a manner similar to that as described above such as in FIG. 14 for other statistics. The system described herein may also use other approaches which may be further simplified. For example, rather than track such I/O size information for each extent, it is possible to determine an average I/O size with respect to each particular type of I/O operation (W, RRM and SRM) as an aggregate across one or more devices, such as for a physical device, pool of physical devices, thin device, and the like, and then determine an average I/O size with respect to all extents or data portions thereof. In one embodiment, the expected I/O size for any desired I/O operation type such as used in connection with EQUATIONs 4 and 5 described elsewhere herein, may be computed as an average I/O size based on previously gathered data including metrics related to total amount of data (in bytes, megabytes, or other size unit) for a given time period and total number of I/O operations (for the time period over which the total amount of data is determined). More formally, the average I/O size used as an expected I/O size for a given I/O type may be represented as:

$$\text{Ave size for given } I/O \text{ type} = \text{TOTAL\_DATA\_TRANSFER}/\text{TOTAL\_OPS} \quad \text{EQUATION 3A}$$

where

"Ave size for given I/O type" is the average or expected I/O size for a given I/O operation type (e.g., Read, Write, Read miss, etc.);

"TOTAL_DATA_TRANSFER" is the total amount of data (e.g., in bytes, megabytes or other size unit) for the desired I/O operation type for a given time period; and "TOTAL_OPS" is the total number of I/O operations observed during the time period for which the TOTAL_DATA_TRANSFER is observed.

It should be noted that EQUATION 3A is one way in which an embodiment of the system described herein may estimate that averages as may be used in connection with expected I/O sizes as described elsewhere herein. Another way the system may determined average I/O sizes is based on a an equation using weighted averages, using information as may be gathered using the allocation map as described elsewhere herein (e.g., to gather information for data portions based on I/Os directed to the physical device where such data portions are stored), and more generally any suitable technique.

The extent-based short term and long term statistics or metrics described in FIG. 14 may be used in determining scores indicating the activity of extents. In one embodiment, the score may be a weighted value based on a combination of all six metrics 322, 324, 326, 332, 334 and 336 of FIG. 14 although the system described herein may generally use any metrics in determining such scores. In an embodiment of the system described herein, a promotion score for an extent may be represented in EQUATION 4 as:

$$((P1*P7*s\_rrm)+(P2*P8*s\_w)+(P3*P9*s\_p)+ \\ (P4*P10*1\_rrm)+(P5*P11*1\_w)+ \\ (P6*P12*1\_p))/(\# \text{ Active Subext}+1)$$

where s_rrm is the rate of short term random read misses (322), s_w is the rate of short term writes (324), s_p is the rate of short term pre-fetches or SRMs (326), 1_rrm is the rate of long term random read misses (332), 1_w is the rate of long term writes (334), and 1_p is the rate of long term pre-fetches or SRMs. The coefficients P1-P12 may be set as appropriate and are described in more detail elsewhere herein. It should be noted that "# Active Subext" represents the number of active subextents or subportions of an extent or other larger data portion for which the score is being determined. Examples of evaluating when a subextent or other subportion is active are described elsewhere herein. It should be noted that metrics used in connection with determining promotion and/or demotion score may take into account I/O size.

The coefficients P1-P6 may represent weights assigned to the different operation types denoting how much weight is given to each particular operation type (e.g., which of random read miss (RRM), pre-fetch (P) or sequential read miss (SRM), write (W)) and the long term and short term variants of expected rates at which such operation types are expected (e.g., predicted or modeled) to occur in the future. In one aspect, the coefficients P1 and P4 represent the weighted preference given to the RRM operation type relative to the other operations types of SRM (or P) and W. In particular, P1 represents the weighted preference given to the short term operation count or rate for the RRM operation type and P4 represents the weighted preference given to the long term operation count or rate for the RRM operation type. In a similar manner, the coefficients P2 and P5 represent the weighted preference given to the W operation type relative to the other operations types of SRM (or P) and RRM. In particular, P2 represents the weighted preference given to the short term operation count or rate for the W operation type and P5 represents the weighted preference given to the long term operation count or rate for the W operation type. Furthermore, the coefficients P3 and P6 represent the weighted preference given to the P or SRM operation type relative to the other operations types of W and RRM. In particular, P3 represents the weighted preference given to the short term operation count or rate for the P or SRM operation type and P6 represents the weighted preference given to the long term operation count or rate for the P or SRM operation type. The weights or coefficients P1-P6 may be generally referred to as operation type weights. In some embodiments, values for P1-P6 may be dynamically selected each time a new set of statistics or metrics (e.g., 320 and 330 of FIG. 14) are utilized in performing processing described herein. Values for P1-P6 may be generally selected based on expected storage tier workload characteristics and particular performance characteristics of physical drives in the different tiers. Examples of how values for P1-P6 may be selected are described in more detail elsewhere herein. It should be noted that an embodiment of the system described herein may also use a combination of fixed values for P1-P6 when determining a score in connection with evaluating which data portions to store in one or more of the storage tiers and may use dynamically determined values for P1-P6 when determining a score in connection with evaluating which data portions to store in one or more others of the storage tiers. For example, the system described herein may use dynamically selected values for P1-P6 when determining a promotion score of EQUATION 4 for use when evaluating which data portions to store in a target high performing SSD or flash-based storage tier, and may otherwise use a same set of fixed values for P1-P6 when determining a promotion score of EQUATION 4 for use when evaluating which data portions to store in a non-SSD or non-flash-based storage tiers (e.g., storage tiers comprising rotational disk drives). In an embodiment of the system described herein, the fixed values used for P1-P6 for non-SSD-based tiers may be 12, 4, 4, 3, 1, and 1, respectively. Of course, different values may be used to emphasize or deemphasize different I/O characteristics in connection with determination of the promotion raw score. Thus, different values for weights P1-P6 may be selected for use depending on which target tier the promotion score is being calculated for. Such values may be dynamically and continually determined based on current expected workload characteristics of a storage tier at different points in time. It is also possible to select weights for P1-P6 which are fixed or static throughout operation and performance of the system described herein where such a fixed set of the same weights may be used for one or more storage tiers.

The coefficients P7-P12 may represent additional weights assigned or associated with each particular variant combination of operation type (e.g., RRM, SRM or P, and W) and short term or long term for each operation type. Generally, the coefficients P7-P12 may represent weighting factors that may be characterized as varying with, dependent on, or a function of, expected I/O size for the three different operation types of RRM, SRM or P, and W. In particular, P7 and P10 represent weighting factors that vary with, or are a function of, expected I/O size for the RRM operation type. P8 and P11 represent weighting factors that vary with, or are a function of, expected I/O size for the W operation type. P9 and P12 represent weighting factors that vary with, or are a function of, expected I/O size for the P or SRM operation type. Weights P7-P12 may also be referred to herein as I/O size or data transfer weights. As noted above, EQUATION 3A is one way in which the expected I/O size may be determined for use in connection with determining such weights. It should also be noted that as a variation to the above where in one embodiment, size weights as represented using P7-P12 may be applied to only the short term metrics (e.g., always use a size weight of 1 for weights P10, P11 and P12 for long term metrics).

In some embodiments, values for P7-P12 may be dynamically selected each time a new set of statistics or metrics (e.g., 320 and 330 of FIG. 14) are utilized in performing processing described herein. Values for P7-P12 may be generally selected based on expected storage tier workload characteristics and particular performance characteristics of physical drives in the different tiers. For example, as described in more detail elsewhere herein, if particular storage tiers have physical drives where a response time or other measurement of performance does not exhibit a substantial dependency upon I/O size, then values for P7-P12 may be 1 so as not to introduce any bias based upon expected I/O sizes for the different operation types. Examples of how values for P7-P12 may be selected are described in more detail elsewhere herein. It should be noted that the system described herein may also use fixed values for P7-P12 when determining a score in connection with evaluating which data portions to store in one or more of the storage tiers and may use dynamically determined values for P7-P12 when determining a score in connection with evaluating which data portions to store in one or more others of the storage tiers. For example, the system described herein may use dynamically selected values for P7-P12 when determining a promotion score of EQUATION 4 for use when evaluating which data portions to store in a target high performing SSD or flash-based storage tier and may otherwise use a set of fixed values for P7-P12 of 1 for all of P7-P12 when determining a promotion score of EQUATION 4 for use when evaluating which data portions to store in a non-SSD or non-flash-based storage tiers (e.g., storage tiers comprising rotational disk drives). Of course, different values may be used to emphasize or deemphasize different I/O characteristics in connection with determination of the promotion raw score. Thus, different values for weights P7-P12 may be selected for use depending on which target tier the promotion score is being calculated for.

Values of P7-P12 may be selected as a function of expected I/O sizes for the different operation types. For example, P7 and P10 may be determined as a function of the expected I/O size of the RRM operations with respect to the extents for which the promotion score is being determined. P8 and P11 may be determined as a function of the expected I/O size of the W operations with respect to the extents for which the promotion score is being determined. P9 and P12 may be determined as a function of the expected I/O size of the SRM or P operations with respect to the extents for which the promotion score is being determined.

Values for P7-P12 may be based on each storage tier and drive technology depending on the sensitivity of response time to I/O size. Thus, the drive technology may be used in selecting that particular values for P7-P12 such as using curves of FIGS. 18D and 18E where the more sensitive or greater dependency between response time and I/O size, the greater the variation in values of the bias or weights assigned.

The demotion score for an extent may be represented in EQUATION 5 as:

$$(P4*P10*s\_rrm)+(P5*P11*s\_w)+(P6*P12*s\_p)+\\(P1*P7*1\_rrm)+(P2*P8*1\_w)+(P3*P9*1\_p)$$

where s_rrm, s_w, p1, etc. are as set forth above.

As noted above in connection with the exemplary EQUATIONS 4 and 5 for computing, respectively, the promotion and demotion scores, the same set of coefficients may be used. Alternatively, the system described herein may, however, use a different set of coefficients for computing the promotion and demotion scores.

In a multi-tiered storage system as described herein, an application having its data stored on thin devices of a storage group may be allowed to use multiple tiers of storage. In order to be able to use the storage of the tiers efficiently and also move a minimal number of chunks between tiers, chunks which are the most active or "hot" need to be located in the higher tiers (e.g., promoted to such tiers if not already located there) and chunks which are least active or "cold" need to be located in lower storage tiers (e.g., demoted to such tiers if not already located there). After identifying the hot and cold chunks, processing may be performed to determine how much of the hot chunks should be placed in the different storage tiers in order to efficiently utilize the higher performing tiers, such as flash tiers, while also avoiding overloading any given tier with I/O request or I/O transfer activity to the point that overall performance (e.g., across all tiers in the AP, across one or more SGs, for the whole data storage system, and the like with respect to the physical devices under consideration) would have been better had less of the workload been placed in the tier. Determining promotion and demotion thresholds of a data movement policy that may be associated with one or more SGs. The data movement policy as described herein in the context of thin devices affects what data portions of thin devices are data movement candidates and may be moved to another tier. The selection of promotion and demotion thresholds may be made by considering criteria including performance limits (e.g., response time, number of I/Os per time period, and the like) and capacity limits. The performance limits may be flexible or adaptable and specified for each storage tier. The capacity limits may also be specified for each storage tier and may include capacity limits included in an AP for the affected one or more SGs. Response time of target storage tiers may be modeled when evaluating different alternative hypothetical considerations in which performance limits are varied for each tier when selecting promotion and demotion thresholds. The different sets of performance limits in combination with capacity limits are evaluated by modeling the expected target tier performance and then determining an overall performance metric representing an aggregate modeled performance metric across all target storage tiers for all affected SGs. In one embodiment, the overall performance metric may be an average response time determined with respect to all target storage tiers using the modeled response time as determined for each such tier. The average response time is used to compare the overall modeled performance for the storage tiers when evaluating different sets of performance limits for each target tier. Each set of performance limits specified for multiple tiers may be used as a way to provide weighting factors for I/O workload distribution across the tiers in order to reflect the performance differences of the different tier storage technologies. Utilizing such "what if" analysis to evaluate different sets of performance limits coupled with capacity limits provides for determining promotion and demotion thresholds that may be used by the DA, or more generally, other backend data storage system components, in connection with performing data movements in accordance with workload or performance impact across all target storage tiers to increase overall performance.

In connection with the system described herein, response time may be considered as performance criteria alone, or in combination with other performance criteria in combination with capacity limits, when determining promotion and demotion thresholds affected what data portions of a thin device may be moved between physical storage devices in different storage tiers. It is possible to consider different performance characteristic information and curves that may vary with each storage tier, type of physical device, device vendor, and the like. In particular, performance curves for the different storage tiers may be determined and used to model target tier and also overall SG performance across storage tiers as part of processing to evaluate different sets of performance limits in combination with capacity limits. As an example, consider a workload of N I/O operations/second. The response time experienced for the same workload varies with storage tier due to the underlying capabilities of each tier's technology. As such, performance curves may be used to model expected response times if a particular data movement is performed in accordance with candidate promotion and demotion thresholds.

Figure 17:
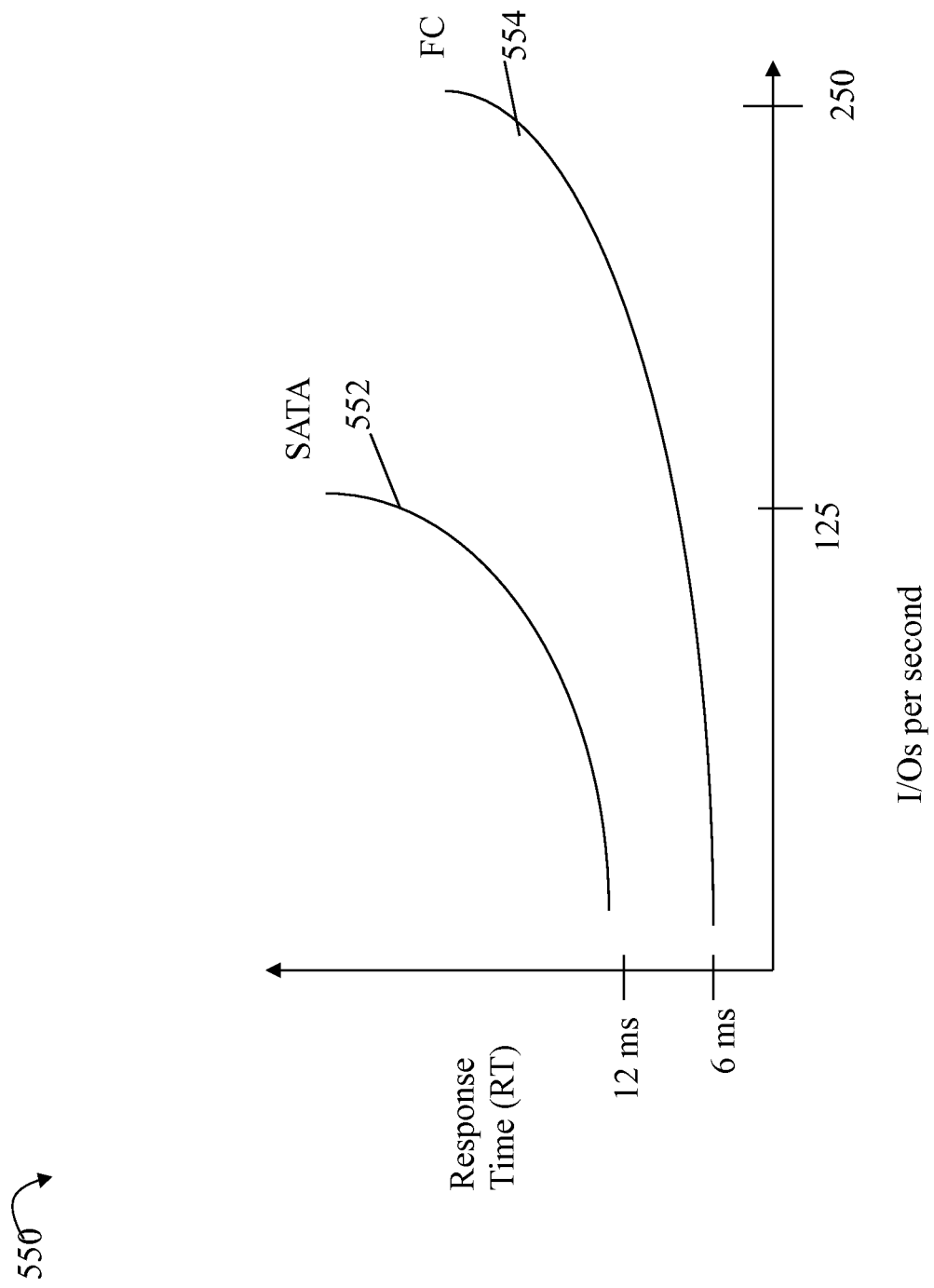
FIGS. 17 and 18A-18E illustrate performance curves that may be used to model device response time and in selection of weights for scoring calculations according to an embodiment of the system described herein.

Referring to FIG. 17, shown is an example of performance characteristic information illustrated in the form of curves for different storage tiers such as may be based on different disk drive types. The example 550 illustrates general curve shapes as may be associated with a SATA drive (as represented by 552) and an FC disk drive (as represented by 554) in connection with processing rate (X-axis in terms of IOs/second) vs. response time (Y-axis). As may be seen from the illustration 550, for a same processing rate of I/Os/second, different RTs are obtained for each of a SATA drive and an FC disk drive. As such, when moving data storage tier of SATA drives to a storage tier of FC drives, differences in performance characteristics such as response times are taken into consideration. The system described herein may store data as represented by the curves of FIG. 17 in one or more tables having rows and columns of data point values (e.g., X and Y coordinates for a plurality of points). When stored in tabular form, interpolation, curve fitting techniques, and the like, may be used in connection with determining values of X and Y coordinates lying between two existing points stored in the table. When considering moving data between devices of different types or more generally having different device characteristics, such tables of performance characteristic information may be used to determine, for a given processing rate of I/Os per second, a modeled RT for each of the different device types. For example, consider a first storage tier of SATA drives and a second storage tier of FC disk drives. In modeling performance based on a proposed data movement, an aggregated or total processing rate for each target tier may be determined, for example, using performance data collected. For such a total processing rate on the X-axis, a corresponding modeled RT value (Y-axis) may be obtained for each storage tier using tables or curves, such as illustrated in FIG. 17. The system described herein may use appropriate performance curves for each of the different storage tiers and associated technologies of the tiers. The performance curves may be obtained for each storage tier based on observed or collected data through experimentation. The particular parameters or metrics of collected data used to obtain performance curves to model expected RT may vary with storage tier and underlying technology. For example, as described in U.S. patent application Ser. No. 12/924,361, filed Sep. 24, 2010, and titled TECHNIQUES FOR MODELING DISK PERFORMANCE, which is incorporated by reference herein, performance curves for modeling response times for disk drives is described using total number of I/Os and I/O size. Other technologies such as flash-based drives may use other parameters in modeling to determine the appropriate performance curve. For example, one approach to modeling flash-based drives may utilize observed performance data related to total number of I/Os, I/O size, and a ratio of read operations/write operations. Additionally, data modeling for different storage drives may utilize a feedback process. At a point in time, there is a set of data representing the performance curve for a particular drive. The actual measured RT of the drive for a given workload in terms of I/Os per second, for example, may be compared to a modeled RT value determined using the performance curve for similar model parameter values. Adjustments may be made to the modeled performance curve based on differences between the measured RT and modeled RT.

In connection with estimating thin device workloads, various metrics that may be used are described herein and also in U.S. Pat. No. 8,583,838, issued on Nov. 12, 2013 and titled TECHNIQUES FOR STATISTICS COLLECTION IN CONNECTION WITH DATA STORAGE PERFORMANCE, which is incorporated by reference herein. Workload for thin devices may be determined in a variety of different ways in connection with determining the contributions of the thin device data portions that may be stored in multiple thin device pools. One approach may be to examine the allocation map and determine the workload of data portions based on I/Os directed to the physical device where such data portions are stored. However, an embodiment of the system described herein may use alternative approaches to estimate thin device workload due to additional resources consumed in connection with use of the allocation map which may adversely impact performance. When data portions of a thin device are moved from a first storage tier to a second storage tier, the related workload of such data portions are moved to the target tier. In one embodiment, storage for thin devices may be evenly distributed across a pool of data devices comprising a thin device pool. This results in even distribution of capacity and I/O workload thereby making it possible to correlate I/O workload and capacity allocation at the pool level rather than reading the allocation map for each thin device. In other words, a workload for a thin device data portion having storage allocated from a thin device pool of data devices may be estimated by collecting thin device pool statistics and then apportioning an amount of the workload indicated by the collected data distributed evenly across all data portions stored in the pool.

In connection with FIG. 17, it should be noted that the performance curve of modeled response time is a function of I/O rate (e.g. IOPS or I/Os per second). Performance curves may also be modeled for response time as a function of IOPS and also I/O size for the different storage tiers (e.g., physical device characteristics of physical devices in a particular tier).

Figure 18A:
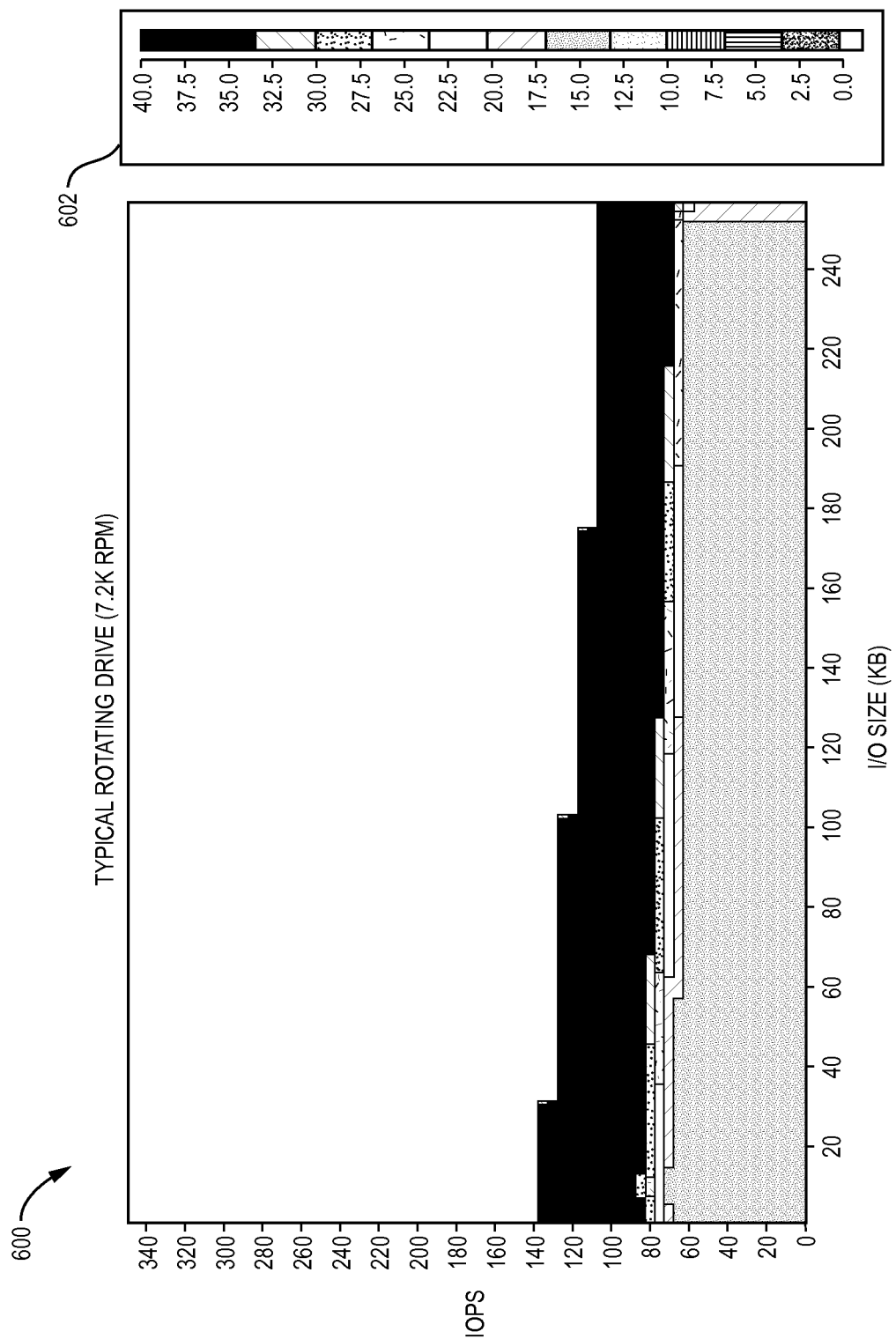

Referring to FIG. 18A, shown is an example 600 illustrating a performance curve for modeled response time as a function of IOPS (Y-axis) and I/O size (average for physical drive in kilobytes (KBs)) for a 7.2K RPM rotating drive. Element 602 illustrates a scale of response times from 0-40 milliseconds where the particular pattern indicated on the scale for a response time is denoted on the X-Y graph of 600 for various combinations of IOPs and I/O sizes. Based on the example 600, it may be generally observed that the I/O size does not have a significant or substantial impact on response time (e.g., response time is not highly dependent on, or sensitive to changes in, I/O size) for the particular physical drive.

Figure 18B:
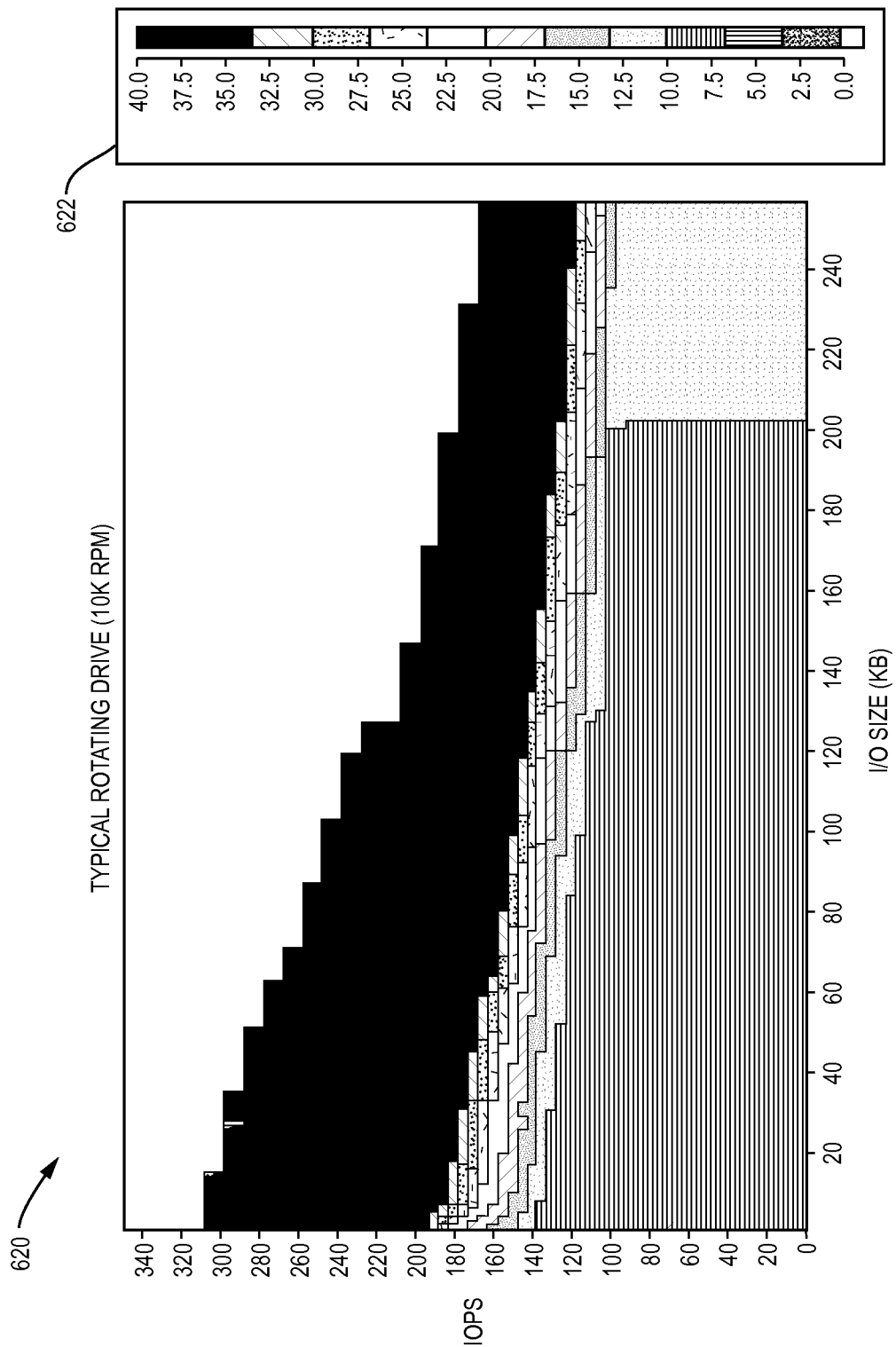

Referring to FIG. 18B, shown is an example 620 illustrating a performance curve for modeled response time as a function of IOPS (Y-axis) and I/O size (average for physical drive in kilobytes (KBs)) for a 10K RPM rotating drive. Element 622 illustrates a scale of response times similar to 602 where the particular pattern indicated on the scale for a response time is denoted on the X-Y graph of 620 for various combinations of IOPs and I/O sizes. Based on the example 620, it may be generally observed that I/O size for the 10K RPM rotating disk drive has a slightly greater dependency than that of FIG. 18A but that the I/O size for the 10K RPM does not have a significant or substantial impact on response time (e.g., response time is not highly dependent on, or sensitive to changes in, I/O size) for the particular physical drive.

Figure 18C:
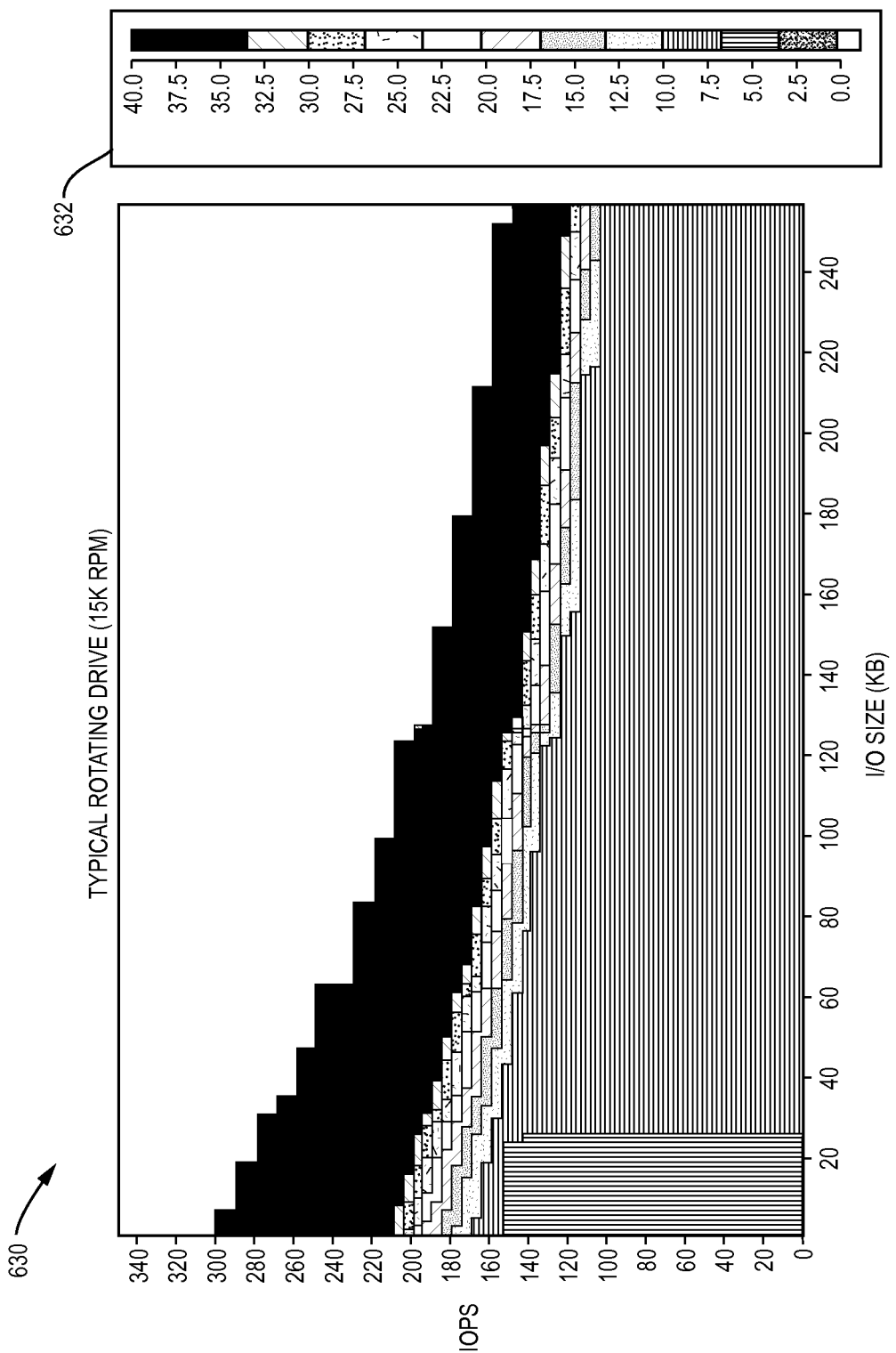

Referring to FIG. 18C, shown is an example 630 illustrating a performance curve for modeled response time as a function of IOPS (Y-axis) and I/O size (average for physical drive in kilobytes (KBs)) for a 15K RPM rotating drive. Element 632 illustrates a scale of response times similar to 602 where the particular pattern indicated on the scale for a response time is denoted on the X-Y graph of 630 for various combinations of IOPs and I/O sizes. Based on the example 630, it may be generally observed that I/O size for the 15K RPM rotating disk drive has a slightly greater dependency than that of the 10K RPM drive of FIG. 18B but that the I/O size for the 15K RPM does not have a significant or substantial impact on response time (e.g., response time is not highly dependent on, or sensitive to changes in, I/O size) for the particular physical drive.

Figure 18D:
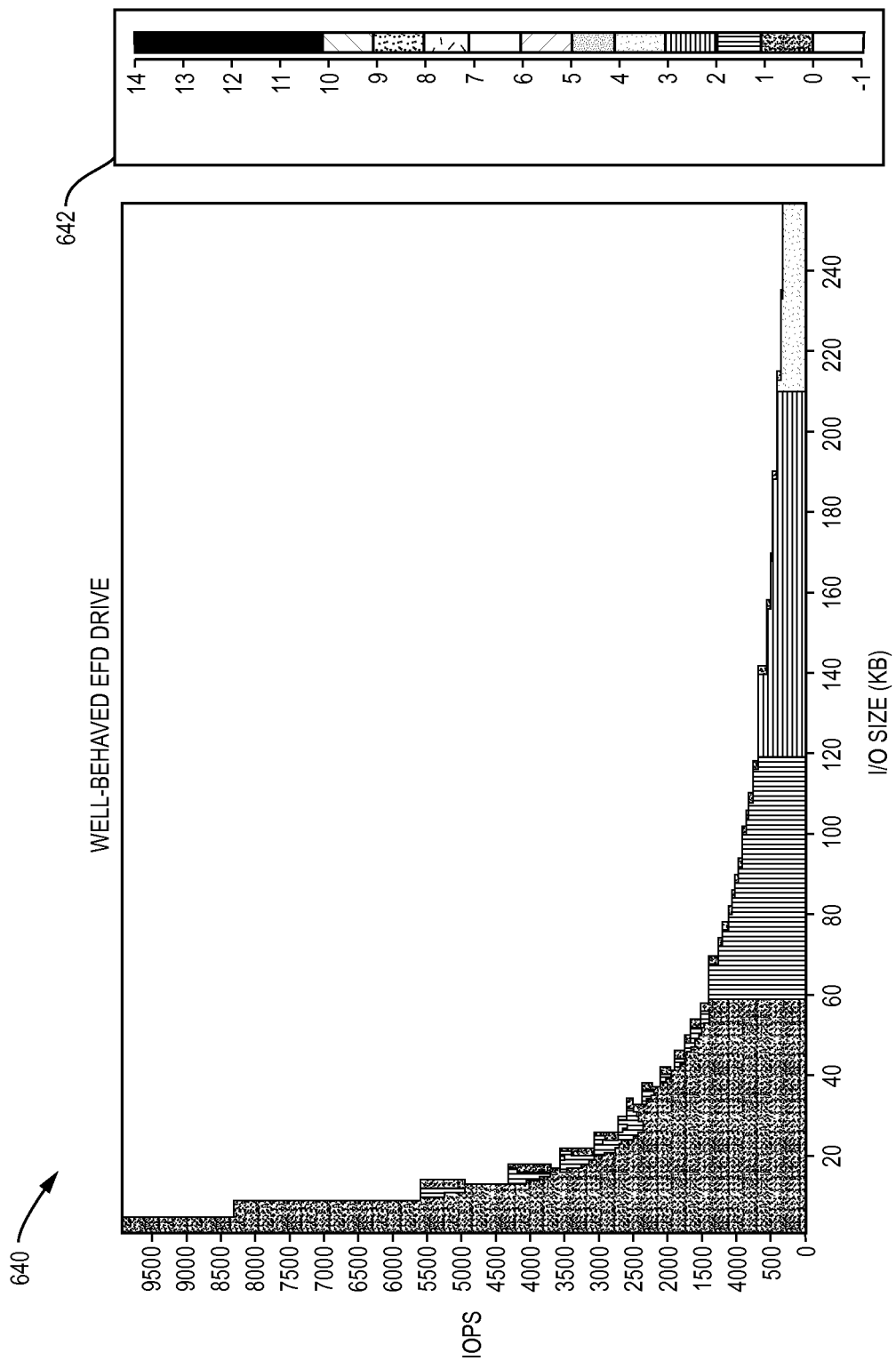

Referring to FIG. 18D, shown is an example 640 illustrating a performance curve for modeled response time as a function of IOPS (Y-axis) and I/O size (average for physical drive in kilobytes (KBs)) for an exemplary SSD drive such as an EFD. Element 642 illustrates a scale of response times similar to 602 where the particular pattern indicated on the scale for a response time is denoted on the X-Y graph of 640 for various combinations of IOPs and I/O sizes. Based on the example 640, it may be generally observed that I/O size for the EFD has a significant or substantial impact on response time (e.g., response time is highly dependent on, or sensitive to changes in, I/O size) for the particular physical drive.

Figure 18E:
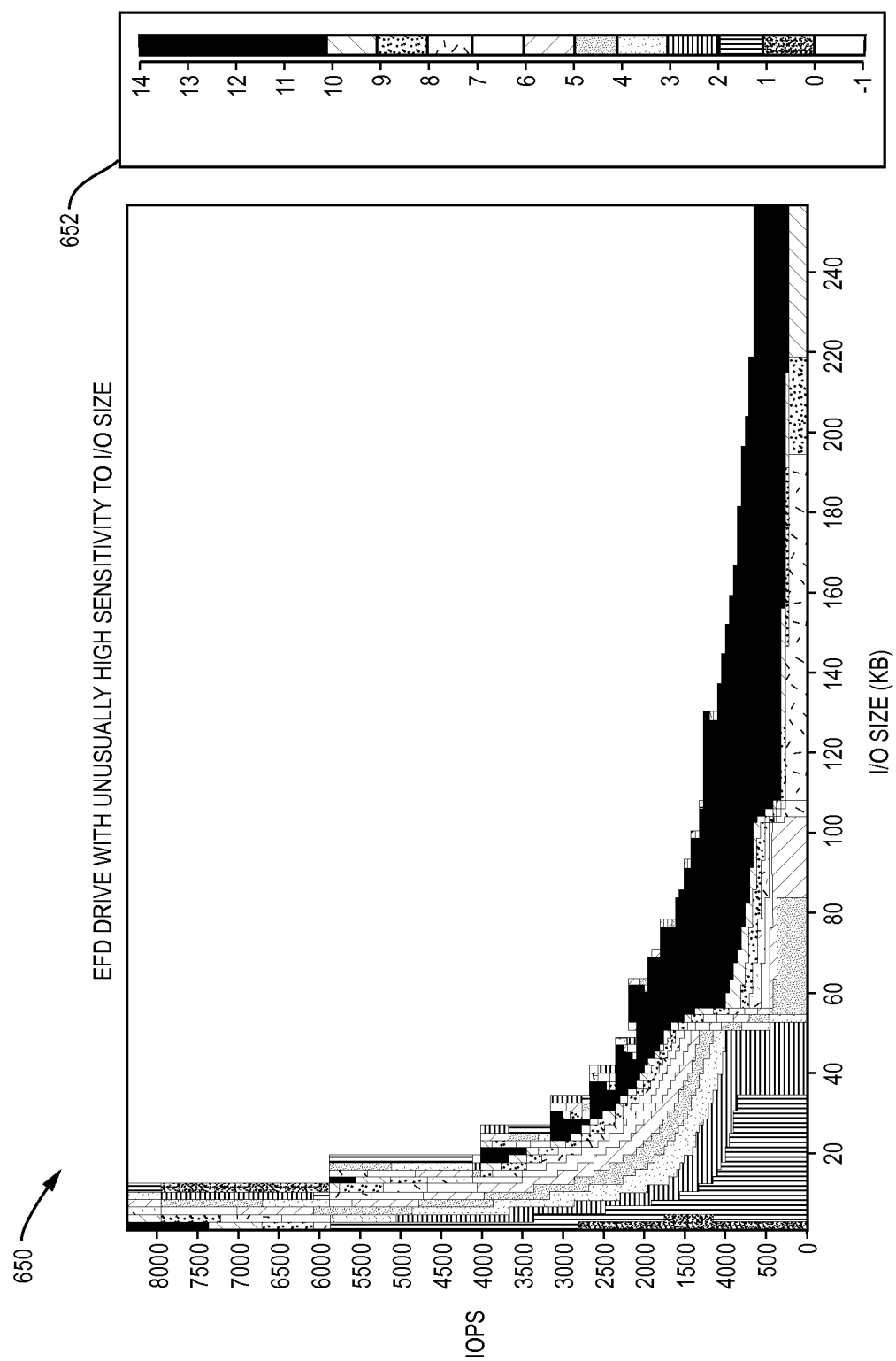

Referring to FIG. 18E, shown is an example 650 illustrating a performance curve for modeled response time as a function of IOPS (Y-axis) and I/O size (average for physical drive in kilobytes (KBs)) for another exemplary SSD drive such as an EFD. The example 640 of FIG. 18D may represent the modeled performance curve for one type of EFD such as by one vendor based on one vendor's technology and implementation and the example 650 of FIG. 18E may represent modeled performance curve for another type of EFD such as by a different vendor or EFD drive with different performance characteristics than that modeled in FIG. 18D. Element 652 illustrates a scale of response times similar to 602 where the particular pattern indicated on the scale for a response time is denoted on the X-Y graph of 650 for various combinations of IOPs and I/O sizes. Based on the example 650, it may be generally observed that I/O size for the EFD has a significant or substantial impact on response time (e.g., response time is highly dependent on, or sensitive to changes in, I/O size) for the particular physical drive.

As such, based on the performance curves of FIGS. 18A-18E, the system described herein may select values for coefficients or weights P7-P12 when determining various promotion and demotion scores in connection with following techniques based on the target storage tier. The target storage tier may be the tier for which processing is performed to select data portions for movement to the target tier. In other words, if processing is determining which data portions may be moved to, or stored on, the flash or SSD tier, values for P7-P12 may be selected in accordance with the expected I/O sizes for each of the I/O operation types as described above. If processing is determining which data portions may be moved to, or stored on, rotating disk drives or, more generally, on a tier including non-flash drives or non-SSD drives, values for P7-P12 may be selected as 1 to reflect the fact that there is not a substantial dependency of I/O size for the particular drive on response time.

In connection with estimating modeled response times, performance curves such as that of FIGS. 17, and 18A-18E may be used based on the particular parameters considered when modeling the response times. For example, the system described herein may use FIGS. 17 and 18A-18C when modeling response times for promotion and demotion scores used with P7-P12 having values of 1 for different types of rotating disk drives. The system described herein may use FIGS. 18D-18E when modeling response times for promotion and demotion scores used with P7-P12 having values of determined as a function of I/O sizes.

The determination of the optimal tier for each extent of storage is driven by the goal of maximizing the chances of achieving storage performance objectives. This goal will tend to be achieved if the storage system can arrange for the largest share possible of the storage request workload to be serviced by the highest performing storage tiers. In connection with the system described herein, scores, such as the promotion and demotion scores, may be metrics or measurements used to drive this determination process where such scores may be calculated for each storage extent. The input to the calculation is information about the expected storage request workload that the storage extent will receive. The promotion and demotion scores as described herein provide a measure of how 'well suited' a storage extent is for placement on a first higher performing storage tier as opposed to a second lower performing storage tier. If the promotion and demotion scores used for the storage tiers are defined properly, then for a first promotion score used when determining what extents to store in an EFD storage tier, if storage extent or portion A has a higher promotion score than storage extent B, then storage extent A is better suited for placement on the EFD tier than storage extent B. Of key importance here is how the system described herein quantifies 'well suited'. Informally, a storage extent should be considered more 'well-suited' for a high tier, such as an EFD tier, if placing the storage extent on the high tier tends to allow a greater number of storage requests (especially RRM requests) to be packed into the high tier. The foregoing provides for use of scores or metrics which guide the selection of the best extents to place on the different tiers.

The use of promotion and demotion scores with properly selected weights or coefficients P1-12 allows the storage system to identify the best extents to place in the different storage tiers in a computationally efficient manner. As described herein, for example, processing may be performed to sort the storage extents according to their promotion scores as may be used when determining which extents are best suited for the EFD storage tier. A sufficient number of the extents with the highest promotion scores may be selected to fill the EFD tier based on any one or more of storage capacity limits and/or performance limits for the EFD tier. Similarly, other tiers may be filled with selected extents using scores determined using other values for weights P1-P12 selected for non-EFD tiers. This approach has the important property that it scales well to configurations involving very large numbers of storage extents.

As described above, the promotion and demotion scores may have values selected for P7-P12 (e.g., for the size or data transfer weights) to express any existing dependency of the score on I/O size. Weights P7-P12 may have values selected which are always 1 for non-EFD tiers or, more generally, for those storage tiers having drives which do not have a substantial affect on response time or other performance metric used to measure system performance.

To illustrate how values for P7-P12 may be selected for an EFD tier where such values for the EFD tier may not always be 1 and may depend on the expected storage tier workload characteristics and the particular performance characteristics of the drives in the high tier, consider the case of a multi-tier storage configuration that includes a storage tier comprised of Enterprise Flash Drives (EFDs). Generally speaking, EFD drives are considered high performing because they are particularly efficient at I/O operation processing (much more so than rotating drives are). However, the data transfer rates supported on EFD drives are not correspondingly large in comparison to data transfer rates for rotating disk drives. As known in the art, data transfer rate or throughput may be characterized as the speed at which data can be transferred between devices. For example, data transfer rates may be expressed in terms of Mbps (amount of data transferred for given unit of time). As such, the system described herein may perform processing to select values for P7-P12 dynamically for the EFD tier by considering the expected workload on the EFD storage tier and the specific performance characteristics of the EFD drives underlying the EFD storage tier. For example, if the expected workload on the EFD storage tier is light enough that the data transfer limits of the EFD drives will not be approached, then the system described herein select size weights (e.g., values of P7-P12) for use with EQUATION 4 that are one to thereby allow the greatest number of storage requests to be packed into the available storage capacity in the EFD storage tier (i.e., the system described herein may use a function for EQUATION 4 that assigns a value of 1 to parameters P7-P12). If the expected workload on the EFD storage tier is heavy enough to approach the data transfer limits of the EFD drives, then the system described herein may select size weights (e.g., values of P7-P12) for use with EQUATION 4 that place greater weight on storage requests with small I/O sizes will allow the greatest number of storage requests to be packed into the available data transfer capacity of the EFD storage tier (e.g., the system described herein may use a function for EQUATION 4 that assigns larger values to parameters P7-P12 for data portions with smaller I/O size).

The system described herein may use models of drive performance to determine whether the performance of the drives in a storage tier is data transfer limited, and the values for P7-P12 may be assigned accordingly as a function of varying I/O size for the different operation types as described elsewhere herein. With scores for the EFD storage tier, there is a preference to have extents in this EFD tier which have higher IOPS of smaller sizes. Therefore, the system described herein may select values for P7-P12 providing a bias or greater weight to a short term or long term metric when the operation type (e.g., RRM, SRM, or W) has smaller expected I/O sizes.

To illustrate how the system described herein may select values for P1-P6 (e.g., operation type weights) for use in the scores for a tier where such values for P1-P6 may depend on the expected storage tier workload characteristics and the particular performance characteristics of the high tier drives, let us again consider the case of a multi-tier storage configuration that includes a storage tier comprised of EFDs. Suppose performance of a particular type of EFD drive is particularly sensitive to the amount of write activity on the drive, with performance degrading for larger amounts of write activity. The system described herein may take this into account when selecting values for P1-P6. For example, consider a first case where, if the total amount of write workload that may be delivered to the EFD storage tier is light enough to not degrade the performance of the EFD drives, then the scores calculated for the EFD tier may use a small positive (or zero) values for P2 and P5 associated, respectively, with the short term and long term W statistics (e.g., s_w and 1_w from EQUATIONS 4 and 5), and relatively large values for P1 and P4 associated, respectively, with the short term and long term RRM statistics (e.g., s_rrm and 1_rrm from EQUATIONS 4 and 5), since this allows the greatest number of RRM requests to be packed into available EFD storage. However, consider a second alternative case wherein, if the total amount of write workload that may be delivered to the EFD storage tier is heavy enough to degrade the performance of the EFD drives, then the scores may select lower (e.g., in comparison to those for the first case) or negative values for P2 and P5 associated with the short term and long term W statistics, and yet larger values for P1 and P4 (e.g., larger than in the first case) associated, respectively, with the short and long term RRM statistics. This selection in the second case allows the greatest number of RRM requests to be packed into available EFD storage. The system described herein may use models of drive performance to determine whether the performance of the drives in a storage tier is write performance limited, and values for P1-P6 may be assigned accordingly.

More generally in connection with selecting values for P1-P6 of the scores, values may be selected depending on how much preference is given to provide better performance (such as better response time) for a particular operation type (e.g., R vs. W, or preference ordering of multiple types RRM, SR, and W). For example, the system described herein may give higher weight to RRM over W since it is more likely that there is an application waiting for the data of the RRM operation to complete before the application can further proceed with processing. The system described herein may give less weight to sequential read (SR) operations than RRM operations. Write operations and associated statistics in the scores may be given the least relative weight because a waiting host or application performing the write may receive an acknowledge that the operation is complete once the write data is written to cache rather than having to wait for data to be read from a physical drive as with any type of read miss operation (e.g., RRM and SR collectively).

As discussed elsewhere herein, policies may be used to determine when to promote data (map the data to a relatively faster tier) and when to demote data (map the data to a relatively slower tier). In particular, one such policy is a data movement policy based on promotion and demotion thresholds that may be determined using promotion and demotion scores for data portions. In an embodiment of the system described herein, this may be performed by first determining a score for different portions of a storage space based on relative activity level and then constructing promotion and demotion histograms based on the different scores and the frequency of each. In connection with thin devices, each of the data portions may correspond to a logical extent for which such scores are determined. Exemplary ways in which the promotion and demotion scores may be calculated are described above. The promotion and demotion scores may be used, respectively, in connection with the promotion and demotion histograms described below in more detail. Generally, the scores may be characterized as reflecting the I/O benefit to the host application and cost (e.g., in terms of performance bandwidth) to the targeted storage device tier. In connection with constructing the histogram, all extents are ordered or sorted according to their scores, from highest to lowest. Those extents having the highest scores are generally those preferred to be selected for having storage allocated from the highest performing tier. The histogram is one way in which such scores may be sorted and utilized in connection with the system described herein. It will be appreciated by those of ordinary skill in the art that there are alternative ways to define and compute the scores than as described herein. In one embodiment the system described herein, the scores may be computed differently for promotion and demotion to reflect the difference in criteria related to data movement into and out of storage tiers.

For purposes of illustration, consider an example of a single SG which may use a group of data devices, and thus physical devices, in three thin device pools—one for each of three storage tiers such as illustrated in FIG. 11. Workload statistics such as described in connection with FIG. 14 may be computed for each extent and a promotion score may be calculated for each extent in the SG. Also, assume that only thin devices managed in accordance with the system described herein for which data movement may be performed are located in the SG and use the foregoing thin device pools. In this example, the three storage tiers may include a first storage tier of EFDs, a second storage tier of FC rotating disk drives and a third storage tier of rotating SATA disk drives where storage tiers 1-3 are correspondingly ranked highest to lowest as performance tiers.

In connection with the system described herein, assume a first set of promotion scores are determined using a first promotion score having weights or coefficients selected for the first or highest storage tier to be filled, the EFD storage tier. A first promotion histogram described below in connection with FIG. 19 may be produced using the first set of promotion scores for filling the EFD storage tier.

Figure 19:
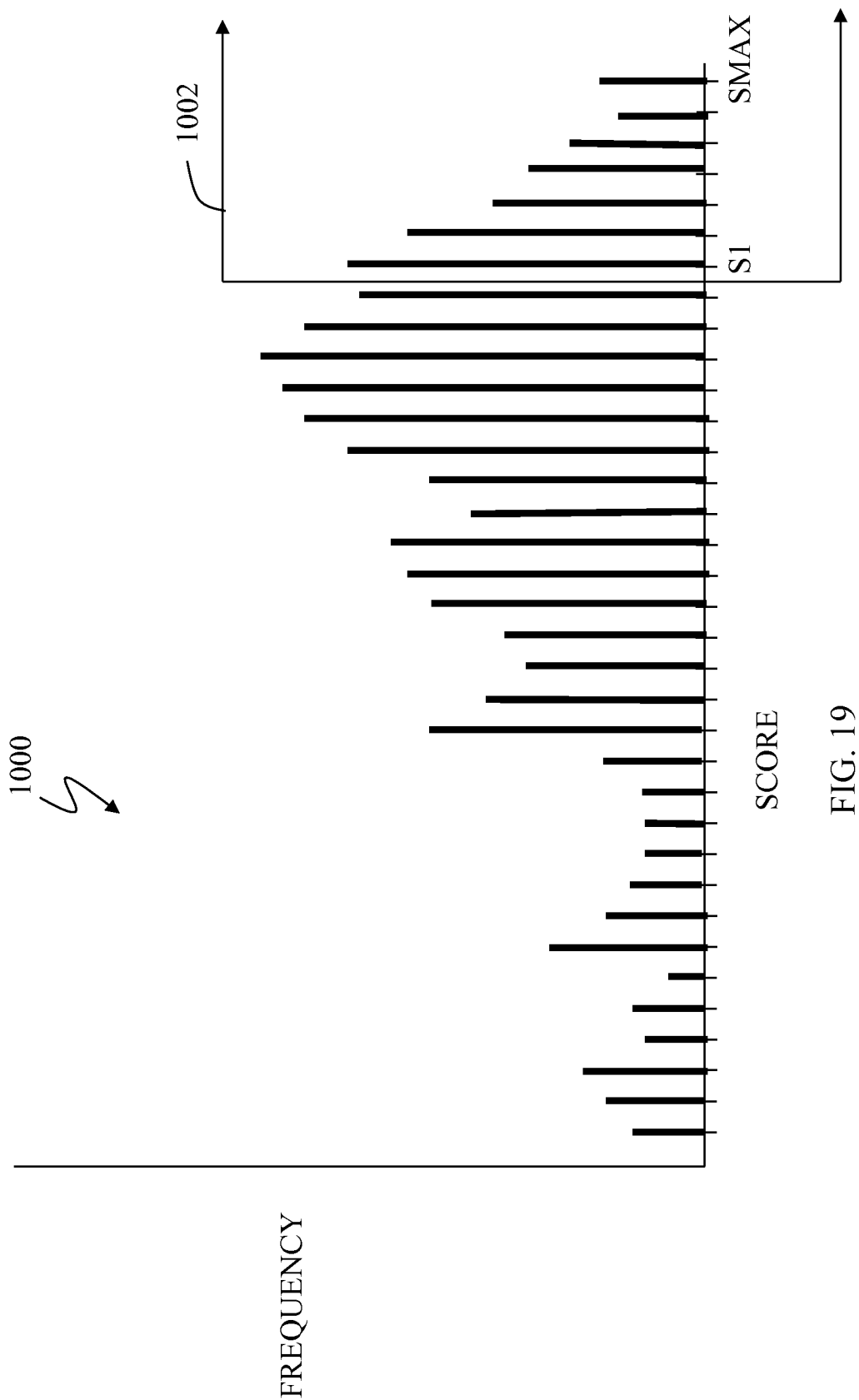
FIGS. 19 and 20 illustrate histograms that may be used in threshold selection according to an embodiment of the system described herein.

Referring to FIG. 19, a histogram 1000 illustrates a plurality of activity bins (buckets) and the frequency thereof. Each vertical line of the histogram 1000 represents a bin corresponding to a number of data portions (e.g., extents) having the corresponding score. Determination of a score for a data portion is discussed in more detail elsewhere herein. In an embodiment the system described herein, there are five thousand bins. Of course, a different number of bins may be used instead. The height of each bin represents a number (frequency) of data portions having a particular score. Thus, the longer a particular vertical line, the more data portions there are having the corresponding score. Note that the sum of all of the frequencies of the histogram equals the total number of data portions of the system. Note also that the sum of frequencies of a portion between a first score and a second score equals the total number of data portions having a score between the first and second scores. As such, the total capacity allocated for a particular bin assuming a fixed size data portion may be determined as the mathematical product of the frequency of data portions in the bin (of those data portions having allocated storage) and the size of a data portion. If the data portions in a bin may have varying size, then such sizes corresponding to the allocated storage amounts for the data portions may be summed to determine the total capacity of storage allocated for the bin. In a similar manner, the modeled response time (e.g., average) for the total cumulative workload (e.g., total I/Os/second) and optionally also based on I/O size of those data portions may be determined. The histogram 1000 also shows a first range indicator 1002 that corresponds to bins having a score from S1 to SMAX (the maximum score). In the embodiment the system described herein, there are three levels or tiers of physical storage and data portions of the thin device having a score corresponding to the first range indicator 1002 are promoted (mapped) to a highest (fastest) level of storage and data portions having a score corresponding below S1 are mapped to other storage tiers described below. Thus, S1 may represent the promotion score corresponding to the promotion threshold for the first or highest storage tier so that all data portions having a score at or above S1 are promoted to the highest storage tier, or otherwise considered a candidate for such promotion if not already located in the highest storage tier.

In a similar manner, for those extents or data portions which do not have first promotion scores at or above S1, a second set of new promotion scores may be determined whereby each promotion score of the second set is based on a second promotion score using values for P1-P12 selected for the next fastest or second storage tier to be filled (e.g., the FC rotating disk drive tier in this example). As described herein, values for P7-P12 may all be 1 with values for P1-P6 selected as may be determined dynamically or based on fixed values. Based on these new second promotion scores, a second promotion histogram is constructed as described in connection with FIG. 19 with the differences that 1) the scores are the second promotion scores for those data portions not previously mapped to the first storage tier using the first promotion histogram, and 2) the threshold S1 now denotes the promotion score corresponding to the promotion threshold for the second storage tier (next fastest) so that all data portions having a score at or above S1 are promoted to the second storage tier, or otherwise considered a candidate for such promotion if not already located in the second storage tier. Since this example only includes three storage tiers, those data portions having a second promotion score below the threshold are mapped to (stored in) the lowest or third storage tier of SATA drives.

It should be noted that above-noted two promotion histograms of FIG. 19 used in connection with promotion scores and also in connection with demotion histograms such as in FIG. 22 (described below) in connection with demotion scores may include scores for all data portions under consideration or analysis. For example, as described elsewhere herein in connection with other examples, the system described herein may be performed with respect to a number of storage groups of thin devices having their storage allocated from one or more storage pools so that the thin devices have storage allocated from a set of physical drives. In this case, the histograms may include scores with respect to the foregoing data portions of the number of storage groups under consideration and evaluation with the system described herein.

It should be noted that a system using a histogram may select a suitable number of bins or buckets and an interval for each such bin. In one embodiment, the size of each bin may be driven by a selected number of bins with each bin having the same size. Additionally, the system described herein may use different techniques in connection with mapping or converting the promotion and demotion scores to indices associated with histogram bins. For example, it is possible to use linear scaling to set a lower boundary for buckets having an associated index lower than a selected pivot value and may use logarithmic scaling to set a lower boundary for buckets above the pivot. Logarithmic scaling may be appropriate in embodiments having larger scores or a wide range of scores in order to scale the size of scores above the pivot. In such embodiments, the score range associated with a bucket interval above the pivot varies so that a reasonable number of data portions are mapped to the associated bucket. Whether a histogram or other suitable technique is used may vary with the number of buckets, the number of data portions, and the like.

Additionally, it should be noted that rather than have a histogram with frequency on the Y-axis as in FIG. 19, the system described herein may represent the total allocated capacity on the Y-axis of the number of data portions having scores within a particular bin. In other words, the height of the bucket or bin represents the total allocated capacity of the scores mapped to that bin. Other representations are possible besides histograms in connection with determining promotion thresholds and also demotion thresholds as described elsewhere herein in more detail.

In connection with determining the first tier promotion threshold S1 of FIG. 19, processing is performed to map a number of data portions to the highest performing tier in accordance with criteria including a combination of one or more capacity limits and one or performance limits. A capacity limit may be specified for each storage tier for the SG in an AP associated with the SG as described above. Additionally, a capacity limit indicating the physical maximum amount of storage capacity as a physical characteristic of the drives may also be considered since it may be possible in some embodiment to exceed the maximum capacity of the drives prior to exceeding the capacity limits in accordance with an AP. Additionally, one or more sets of performance limits may be specified for each storage tier. In one embodiment, performance limits may be specified in terms of response time for each tier. The system described herein may define one or more sets of predetermined response time performance limits for storage tiers where such sets of response time limits may also referred to as performance or comfort zones. Each set contains a response time limit for each storage tier that may be the target of promotion. In one embodiment, limits are not specified for the bottom tier. In one embodiment, seven comfort zones may be specified where each zone includes a response time limit for the first highest performing storage tier, such as flash-based tier, and the second highest performing tier, such as FC disk drives. For example, the following response time performance limits may be specified for seven comfort zones in the embodiment having 3 storage tiers:

| Comfort Zone | EFD/flash Response Time (ms) | FC disk Response Time (ms) |
| --- | --- | --- |
| 1 | 1 | 6 |
| 2 | 2 | 10 |
| 3 | 3 | 14 |
| 4 | 4 | 18 |
| 5 | 6 | 25 |
| 6 | 8 | 40 |
| 7 | 10 | 50 |

Of course, the system described herein may provide any number of comfort zones more or less than seven and for a different number of storage tiers. Additionally, the foregoing values are exemplary and may vary with technology, drive vendor, and the like. Generally, values specified as the performance limit metrics, such as response times, may vary with the workload and/or other workload characteristics (such as I/O size) of a particular system and may be determined in any suitable manner. For example, values for the foregoing metrics may be made based on knowledge regarding particular workload of a system and typical performance of drives of different storage tiers in a system. In this manner, limits specified may be realistic and in accordance with typical workload performance within a system. It should be noted that the foregoing limits may also be selected based on end user performance requirements. Additionally, as noted elsewhere herein, although response time is used as the workload or performance metric in connection with the foregoing comfort zones, other performance criteria metrics may be used in combination with, or as an alternative to, response time. For example, the system described herein may use utilization as a metric in a manner similar to response time in connection with the system described herein. That is, just as comfort zones include response time limits for storage tiers, comfort zones may include other criteria such as a utilization for each storage tier. As known in the art, utilization of a resource, such as a physical drive or with respect to physical drives of a storage tier, may be defined as a metric measuring an amount of time a device is utilized or in a non-idle state. For example, utilization for a storage tier may be represented as a percentage (e.g., based on a ratio of an amount of time the physical devices of the storage tier are in the non-idle state/total amount of time). The foregoing utilization metric may represent the average utilization for a storage tier determined over a period of time.

Generally, processing may be performed to determine a set of promotion thresholds for the different storage tiers (e.g., S1 of FIG. 19) in accordance with criteria including capacity limits and a set of performance limits for a single comfort zone. In connection with the above-mentioned first promotion histogram used when mapping data portions to the first or EFD storage tier, processing traverses the first promotion histogram, from highest score to lowest score, mapping data portions to the first storage tier until either the capacity limit for the first storage tier is reached or until the response time performance limit for the first storage tier is reached. Similarly, in connection with the above-mentioned second promotion histogram used when mapping data portions to the second of FC storage tier, processing traverses the second promotion histogram, from highest score to lowest score, mapping data portions to the second storage tier until either the capacity limit for the second storage tier is reached or until the response time performance limit for the second storage tier is reached.

For each storage tier, a performance counter is maintained indicating a modeled current I/O processing rate (e.g., total IOPS) and associated modeled response time based on those data portions currently mapped to the storage tier. As described elsewhere herein, performance curves such as illustrated in FIGS. 17 and 18A-18E may be used in modeling current performance for each storage tier based on data portions currently mapped to the storage tier when traversing the histogram scores. As each bucket or bin of the histogram has its data portions mapped to the first storage tier, the performance counter (indicating an updated modeled tier RT) is updated to reflect the modeled performance for the first storage tier as also including the additional data portions of the bucket now newly mapped to the first storage tier. For example, as a bucket of data portions is mapped to the first storage tier, the performance or workload information attributed to the newly added data portions in combination with those data portions already mapped to the first storage tier may be input to the appropriate storage tier performance model to determine a modeled aggregate response time. For example, as described above, one disk performance model for SATA and FC disk drives may use as the following as modeling inputs—total number of I/Os (e.g., used to determine the number of I/Os per second or other unit of time) and I/O size (or average I/O size of the total number of I/Os considered)—as collected or observed for the data portions. With these modeling inputs for the aggregated data portions mapped to the first storage tier, the modeling technique may use performance curves to determine an estimated or modeled response time for the physical storage devices in the storage tier based on the aggregate workload of the existing data portions currently mapped to the first storage tier and the additional data portions now also mapped to the first storage tier. In a similar manner, processing may track the current amount of storage of the first tier consumed via the mapping so far. After each bucket of data portions is additionally mapped to the first storage tier to hypothetically represent or model movement of such data portions to the first storage tier, a determination may be made as to whether any of the capacity limits or the response time performance limit for the first tier has been reached or exceeded. If so, the score associated with the current bucket is the promotion threshold. Thus, all data portions in buckets higher than the current bucket (e.g., scores exceeding that of the current bucket) are candidates for promotion to the first storage tier. It should be noted that in connection with the foregoing promotion threshold, the score used as the promotion threshold may be the upper limit of the bucket interval (e.g., score range) for the current bucket at which at least one of the capacity limits or response time performance limits was exceeded during histogram traversal.

In connection with response time performance modeling for a storage tier, as described elsewhere herein with thin devices, the additional I/Os associated with the data portions being added (via mapping) to a storage pool of a particular storage tier may be modeled as being evenly distributed across drives of the storage pool. In the simplified example described herein with only a single storage pool, the modeled storage pool response time is also the modeled storage tier response time. In the event of multiple storage pools in a single tier where all such pools are used by the SG, the system described herein may choose to evenly distribute the added I/O operations across all drives of the storage pool. As described elsewhere herein, a simplifying assumption is that there are no other consumers of the storage tier capacities than those thin devices under device management using the system described herein. In the event that there are other types of devices having associated data stored on the storage tiers, the amount of storage consumed and the workload of such device may be considered when determining whether capacity and performance limits have been reached. It should be noted that the even distribution modeling as described above may reflect that which is actually performed by the storage tiers and devices therein being evaluated in connection with thin device storage allocation. If the system allocates thin device storage in a different manner, then such modeling should reflect that which is performed in the system.

In a similar manner, a promotion threshold for the second storage tier is determined by performing processing as described above for the first tier with the difference that the processing is performed for the second storage tier until either the capacity limits or response time performance limit of the first zone are reached for the second storage tier. The foregoing capacity limits and response time performance limits vary with each storage tier. Processing that maps data portions to the second storage tier resumes with the second promotion histogram including new second promotion scores for those unmapped data portions from the previous storage tier processing (e.g., those data portions of the first promotion histogram having first promotion scores below the first storage tier promotion threshold). In this manner, data portions which were not mapped to first tier storage are automatically considered for mapping to storage in the next highest tier. At the end of the second storage tier processing for the current zone, the second storage tier promotion threshold is determined.

Figure 21:
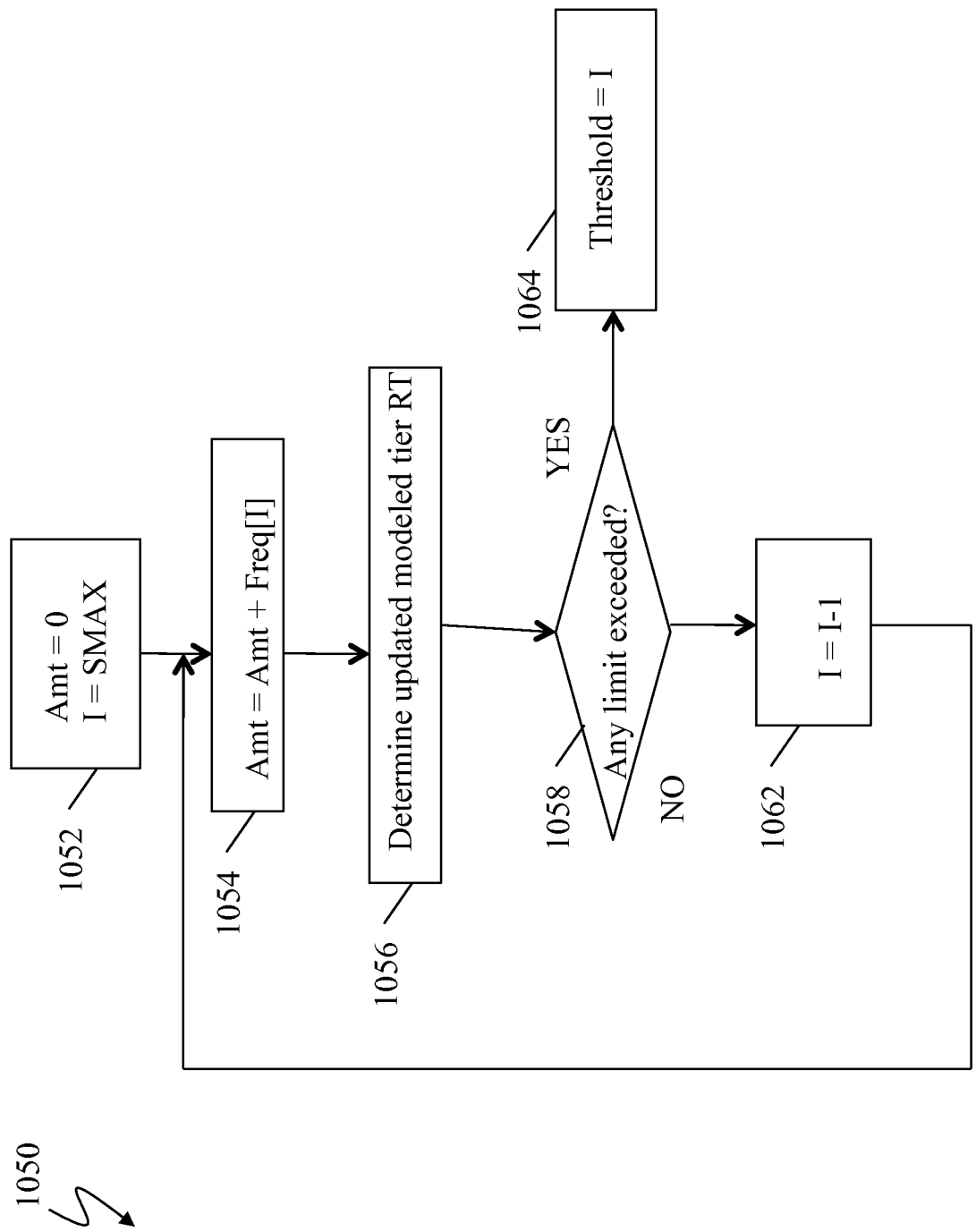
FIG. 21 is a flowchart illustrating processing performed in connection with determining a single promotion threshold for a single target tier according to an embodiment of the system described herein.

Referring to FIG. 21, shown is a flowchart of steps summarizing processing as described above in connection with determining a single promotion threshold for a single target tier using criteria including capacity limits and comfort zone response time limits for the target tier as specified in a single zone of performance limits. Thus, flowchart 1050 may be executed twice to determine, for the first zone, the two promotion thresholds described above respectively for the first and second storage tiers using the first and second promotion histograms.

At step 1052, initialization processing is performed. Step 1052 includes initializing a variable, AMT, that keeps track of the amount of storage portions to zero. Step 1052 also includes initializing an index variable, I, to the maximum score (highest bin). In the system described herein, there are five thousand bins, so I would be set to five thousand at the step 1054. Of course, other numbers of bins are also possible. Following step 1052 is step 1054 where AMT is incremented by FREQ[I], the amount of data mapped to bin I. Following the step 1054 is step 1056 where an updated modeled tier RT (response time) is determined. At step 1058, a determination is made as to whether any of the capacity limits and/or response time performance limit for the current tier have been exceeded. Step 1058 may include comparing the updated modeled tier RT to the response time performance limit for the current zone and current target promotion tier. Step 1058 may include comparing the current amount of capacity of the target tier consumed via the modeled mapping represented by AMT to the AP capacity limit. As described elsewhere herein, the total capacity consumed across one or more bins may be determined based on the cumulative frequencies of those bins and the amount of allocated storage of the data portions in the foregoing one or more bins. Step 1058 may include comparing the current amount of capacity of the target tier consumed via the modeled mapping represented by AMT to the SG capacity limit such as may be based on the physical drive capacity limits. If it is determined at the test step 1058 that none of the established limits have been exceeded, then control passes from the test step 1058 to a step 1062 where the index variable, I, is decremented. Following the step 1062, control passes back to the step 1054 for another iteration. If any one or more of the foregoing limits are exceeded, step 1058 evaluates to yes and control proceeds to step 1064 where a score threshold is assigned the value of I. Data portions having a score of I or higher are promoted to the highest level of storage. Following the step 1064, processing is complete.

The methodology for determining score values used to map data portions (indicating promotion candidates) to one or more intermediate storage levels may be similar to that described above in connection with the flow chart 1050. In the case of second and third intermediate storage levels in the illustrated embodiment with three storage tiers though, processing may be performed with respect to the second promotion histogram. In an embodiment having more than three storage tiers, new promotion scores and an associated new promotion histogram may be computed for a next lower storage tier as may be needed depending on whether a new promotion score is used.

Figure 20:
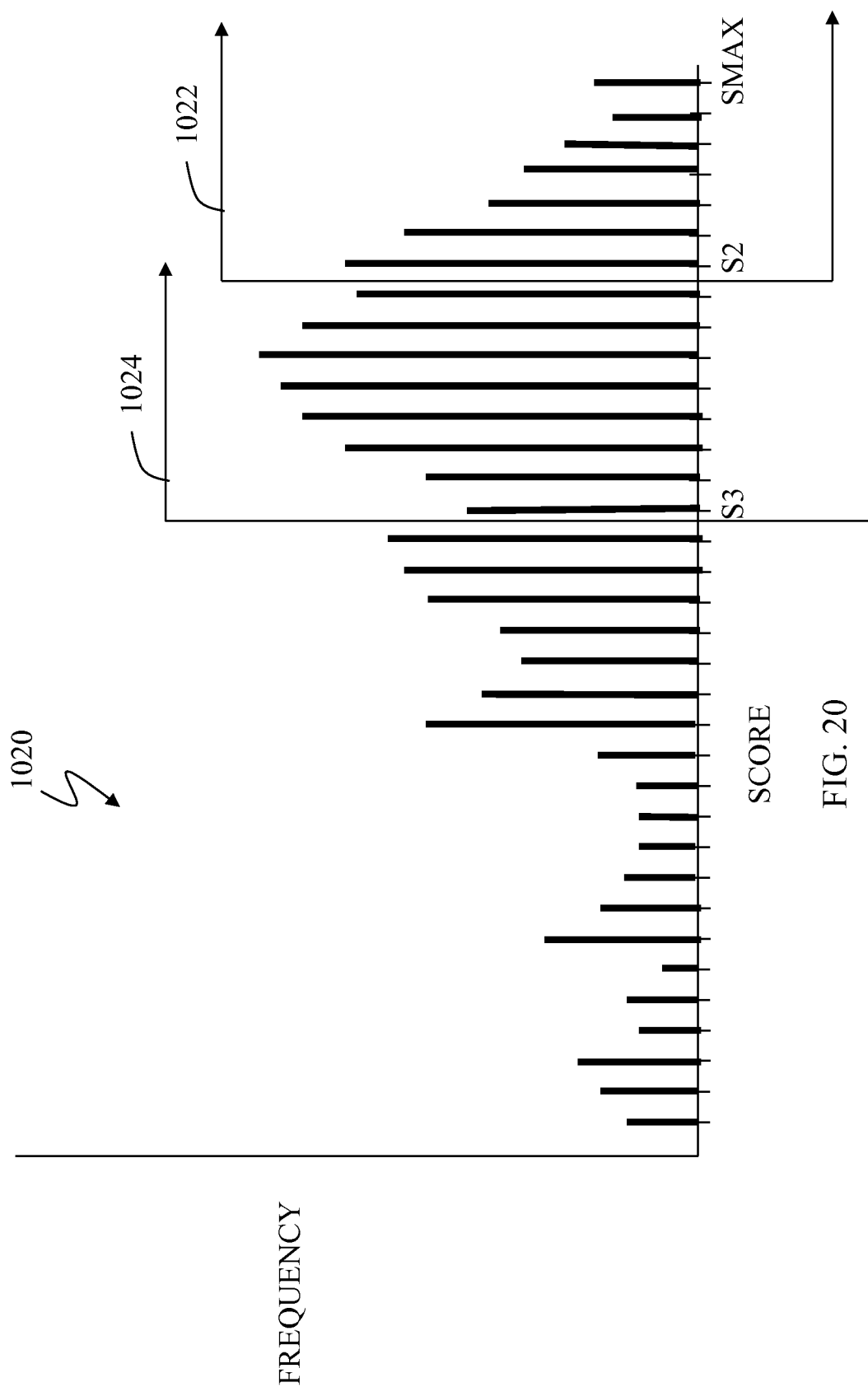

If a same set of promotion scores is used for determining promotion for two storage tiers, the same promotion histogram may be used. For example, consider a case where there are 4 storage tiers—EFD and three storage tiers of rotating disk drives. A first set of promotion scores and a first promotion histogram may be used as described above to determine which data portions are mapped to the EFD tier. The first histogram may be based on first promotion scores having values calculated with weights P1-P12 selected for the particular EFD tier. Next, a second set of promotion scores may be calculated using a second promotion score different from that used in determining the first histogram. The second histogram may be based on second promotion scores having values calculated with new weights P1-P12 selected whereby P7-P12 may be 1 and P1-P6 may be a suitably selected. With reference to FIG. 20, shown is the second histogram whereby S2 denotes a promotion threshold score for the second tier and S3 denotes a promotion threshold score for the third storage tier. In this case, when determining data portions mapped to the third storage tier, the index variable I would be initialized to a score that is one less than the lowest score of the next highest storage level, the second storage tier. For example, if storage portions having a score of 4500 to 5000 are assigned to the second storage level, then the index variable, I, would be initialized to 4499 in connection with determining scores for the third storage level just below the second storage level.

Once promotion threshold processing has completed for the current zone, demotion threshold processing is performed as will now be described.

Figure 22:
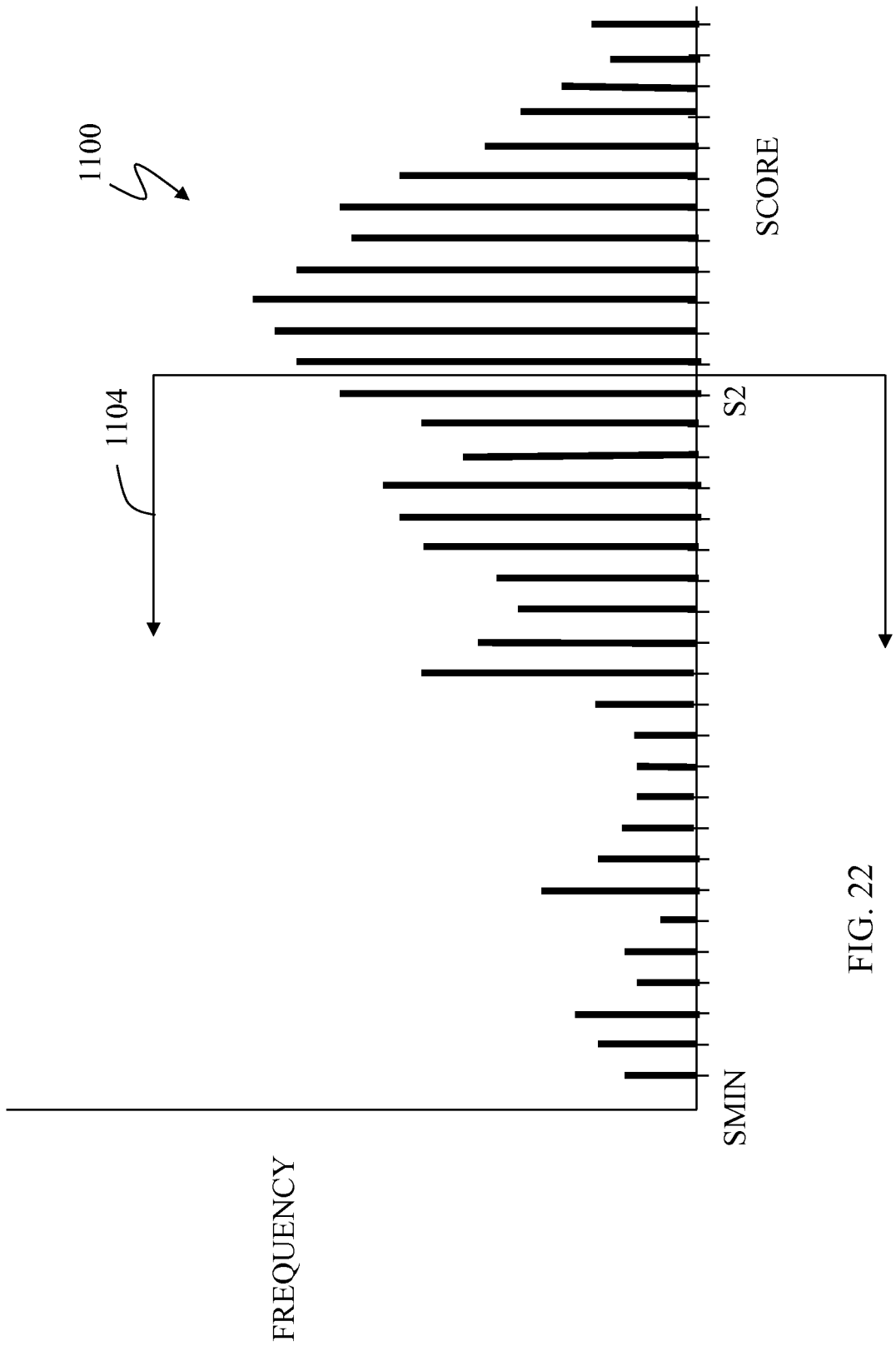
FIG. 22 illustrate histograms that may be used in threshold selection according to an embodiment of the system described herein.

Referring to FIG. 22, shown is a demotion histogram 1100 similar to the histogram 1000, discussed above which illustrates a plurality of scores and the frequency thereof. The histogram 1100 may be used to determine which of the data portions (if any) may be demoted (e.g., mapped to relatively slower physical storage). In some embodiments, the histogram 1100 may be identical to the histogram 1000. In other embodiments, the histogram 1100 may be different than the histogram 1000 because the scores for the histogram 1000 used for promotion may be different than the scores for the histogram 1100 used for demotion. Determination of promotion and demotion scores is discussed in more detail elsewhere herein.

In one embodiment including three storage tiers—EFD, FC rotating disk drives and SATA disk drives—as described above, a first demotion histogram 1100 may be determined for the EFD storage tier. In a manner similar to that as described above for a first set of promotion scores for the EFD tier, a first set of demotion scores may be determined for the EFD storage tier using first demotion scores having weights P1-P12 selected for the particular EFD storage tier. In the example 1100 of FIG. 22, shown is a first range indicator 1104 denoting that data portions have demotion scores less than S1 may be demoted (mapped) from the EFD first storage tier to one of the remaining two lower or slower storage tiers of physical storage.

Subsequently a second demotion histogram may be determined using those data portions which have demotion scores from the first histogram less than S1. In other words, those data portions having demotion scores less than S1 are demoted from the EFD storage tier but now a determination may be made as to which storage tier such demoted data portions are located—the FC or the SATA storage tiers. For those data portions demoted from the EFD storage tier, second demotion scores may be determined for use with a second demotion histogram. The second demotion histogram may be based on second demotion scores having weights P1-P12 selected for the second storage tier of FC rotating disk drives in this example. Thus, the second histogram is similar to the first histogram with reference to FIG. 22 with the differences that 1) S1 represents a second demotion threshold whereby all data portions have a demotion score less than S1 are demoted to the third or lowest storage tier and those data portions having a demotion score more than S1 are mapped to the second storage tier and 2) S1 represents the demotion threshold for the second storage tier.

In an embodiment the system described herein, the demotion threshold for a tier may be determined in any suitable manner. For example, the system described herein may select a demotion threshold with respect to demoting a data portion from a storage tier based on the threshold score determined as the promotion threshold for the storage tier. The demotion threshold may be selected as a score that is the same or lower than the promotion threshold. For example, the demotion threshold may be determined using a constant factor by which the promotion threshold for the same storage tier is multiplied. (e.g. promotion threshold for a tier=1.2*demotion threshold for a storage tier). The foregoing may introduce a stationary zone between the promotion and demotion thresholds for a tier where scores falling this stationary zone are neither promoted or demoted with respect to the storage tier. Introduction of the stationary zone may serve as one mechanism that may be included in the system described herein to limit thrashing with respect to repeatedly promoting and then demoting the same data portions having scores which border the promotion or demotion threshold for a storage tier. The demotion threshold may be selected so that it is always equal to or less than the storage capacity for the SG as may be specified in an associated AP.

In an embodiment of the system described herein, the processing performed for demoting data portions (extents) may be similar to processing described in connection with FIG. 21 with the difference that processing may be reversed so that, for example, the portions to be demoted to the lowest level of storage may be determined prior to higher storage tiers by initially beginning with setting I in step 1052 to SMIN and incremented in each iteration. In such an embodiment, storage capacity limits and/or performance limits may be utilized as may be provided in connection with the system described herein. For example, the system described herein may not provide performance limits for the lowest/slowest performing tier but may provide such limits for other tiers. In this case, the system may determine demotion thresholds based on the criteria provided (e.g., if performance limits are not provided for the third storage tier (e.g., slowest) then only capacity limits may be used for the third storage tier.

In some embodiments, when a data or storage portion (e.g., an extent) is selected for promotion, only active subportions (e.g., subextents) are promoted while inactive subportions remain at their current storage level. In an embodiment of the system described herein, a subportion is considered active if it has been accessed in the previous 4½ days and is considered inactive otherwise. Of course, other appropriate criteria may be used to deem subportions either active or inactive. In some embodiments, when a data portion (e.g., an extent) is selected for demotion, the entire storage portion may be demoted, irrespective of activity level of subportions. In addition, in some embodiments, appropriate mechanism(s) may be provided to reduce the amount of data that is demoted so that more data is maintained on relative faster physical storage devices.

Each extent may be evaluated for promotion first as described above and then for demotion if it has not otherwise qualified for promotion. If an extent does not qualify for promotion or demotion, then no data movement is modeled for the extent and subsequently the extent is also not a candidate for data movement with respect to a set of criteria (e.g., capacity limits and performance zone limits) currently being evaluating through modeling using the system described herein.

It should be noted that an extent that qualifies for promotion may not then subsequently be a candidate for demotion. Thus, a candidate that qualifies first for promotion may then be removed as a possible demotion candidate.

In some cases, it may be desirable to minimize the amount of data that is demoted. A mechanism for doing this may take into account the capacity and amount of data that has been placed onto the higher tiers and set the demotion threshold lower (so less data is demoted) if the amount of promoted data is less than the capacity (or specified percent of capacity) of the higher tiers. For example, if the policy indicates a desire to fill the higher tiers within fifty percent of capacity, but the promotion portion of the algorithm has only promoted data so that the higher tiers are thirty percent full, the demotion threshold may be set lower so that less data is demoted.

Figure 23:
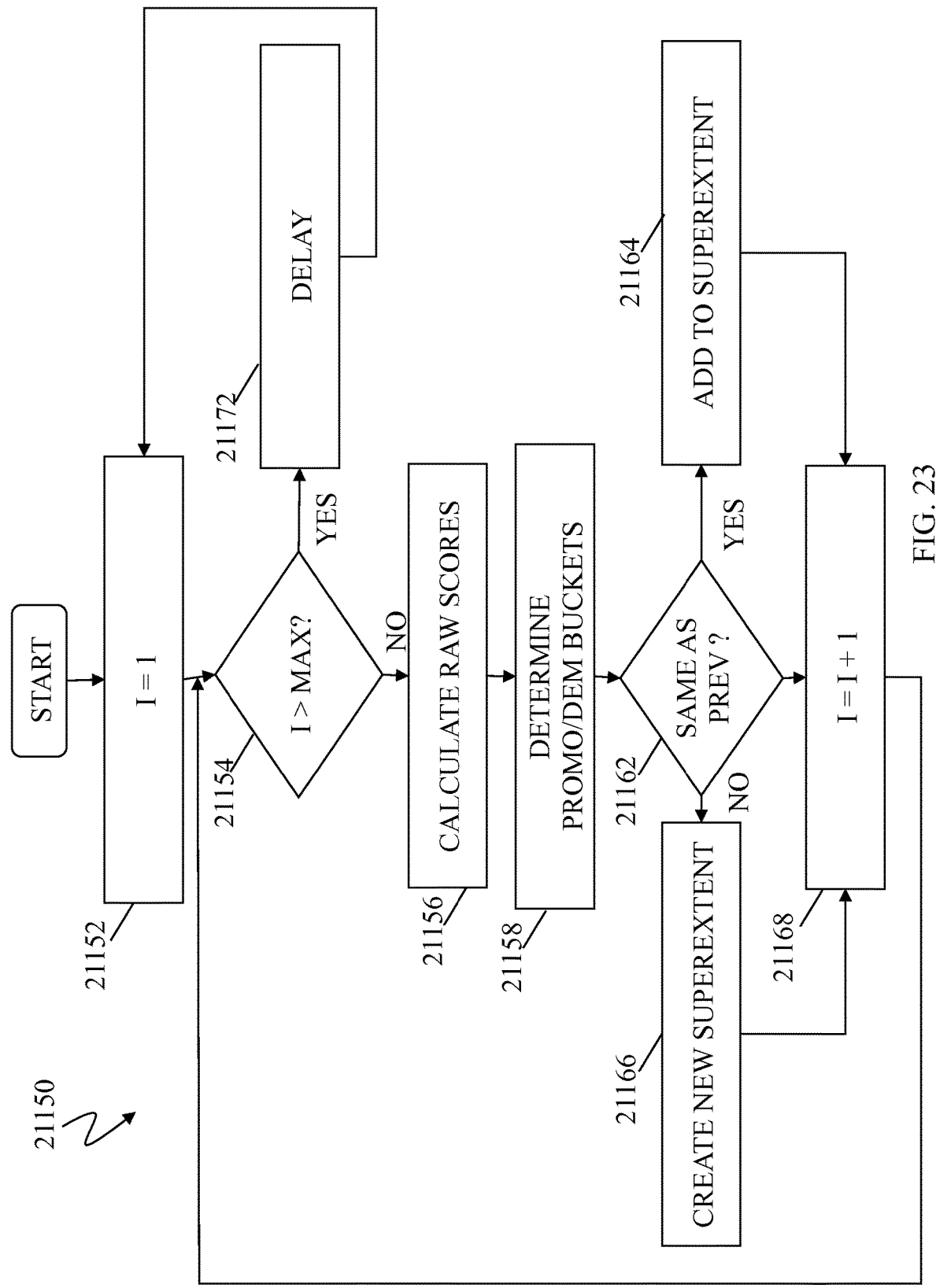
FIG. 23 is a flow chart illustrating processing performed in connection with creating histograms for promotion and demotion of data to different tiers of storage according to an embodiment of the system described herein.

Referring to FIG. 23, a flow chart 21150 illustrates steps performed in connection with creating the histograms 1000, 1100. Processing begins at a first step 21152 where an index variable, I, is set to one. The index variable I is used to iterate through the storage portions (e.g., extents) of a storage space. Following the step 21152 is a test step 21154 where it is determined if I is greater than MAX, a maximum value for I (e.g., the number of extents of the storage space). The test at the step 21154 determines if all of the storage portions of a particular storage space have been processed. If not, then control transfers from the test step 21154 to a step 21156 where the raw promotion score and the raw demotion scores are calculated.

The raw promotion score and the raw demotion score reflect an amount of I/O activity for a particular extent. Any appropriate mechanism may be used to calculate the scores some of examples of which are described herein. For example, in an embodiment of the system described herein, the raw promotion score is provided by the formula:

$$(p1*s\_rrm+p2*s\_w+p3*s\_p+p4*1+p5*1\_w+p6*1\_p)/(\# \text{ Active Subext}+1)$$

where s_rrm is the rate of short term random read misses, s_w is the rate of short term writes, s_p is the rate of short term pre-fetches, 1_rrm is the rate of long term random read misses, 1_w is the rate of long term writes, and 1_p is the rate of long term pre-fetches for a given extent. The coefficients p1-p6 may be set as appropriate. In an embodiment of the system described herein, the values used may be 12, 4, 4, 3, 1, and 1, respectively. Of course, different values may be used to emphasize or deemphasize different I/O characteristics in connection with determination of the promotion raw score. In an embodiment of the system described herein, the different short term and long term rates my be provided using the mechanism described in U.S. patent Ser. No. 12/924,396 filed on Sep. 27, 2010 and titled "TECHNIQUES FOR STATISTICS COLLECTION IN CONNECTION WITH DATA STORAGE PERFORMANCE", which is incorporated by reference herein. Of course, any appropriate technique may be used for collection of the statistics used herein.

The demotion raw score may be determined using the following formula:

$$(p4*s\_rrm+p5*s\_w+p6*s\_p+p1*1\_rrm+p2*1\_w+p3*1\_p)$$

where s_rrm, s_w, p1, etc. are as set forth above.

Following the step 21156 is a step 21158 where the promotion bucket index and the demotion bucket index are both calculated. The indexes are used to add data to the histograms (e.g., 1000, 1100). Determination of the bucket indexes is discussed in more detail elsewhere herein. In some embodiments, the promotion raw score may be multiplied by a priority factor (e.g., one, two, or three) prior to obtaining the bucket index. The priority factor may be used to give higher priority (i.e., increase the likelihood of promotion) for some of the storage, possibly selected by a user or by a policy. For example, important operations in an organization may be assigned a higher priority so that storage associated therewith is provided with a priority factor of two or three (or some other value).

Following the step 21158 is a test step 21162 where it is determined if the promotion and demotion bucket indices determined at the step 21158 are the same as the promotion and demotion indices determined for the most recent extent or set of extents. If so, then control passes from the test step 21162 to a step 21164 where the current extent being processed is added to a super-extent data element for the most recent extent or set of extents. The super-extent represents data for a number of contiguous extents having the same promotion and demotion indices. The super-extents are provided to increase efficiency and decrease the amount of storage needed. Note that other criteria may be used to combine information for contiguous extents.

If it is determined at the test step 21162 that the promotion and demotion bucket indices determined at the step 21158 are the same as the promotion and demotion indices determined for the most recent extent or set of extents, then control passes from the test step 21162 to a step 21166 where a new super-extent is created. Adding to an existing super-extent at the step 21164 and creating a new super-extent at the step 21166 are both discussed in more detail elsewhere herein. Following the step 21164 and following the step 21166 is a step 21168 where the index variable, I, is incremented. Following the step 21168, control transfers back to the test step 21154 for another iteration.

If it is determined at the test step 21154 that I, the index variable used to iterate through the storage portions (e.g., extents), is greater than a maximum value (the number of extents being processed), then control transfers from the test step 21154 to a step 21172 where a delay is introduced. Following the step 21172, control transfers back to the step 21152 to reprocess the extents of a data storage space to reconstruct the histograms.

The amount of delay at the step 21172 represents the cycle time for repeatedly reconstructing the histograms. The delay may be a constant and/or may be adjustable depending upon the amount of time spent performing other processing associated with promotion and demotion of data. In some embodiments, the delay may be set so that the histograms are recalculated every ten minutes. It is also possible to keep track of instances where the algorithm does not complete in a certain amount of time (e.g., ten minutes). In such a case, a counter could be incremented each time the algorithm does not complete and decremented when it does. If the counter reaches a certain value (e.g., ten), the system may operate in a degraded mode indicating that data tiering is not being performed properly.

Figure 24:
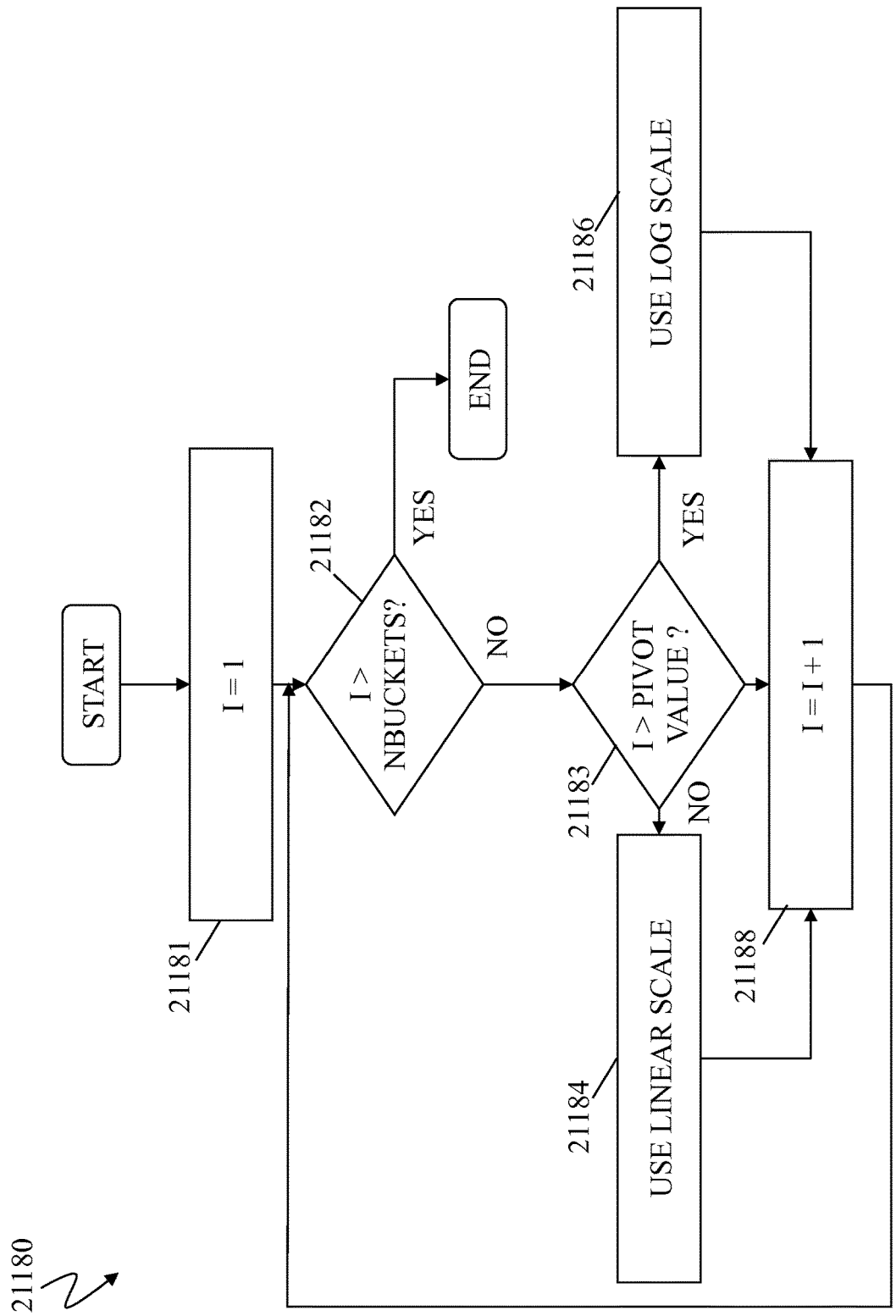
FIG. 24 is a flow chart illustrating processing performed in connection with determining lower boundary values to facilitate mapping raw scores into histogram buckets according to an embodiment of the system described herein.

Referring to FIG. 24, a flow chart 21180 illustrates steps performed in connection with providing values for converting the raw promotion and demotion scores into promotion and demotion indices (buckets). In an embodiment of the system described herein, each of the buckets (bins) has a lower boundary of a raw score that falls into a particular bucket. Thus, for example, given a bucket I, a raw score will map to bucket I if the raw score has a value between the lower boundary of bucket I and one less than the lower boundary of bucket I+1. The following describes how the lower boundary values are set for the bins and thus describes how to map raw scores to particular histogram buckets (bins). Accordingly, the processing performed at the step 21158, discussed above, where raw scores are mapped into particular buckets involves finding a particular bucket where the raw score falls between the low boundary thereof and the lower boundary of the next bucket.

Processing begins at a first step 21181 where I, an index variable, is set to one. The index variable, I, is used to iterate through all of the buckets (bins). Following the step 1181 is a test step 1182 where it is determined if I is greater than NBUCKETS, the number of buckets (histogram values) used by the system. In an embodiment of the system described herein, NBUCKETS is five thousand, although other values may be used. If it is determined at the step 21182 that I exceeds the number of buckets, then process is complete. Otherwise, control transfers from the step 21182 to test step 21183 where it is determined if I is greater than a pivot value. In an embodiment of the system described herein, a linear scale is used for setting a lower boundary for buckets below the pivot value and a logarithmic scale is used for setting the lower boundary for buckets above the pivot value. Determination of the pivot value is discussed in more detail elsewhere herein.

If it is determined at the test step 21183 that I is not greater than the pivot value, then control passes from the test step 21183 to a step 1184 where a linear scale is used for setting the lower boundary of bucket I. In an embodiment of the system described herein, the lower boundary is set equal to I (the bucket number) at the step 21184, but of course other mappings are possible. If it is determined at the test step 21183 that I is greater than the pivot value, then control passes from the test step 21183 to a step 21186 where a logarithmic mapping is used. In an embodiment of the system described herein, the following formula is used:

$$\text{lower boundary} = \exp(\log(\text{pivot value}) + \text{logperbucket} * (I - \text{pivot value}))$$

where logperbucket equals (maxlog−minlog)/(numbuckets−pivot value−2), maxlog=log(max raw score), minlog=log (pivot value), and numbuckets is the total number of buckets. In an embodiment of the system described herein, numbuckets is five thousand and max raw score is 4,800,000. Of course, other values may be used.

Following the step 21184 or the step 21186 is a step 21188 where I is incremented. Following the step 21188, control transfers back to the step 21182 for another iteration.

As discussed elsewhere herein, determining the low boundary for each of the buckets allows mapping the raw scores into particular buckets at the step 21158, discussed above. A raw score maps to a particular bucket when the raw score is greater than or equal to the low boundary and when the raw score is less than the lower boundary of the next higher bucket. The processing illustrated by the flow chart 21180 constructs a table used to map raw promotion and demotion scores into buckets. The mapping may be performed using a binary search of the table.

Figure 25:
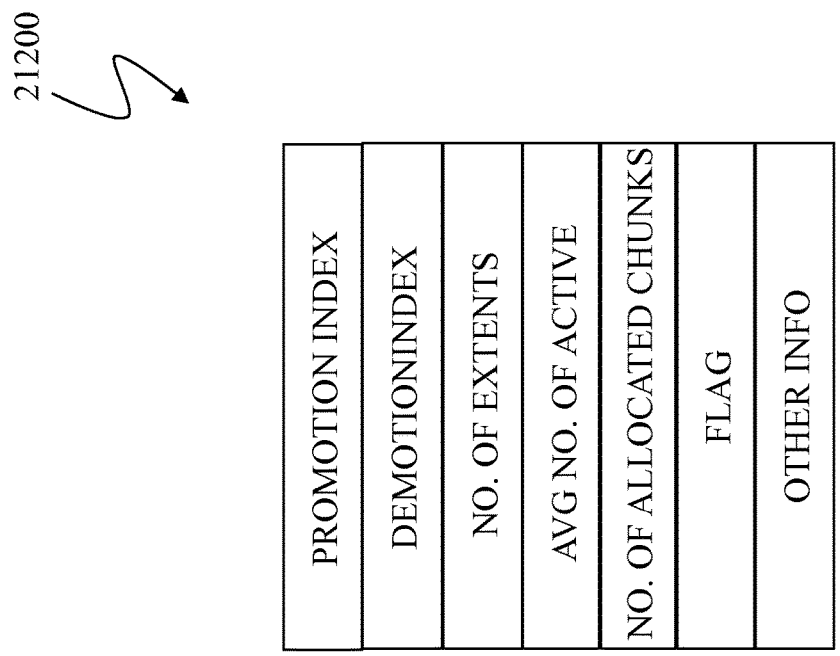
FIG. 25 is a diagram illustrating a data structure used for storing data for super-extents according to an embodiment of the system described herein.

Referring to FIG. 25, a diagram 21200 illustrates a data structure that may be used for storing metadata for a super-extent. The data structure 21200 includes an entry for the promotion bucket index for the super-extent and an entry for the demotion bucket index for the super-extent. The data structure 21200 also includes an entry for the number of extents in the super-extent.

As discussed elsewhere herein, an extent may include a number of sub-extents. In an embodiment of the system described herein, there are forty-eight sub-extents for each extent. Some of the sub-extents may be active (i.e., have been accessed within a particular amount of time). In an embodiment of the system described herein, a sub-extent is considered active if there has been at least one I/O operation thereon within the last 4½ days and is considered inactive otherwise. The data structure 21200 includes a field indicating the average number of active sub-extents for all of the extents of the super-extent. The value of the average number of active sub-extents field is provided by:

(total number of active sub-extents)/(number of extents)

The data structure 21200 also includes a flag field that indicates whether data for a particular super-extent was recently promoted or demoted and to which tier. In some embodiments, it is possible to use the flag field to decide to add a particular super-extent to a histogram and/or whether to demote (or promote) data corresponding to a particular super-extent. For example, in an embodiment of the system described herein, data that had been recently promoted to the first or second highest level (according to the flag field) is not considered for demotion to the lowest level and data that been recently promoted to the highest level (according to the flag field) is not considered for demotion at all. Note that handling promotion first followed by demotion may be considered part of the policy. The data structure 21200 may also include other information. In an embodiment of the system described herein, the flag indicates whether a corresponding data portion had been promoted or demoted in connection with the previous histogram (e.g., the most recent iteration). Thus, after running the promotion algorithm, the flag may be used to eliminate from the demotion histogram any data that had just been promoted, as described above.

Figure 26:
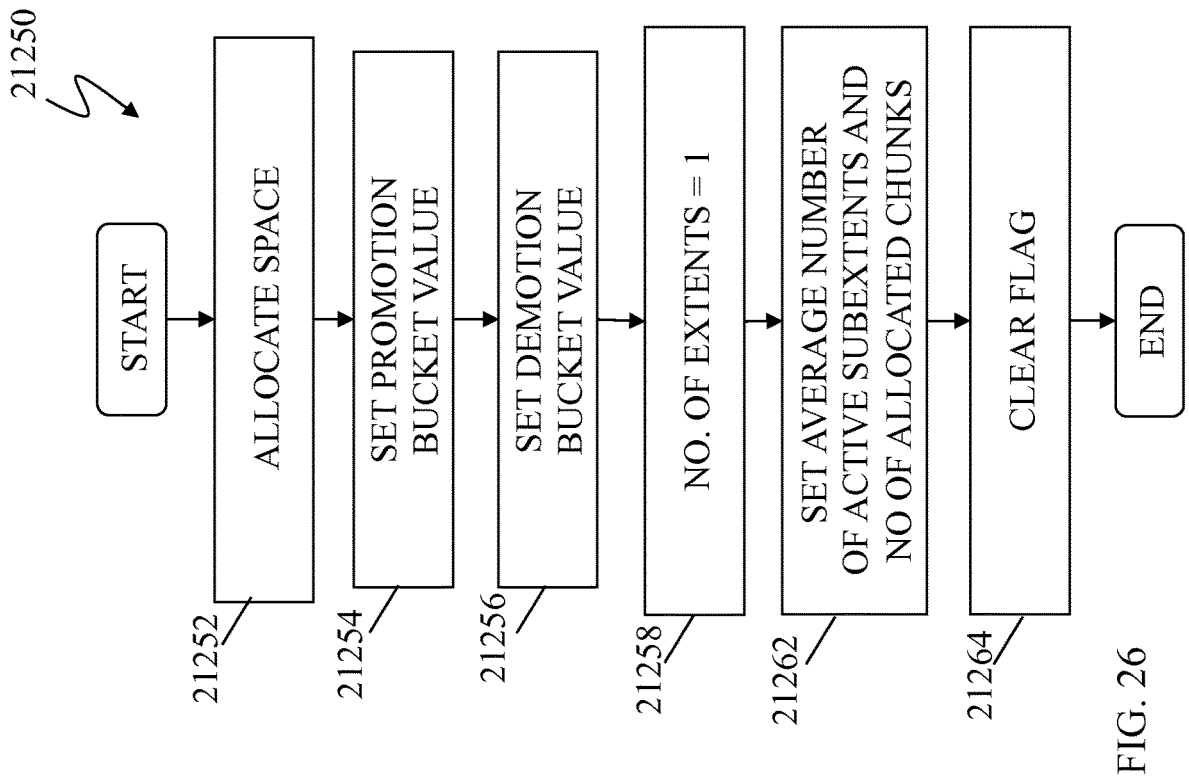
FIG. 26 is a flow chart illustrating processing performed in connection with creating a new super-extent according to an embodiment of the system described herein.

Referring to FIG. 26, a flow chart 21250 illustrates steps performed in connection with creating a new super-extent at the step 21166, described above. Processing begins at a first step 21252 where space is allocated for the metadata for the super-extent. In an embodiment of the system described herein, the super-extent metadata may be provided in the global memory 25b, although other storage locations are possible, provided that the metadata is accessible to provide the processing described herein.

Following the step 21252 is a step 21254 where the promotion bucket index is set to the value determined at the step 21158, described above. Following the step 21254 is a step 21256 where the demotion bucket index is set. Following the step 21256 is a step 21258 where the number of extents field is set to one. Following the step 21258 is a step 21262 where the value for the average number of active sub-extents field is set according to the number of active sub-extents for the extent and where the number of allocated chunks for the super-extent is set. Following the step 21262 is a step 21264 where the flag field is initialized (e.g., cleared) because the data corresponding to the new super-extent had not been recently promoted or demoted (i.e., marked, according to the flag, as having been promoted or demoted in the previous operation).

Following the step 21264, processing is complete.

Figure 27:
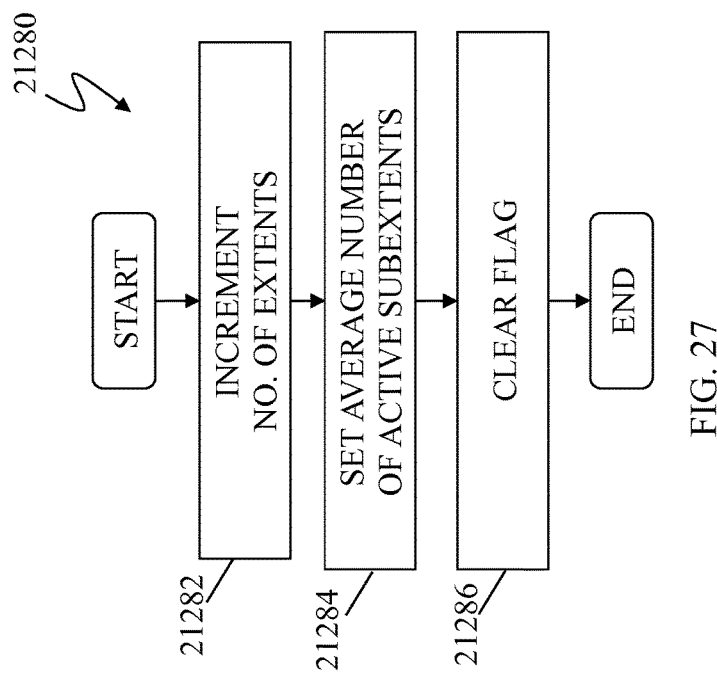
FIG. 27 is a flow chart illustrating processing performed in connection with adding extent information to a super-extent according to an embodiment of the system described herein.

Referring to FIG. 27, a flow chart 21280 illustrates steps performed in connection with adding an extent to an existing super-extent at the step 21164, described above. Processing begins at a first step 21282 where the number of extents field is incremented. Following the step 21282 is a step 21284 where the average number of active sub-extents field is adjusted to account for the active sub-extents in the extent being added. Following the step 21284 is a step 21286 where the flag field is modified (e.g., cleared). Following the step 21286, processing is complete.

Figure 28:
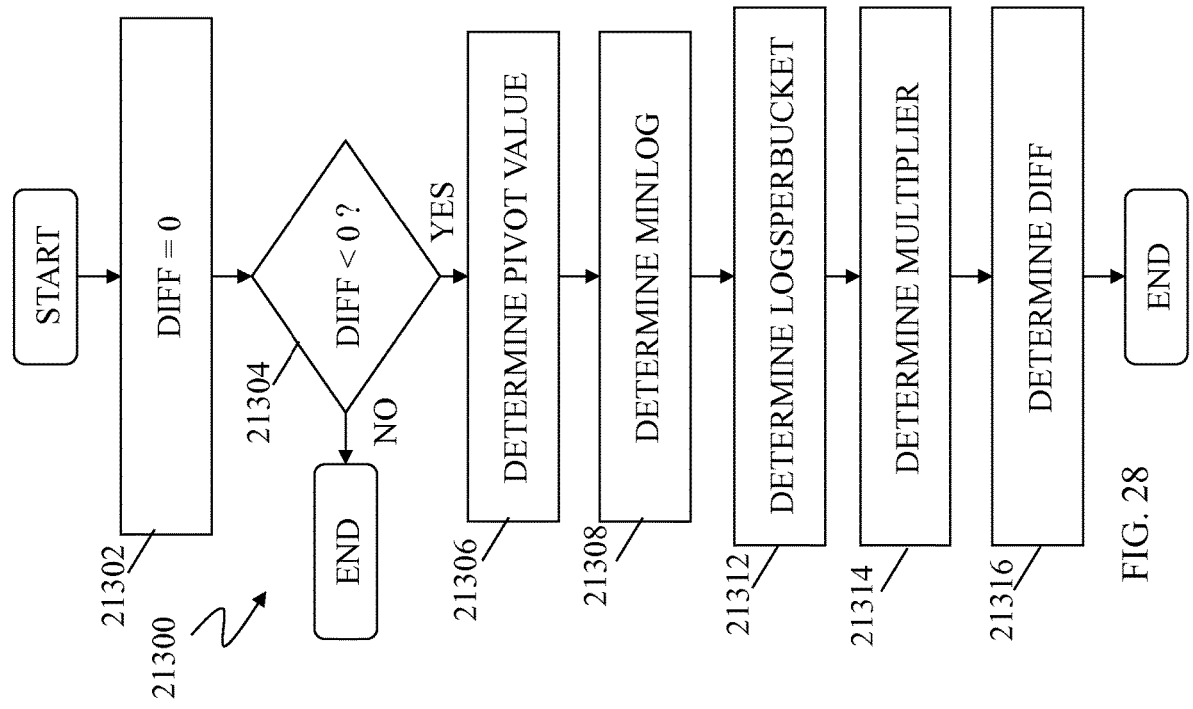
FIG. 28 is a flowchart illustrating calculating a pivot value according to an embodiment of the system described herein.

Referring to FIG. 28, a flow chart 21300 illustrates steps performed in connection with determining the pivot value. As described elsewhere herein, the pivot value is used to determine when to use a linear scale to set the lower boundary for a bucket index and when to use a log scale to set the lower boundary. It is desirable to set the pivot value so that the log scale does not cause the same lower boundary value to be provided for adjacent buckets. In an embodiment of the system described herein, the pivot value is set so that the difference between adjacent lower boundary values is at least one, but a different value for the desired difference may also be used.

Processing for the flow chart 21300 begins at a first step 21302 where a variable, DIFF, is set to zero. The DIFF variable is used to keep track of the difference between the lower boundaries of adjacent buckets as the pivot value is increased. Following the step 21302 is a test step 21304 where it is determined if DIFF is less than one. If not, then processing is complete. Otherwise, control transfers from the test step 21304 to a step 1306 where the pivot value is calculated using the formula:

$$\text{pivot value} = 1 + 1/(\text{multiplier} - 1)$$

where multiplier equals exp (logsperbucket) and where determination of logsperbucket is described above. For the initial determination of logsperbucket prior to first performing the step 21306, it is assumed that pivot value is one so that the initial value of minlog is zero.

Following the step 21306 is a step 21308 where minlog is recalculated. As discussed elsewhere herein, minlog is the log of the pivot value. Following the step 21308 is a step 21312 where logsperbucket is recalculated. Determination of logsperbucket is discussed elsewhere herein. Following the step 21312 is a step 21314 where multiplier (which equals exp(logsperbucket)) is recalculated. Following the step 21314 is a step 21316 where DIFF is recalculated using the formula:

$$\text{DIFF} = (\text{pivot value})*\text{multiplier} - \text{pivot value}$$

Following the step 21316, control transfers back to the step 21304 for another iteration.

In some embodiments, it is possible to have multiple independent storage groups that share the same physical storage space, where each storage group has its own independent set of thresholds used for tiering data. Note also that, since it is not necessary to provide absolute comparison of statistics of all of the data stored in physical storage space, the system could be implemented with multiple independent processes (possibly executed by different processors) that determine histograms and provide tiering for different storage groups. Construction of the histograms 1000, 1100 may be independent of each other and may be independent of processing that uses the histograms to promote and demote data.

After processing is performed for the first and second storage tiers to determine promotion and demotion thresholds using capacity limits and the first zone's performance limits, an overall performance metric for the SG using the physical drives of the storage tiers just processed is determined. In one embodiment, this performance metric may be the modeled average response time (RT) for the SG across all storage tiers just processed and may be represented in EQUATION 6 as:

$$\text{Average RT} = (1/\text{Total } I/Os \text{ per second}) * \Sigma \text{ALL\_TIERS}(\text{RT of tier}*I/O \text{ operations per second for the tier})$$

In EQUATION 6, "Total I/Os per second" is the total number or aggregate of I/Os per second across all physical devices of the SG, "E ALL_TIERS" is the mathematical summation of the product represented by "(RT of tier*I/O operations per second for the tier)". It should be noted that the "RT of tier" may represent the average response time of physical devices in a particular tier. Additionally, EQUATION 6 may generally be determined with respect to all SGs and devices thereof currently being evaluated using the system described herein. The foregoing Average RT may serve as an overall metric regarding performance of the entire SG across all storage tiers considered to determine whether the modeled performance using the response time limits for the first zone is preferable over other response time limits of another zone. The foregoing EQUATION 6 is a weighted average response time calculation that considers the number of I/Os with a given response time. Alternatively, the system described herein may compute an average RT including separate weightings related to technology type. It should be noted in connection with computing the average RT for the SG using EQUATION 6, the RT for each storage tier of the SG is utilized. This RT for each storage tier may be the last modeled RT computed during the histogram traversal as a result of performing promotion and demotion threshold determination and modeling the performance of such proposed data movement candidate data portions. It should be noted that if other criteria, such as utilization, are used in addition to or as an alternative to RT, then the system described herein may compute an overall or average metric across all storage tiers similar to as described above with EQUATION 6. For example, if zones of performance limits are defined for utilization limits for the storage tiers, then a metric for computing average utilization across all storage tiers of devices being evaluated may be used to represent the overall performance criteria used in selecting a set of performance limits in combination with capacity limits, and also the associated promotion/demotion thresholds.

In a similar manner as just described for the first set of performance limits of the first zone, processing is also performed for the next zone 2 (e.g., using the second set of performance limits). Thus, promotion thresholds and an average RT using EQUATION 6 are produced as a result of processing in accordance with capacity limits in combination with performance limits of each zone. After each zone is processed for candidate promotion and demotion thresholds, a determination may be made as to whether to stop further evaluating remaining zones. Such a determination may be made by comparing a first value for the average RT determined using EQUATION 6 for a current zone with second value for the average RT determined using EQUATION 6 for the previously processed zone. For example, after determining promotion and demotion thresholds using zone 1 performance limits in combination with capacity limits (zone 1 scenario) and then zone 2 performance limits in combination with capacity limits (zone 2 scenario), the average RT associated with the zone1 scenario may be compared to the average RT associated with the zone 2 scenario. If the average RT for zone 2 scenario does not indicate a sufficient or threshold level of improvement over the average RT for zone 1, then no further zones may be evaluated. The system described herein may define a threshold value that represents the minimum amount of improvement expected in order to continue evaluating further zone scenarios (e.g., determining promotion and demotion thresholds using capacity limits and performance limits for subsequently defined zones). The system described herein may determine a difference in metric values obtained for the average RT for the two zone scenarios to be compared. An improvement between zone scenarios may be determined if there is decrease in the average RT (e.g., lower average RT means better overall performance). This decrease may be larger than the threshold in order for a sufficient level of improvement to be determined. Alternatively, the system described herein may set the threshold value to zero so that any decrease in average RT between scenarios is considered sufficient improvement to proceed with evaluating further zone performance limits in combination with capacity limits.

It should be noted that if one of the capacity limits has been exceeded on a preceding iteration of processing for the prior zone, processing using subsequent zones stops. The processing described herein assumes that the lowest storage tier has sufficient capacity to accommodate storage for any data portions not mapped to the other storage tiers.

Figure 29:
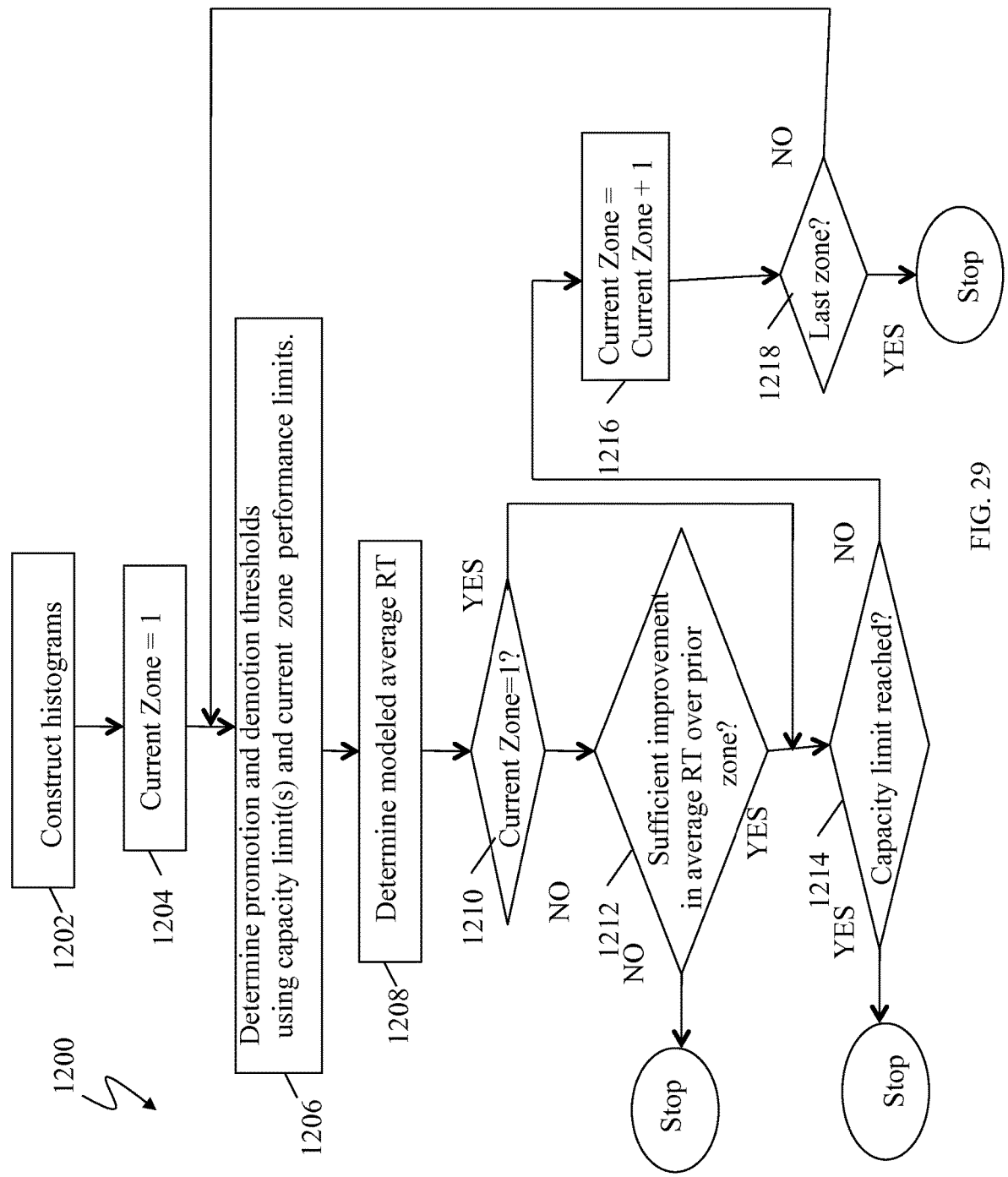
FIG. 29 is a flowchart illustrating processing performed in connection with evaluating and modeling performance for different performance limits in combination with capacity limits according to an embodiment of the system described herein.

Referring to FIG. 29, shown is a flowchart 1200 of steps that may be performed in connection with evaluating and modeling performance for different performance limits in combination with capacity limits in an embodiment in accordance with the system described herein. The steps of 1200 summarize processing described above. At step 1202, one or more histograms may be constructed. In step 1204, current zone is set to 1 in connection with commencing processing for the first zone's performance limits. At step 1206, promotion and demotion thresholds are determined in accordance with the capacity limits and performance limits of the current zone. Selection of such thresholds is followed by modeling proposed data movements and determining modeled RTs for all storage tiers for the one or more SGs. At step 1208, the modeled average RT is determined as an overall performance metric across all storage tiers for the one or more SGs. At step 1210, a determination is made as to whether the first zone is currently being processed. If so, control proceeds to step 1214. Otherwise, control proceeds to step 1211 where a determination is made as to whether there has been sufficient improvement with respect to the modeled average RT values for the current zone scenario and the previous zone scenario. If step 1212 evaluates to no, processing stops. If step 1212 evaluates to yes, control proceeds to step 1214 where a determination is made as to whether the capacity limit has been reached. Step 1214 may examine any one or more capacity limits defined such as, for example, capacity limits (e.g., per storage tier, overall SG capacity limits, and the like) as may be defined in an AP, physical limits of drive capacities, and the like. If any one of these capacity limits has been exceeded, step 1214 may evaluate to yes and processing may stop. If step 1214 evaluates to no, control proceeds to step 1216 to increment current zone to the next zone. At step 1218, a determination is made as to whether this is the last zone. If so, processing stops. Otherwise, control proceeds to step 1206.

It should be noted that FIG. 29 illustrates only one particular way in which the performance limit criteria and capacity limit criteria may be used in connection with selecting promotion and/or demotion thresholds based on stopping criteria. An embodiment of the system described herein may vary the stopping criteria. For example, the system described herein may perform the foregoing evaluation of all zones of performance limits and capacity limit(s) and determine an average RT value across all storage tier using EQUATION 6, for each such zone, without consideration of the stopping criteria at steps 1212 and/or 1214 and then select the performance zone limits resulting in the best relative average RT across all storage tiers. As another variation, the system described herein may terminate processing and evaluation of subsequent performance zone limits upon finding a first such zone having performance limits that results in a modeled average RT that is above a defined threshold. Thus, it is possible to vary the stopping criteria specified in connection with FIG. 29.

Once processing as described in FIG. 29 is completed, the promotion and demotion thresholds associated with the zone having performance limits resulting in the minimum average RT may be selected for implementation in connection with actually performing the previously modeled data movements.

Figure 30:
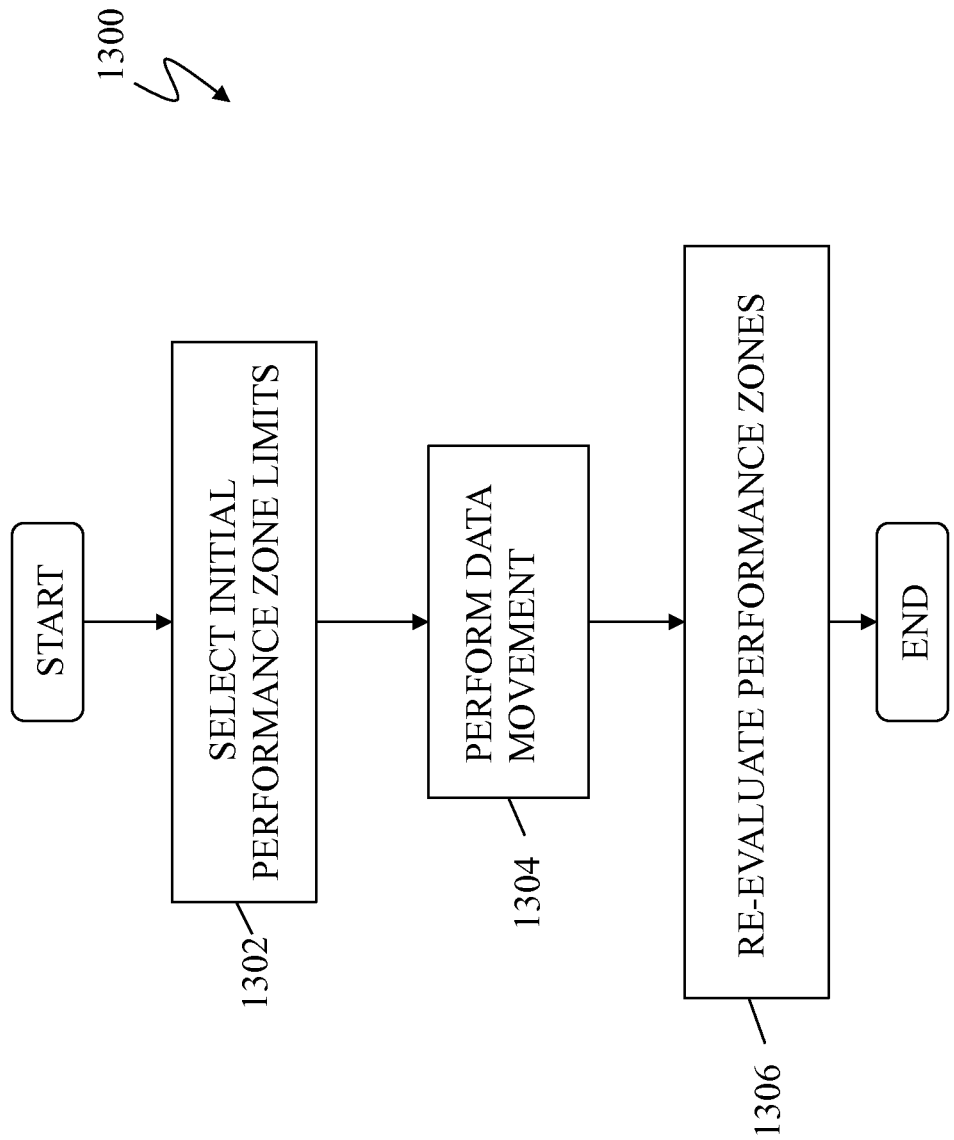
FIG. 30 is a flowchart illustrating processing performed in connection with selecting performance zone limits according to an embodiment of the system described herein.

Referring to FIG. 30, a flowchart 1300 illustrates processing performed in connection with promotion and demotion thresholds associated with a zone. Processing begins at a first step 1302, where initial performance zone limits are selected having a minimum associated average response time as modeled. It should be noted that if other performance metrics and associated limits, such as utilization limits described elsewhere herein, are implemented, the step 1302 may include considering the other performance metrics. For example, it is possible to also consider an average utilization across all storage tiers.

Following the step 1302 is a step 1304, where data movements (e.g., promotion and demotions for the multiple storage tiers) may be performed based on criteria including the promotion and demotion thresholds determined for the selected performance zone limits at the step 1302. Following the step 1304 is a step 1306, where performance zones may be re-evaluated as needed, as described herein. Additionally, the response time limits of the performance zones may also be modified as needed to adjust for any workload changes in the system. In other words, as described elsewhere herein, the performance zones defined should set forth reasonable response time limits based on workload of the system being evaluated. The performance zones may provide response time criteria that varies as the system workload varies in order to appropriately and automatically adjust response time limits to accommodate for such variations in workload dynamically. It should be noted that re-evaluation at the step 1306 may be performed in response to an occurrence of any suitable event. For example, such re-evaluation may be performed periodically (e.g., upon the occurrence of a predefined time interval), in response to measured or observed system performance reaching a threshold level (e.g., when the measured or monitored response time of the data storage system reaches a defined threshold level), in response to a user's manual selection, and the like.

For purposes of simplification, examples above considered a single SG. The system described herein may evaluate multiple SGs in combination if they share physical devices or defined pools of devices so that there is a dependency in that they utilize the same data storage resources. Additionally, there may be other consumers of the physical devices beside those under management of an optimizer or other component described herein for data movement. Thus, when considering the performance limits of storage tiers, it is possible to determine a performance baseline associated with such devices representing the workload of such devices in the system since such devices may be viewed as having consumed or utilized a portion of the allowable performance limits. The performance baseline may be defined as disk utilization or a response time value that a physical storage device or drive would have if the drive only hosted data storage for devices that are not under management by a component as described herein. In one embodiment this may include those portions of thin devices which may not be moved between physical devices such as between storage tiers. The system described herein may determine the baseline performance in any suitable manner for unmovable thin devices. For example, the system described herein may determine the data or thick devices included in a thin device pool servicing the thin device and obtain performance data for each such data device in the thin pool. There is an assumption that the system described herein provides for a distribution of workload within pool data devices. Performance data may be obtained for each moveable thin device using the thin device pool where such performance data indicates the thin device workload as distributed over data devices of the thin pool. For each such data device, the workload associated with unmovable thin devices may be determined by subtracting the distributed movable thin device workload associated with the data device from the observed workload of the data device. In other words, for a data device, the workload of the data device attributable to the moveable thin device is subtracted from the total workload of the data device. The result of the foregoing is an estimate of the data device workload attributable to non-moveable thin device portions.

In connection with the defined performance or comfort zones described herein, it should be noted that such zones are determined for the particular resource or service that may be consumed or utilized. In a similar manner, zones may be defined and evaluated in connection with other resources or services which are consumed or utilized in the data storage system. For example, zones and performance modeling variations may be modeled in connection with varying the amount of cache where cache limits may be placed on data cached for particular thick or data devices, thin devices, and other entities which consume cache. As another example, zones of performance limits may be specified for varying performance limits related to one or more DAs that service physical data storage devices. In a similar manner as described herein for storage tiers of physical devices, different performance criteria may be specified in terms of performance zones of limits. For example, with respect to DAs, utilization may be used as a performance metric for which comfort zones are defined.

There are several techniques described herein that may be used to minimize thrashing, such as using weighting of long term and short term metrics (e.g., FIG. 14) and using a stationary zone between demotion and promotion thresholds for a storage tier. The system described herein may use different techniques to avoid large changes in promotion and demotion thresholds selected and utilized in successive time periods. The system described herein may determine a running average with respect to promotion and/or demotion thresholds determined using the techniques herein and may use the running average as the actual threshold when implementing data movements. The running average of promotion and/or demotion thresholds may be determined, for example, over a period of time, or using N previous threshold values. It is also possible to increase the number of performance zones evaluated.

The criteria which is evaluated using the system described herein may include capacity limits and performance limits. The processing performed herein provides for adaptive tier overloading protection by allowing the system to automatically select from different sets or zones of performance limits as system workload changes. The particular performance limit criteria of response time specified for each tier in each zone is only an example of a performance limit criteria that may be used in an embodiment of the system described herein. For example, performance limit criteria may use one or more other metrics other than response time, such as I/O processing rate (e.g., number of I/Os/second), # reads/second, # writes/second, service time, queue waiting time or wait time, length and/or number of wait queues, and the like. These one or more other metrics may be used alone or in combination with response time limits.

Furthermore the system described herein may associate a different weighting factor with each of the different metrics included in performance limits specified for a zone. The weights used for each of the different metric may vary with performance zone. Furthermore, the actual metrics may also vary with performance zone. For example, it may be that for a first zone, a particular response time limit is being evaluated and other performance limit criteria is also included for evaluation. This additional performance limit criteria (e.g., an additional metric) may not considered in evaluation with other response time limits of other zones.

Furthermore, the particular overall metric of average response time used to select between evaluated performance zones may vary from what is described herein. For example, of the system described herein may use a different metric other than average response time, or may use the average response time metric, alone or in combination with, other overall performance criteria to evaluate and select between performance zone limits. For example, as described elsewhere herein, the system described herein may also use utilization as the performance metric, alone or in combination with, response time. In such an embodiment, comfort zones of utilization values may be specified and an average utilization may be determined across all storage tiers in a manner similar to calculating and using average response time in EQUATION 6. Utilization may also be modeled in a manner similar to response time as described, for example, in connection with FIGS. 17 and 18A-18E (e.g., use modeled utilization curves with I/Os per second on the X-axis and utilization on the Y-axis as may be determined through observed and collected data).

It is possible to consider a single set of limits or criteria including limits that may be based on performance limits as described above (e.g., response time) in combination with capacity limits, performance limits alone, or capacity limits of the different storage tiers alone without performance limits in connection with determining data portions such as extents stored in the various storage tiers. It is possible to use capacity limits alone. However, other above-noted criteria (e.g., performance limits alone or in combination with capacity limits) may be used. For example, consider a system having three storage tiers—a first tier of SSD or EFD devices and second and third tiers of rotating disk drives. The second tier may be, for example, FC 15K RPM drives and the third tier may be, for example, SATA drives. The three storage tiers may be ranked from first to third, in terms of performance, from highest to lowest accordingly. When evaluating which data portions may be stored on, or moved to, the first highest performing tier of EFD drives, promotion scores for extents as described above may be determined. Values for P1-P12 may be selected based on the expected storage tier workload characteristics and performance characteristics of the EFD drives as described elsewhere herein. For determining which extents may be mapped to the EFD storage tier, values of P7-P12 may be selected, for example, based on the expected I/O sizes for the particular EFD drives. Values for P1-P6 may also be selected, for example, based on the expected amount of write activity to account for the fact that performance of the EFD devices degrades with larger amounts of write activity. In a similar manner, demotion scores may be determined for the extents as described above. A first promotion histogram may be formed as described above in connection with FIG. 19 for evaluating which extents may be stored in the EFD storage tier as the target tier. Processing as described in FIG. 31 may be performed to determine which extents may be stored in the first EFD storage tier based on the scores and capacity limit of the EFD tier.

Figure 31:
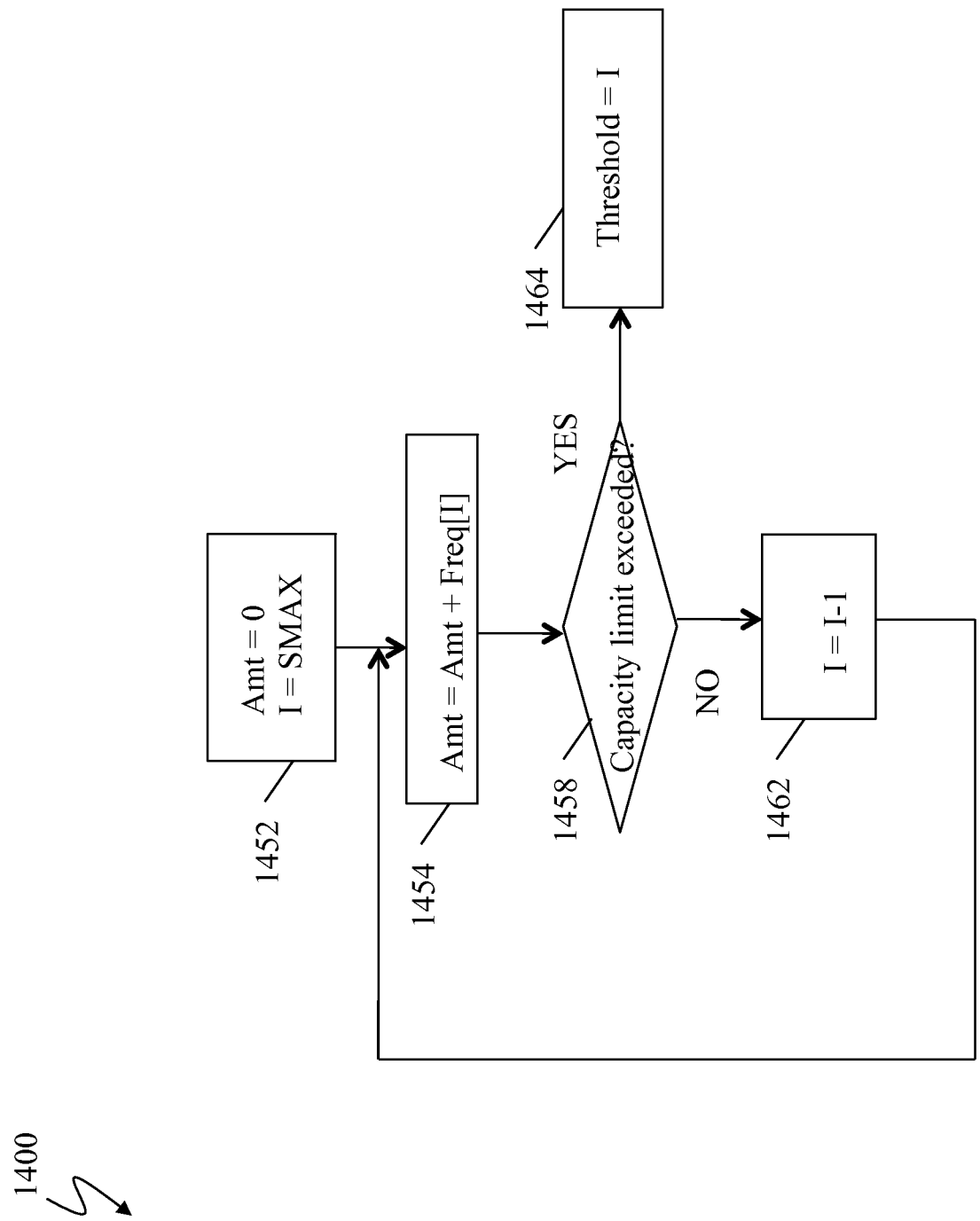
FIG. 31 is a flowchart illustrating processing performed in connection with determining a single promotion threshold for a single target tier using criteria including capacity limits for the target tier according to an embodiment of the system described herein.

Referring to FIG. 31, shown is a flowchart of steps summarizing processing as described above in connection with determining a single promotion threshold for a single target tier using criteria including capacity limits for the target tier. At step 1452, initialization processing is performed. Step 1452 includes initializing a variable, AMT, that keeps track of the amount of storage portions to zero. Step 1452 also includes initializing an index variable, I, to the maximum score (highest bin). In an embodiment of the system described herein, there are five thousand bins, so I would be set to five thousand at the step 1452. Of course, other numbers of bins are also possible. Following step 1452 is step 1254 where AMT is incremented by FREQ[I], the amount of data mapped to bin I. Following the step 1454 is step 1458 where a determination is made as to whether the capacity limit for the current EFD tier have been exceeded. Step 1458 may include comparing the current amount of capacity of the target tier consumed via the modeled mapping represented by AMT to the AP capacity limit. As described elsewhere herein, the total capacity consumed across one or more bins may be determined based on the cumulative frequencies of those bins and the amount of allocated storage of the data portions in the foregoing one or more bins. Step 1458 may include comparing the current amount of capacity of the target tier consumed via the modeled mapping represented by AMT to the SG capacity limit such as may be based on the physical drive capacity limits. If it is determined at the test step 1458 that the established capacity limit has been exceeded, then control passes from the test step 1458 to a step 1462 where the index variable, I, is decremented. Following the step 1462, control passes back to the step 1454 for another iteration. If the capacity limit is exceeded, step 1458 evaluates to yes and control proceeds to step 1464 where a score threshold is assigned the value of I. Data portions having a score of I or higher are promoted to the highest level of storage. Following the step 1464, processing is complete for the first storage tier, the EFD storage tier.

Once the foregoing of FIG. 31 is performed for the EFD or first storage tier using the first promotion histogram whereby a first EFD promotion threshold is determined, new promotion scores may be determined for the remaining extents not placed in the first EFD storage tier in connection with FIG. 31 processing. In other words, FIG. 31 processing determines which extents include the highest ranked promotion scores of the first promotion histogram where such promotion scores may have coefficients selected for the particular EFD storage tier. Such highest ranked extents may be included in the EFD storage tier up to the capacity limit of the EFD storage tier such as may be specified for the storage group (SG). Subsequently, new second promotion scores are determined for the remaining extents where the new promotion scores may have different values selected for the coefficients P1-P12 for the second storage tier. The second promotion scores may use values of 1 for coefficients P7-P12 and may select other suitable values for P1-P6 as described elsewhere herein for the second storage tier.

Based on these second promotion scores, a new second promotion histogram as described in FIG. 19 may be formed and used in connection with determining which extents may be promoted or mapped to second storage tier. To determine which extents may be stored in the second storage tier based on the capacity limits of the second storage tier, processing steps of FIG. 31 may be again performed using the second promotion histogram. In this manner, those extents of the second histogram having the highest promotion scores may be stored in the second storage tier up to the capacity limit of the second storage tier. The remaining extents may be placed in the third storage tier.

Once promotion processing has completed, demotion threshold processing may be performed in a manner similar to that as described elsewhere herein with the difference that only capacity limits are utilized where applicable.

In a manner similar to that as described for criteria including only capacity limits to determine a mapping between data portions and physical storage locations on different storage tiers, such criteria may alternatively include, for example, performance limits in combination with capacity limits, or performance limits alone. It should be noted that although the system described herein is used with thin devices providing virtual storage provisioning, it is also possible to use other types of devices such as storage devices that do not provide virtual provisioning.

It is possible to automatically identify groups of data portions (clusters) that, over time, tend to behave in a way that is significantly similar. The nature of the similarity upon which the grouping is based may be characterized as a tendency for a measure of the intensity of the back-end workload on the data portions to change at the same time, but not necessarily have the same absolute measure at the same time. The ability to track groupings of this nature can be of useful to an automated storage tiering system as described herein where such a system may use information regarding the groupings in connection with modeling and making workload predictions to determine appropriate storage tiers for the data portions and to perform data storage movement optimizations.

Group identification may provide automatic group maintenance such as, for example, determination of when to create a new group, adding an unassociated data portion (not already included in a group) to an existing group, removing a data portion from an existing group, destroying or dissolving an existing group, merging two existing groups, and the like. It is useful to identify long-lasting patterns that allow for prescribed amounts of transient incoherence (i.e., short and/or infrequently occurring times when a data portion included in a group may exhibit a short term behavioral difference from the group that includes the data portion).

As noted elsewhere herein, the grouping techniques herein attempt to identify groups of data portions whose activity level (per a measure of back-end storage access workload) tends to be similar. Data portions in the same group (cluster) exhibit such similar characteristics for a sufficient period of time for confidence to be developed in the grouping's behavioral pattern. There are periods of at least a specified minimum amount of time when the member data portions of the same group are significantly busier than the group average workload or activity level/rate. That is, a member data portion may have a large variation or deviation from the average workload of the group for a minimum amount of time. Extents are considered to be behaving in the same way when the extents each have activity level that is significantly above the average activity level for each of the extents at around the same time. Note that the extents could have different average levels, but the extents could still be considered as behaving in the same way as long as the extents are significantly above their respective average values at around the same time.

The access density of the member data portions are at least a threshold level with respect to an average for each of the extents. Access density may be expressed as a metric, for example, such as a number of I/Os per unit of storage (e.g., number of I/Os per megabyte of storage or I/O rate (number of read or write operations/second) per unit of storage). Examples of some metrics that may be used in connection with the grouping techniques are described elsewhere herein. For example, FIG. 14 and the corresponding description show metrics that may be used to determine a density rate by dividing the metric determined for a data portion by the size of a number of active subextents or sub partitions included in each data portion.

The system described herein uses affinity groupings based on an affinity calculation or metric. The affinity calculation may be determined with respect to, or between, two data portions, two groups, and/or data portion(s) and a group. An affinity measurement may be determined with respect to a single I/O-based metric for which affinity is being determined. Thus, if the system uses multiple such metrics, such as for read operations and write operations, an affinity measurement may be determined for each such metric and the results thereof may be combined in some fashion to provide a single metric that may be used to determine when to move data to different tiers.

As a first step in connection with grouping criteria, a metric for which the affinity measurement is being determined is selected. The metric selected may be, for example, based on a particular type of I/O (e.g., read or write, type of read operation such as random, both read and write operations and the like). It is possible to select any suitable metric such as any of the metrics described herein (e.g., such as in connection with FIG. 14 and such as used in connection with calculating data portion scores using EQUATION 4 and/or EQUATION 5). For example, it is possible to select a density metric such as a number of I/Os (or I/O rate) per GB (or other unit of storage) where the I/Os considered may have particular characteristics. To further illustrate, the metric may be the random read miss density (RRM density) which may be represented as the number of random read misses (or rate of RRMs) per GB or other unit of storage. The metric may be, for example, the number of sequential read operations (SR) or SR/GB, the number of all read operations (or read rate) per GB, number of writes (or write rate) per GB, total number of I/O operations (collectively all reads and write operations or total rate for both reads and writes) per GB.

It is possible to select an access rate metric (e.g., number of I/Os per unit of time) where the I/Os considered may have particular characteristics (e.g., RRM, SRs, writes, all read and write operations, etc.) rather than a density-based metric. In connection with a density-based measurement, the number of I/Os or rate of I/Os may be determined with respect to a unit of storage such as the number of active subextents within a single data portion or extent for which the metric is tracked. It is possible to use a data transfer rate metric (e.g., amount of data transferred per unit of time) where the I/Os considered may have particular characteristics (e.g., RRM, SRs, writes, all read and write operations, etc.). For example, the metric may be the RRM data transfer rate, expressed as number of KBs read/second.

It is possible to use a metric which is a weighted score based on one or more other metrics described herein whereby such metrics may be based on different I/O types. For example, it is possible to use one of the scores related to histograms described herein (e.g., see EQUATION 4 and EQUATION 5) whereby such a score may be characterized as a weighting of the different access rates of different back-end I/O types (e.g., RRM, SR and write). As another example, it is possible to determine a combined metric that is weighted based on one or more access rate metrics and/or one or more transfer rate metrics. Thus, generally, it is possible to select a single metric for which an affinity is determined whereby the first metric may be based on only a single metric (e.g., a single one of the metrics illustrated in FIG. 14), or alternatively, the first metric may represent a measurement (e.g., a score of EQUATION 4 or 5) derived from one or more other metrics (e.g., metrics illustrated in connection with FIG. 14).

After one or more metrics are selected, a time step is selected that represents an amount of time for which an assessment is made regarding affinity. A revised affinity value and processing to provide another iteration of affinity calculation may be performed at each occurrence of each time step. Thus, data for the selected metric may be observed over an during each time step. The length of time of the time step should be long enough to allow for stabilization of workload activity of groups but short enough to provide an acceptable persistence rate. In an embodiment of the system described herein, a time step of four hours is used.

It is possible to automatically determine an affinity of a particular data portion (e.g., an extent) for a group (cluster) that has already been formed. For each time step, a time step rate for the data portion is determined. The time step rate may be the average of the selected metric collected for the time step duration. For example, if the selected metric is RRM density and the time step is four hours, the time step rate is the average RRM density determined over the four hour period (i.e., average number of RRMs/GB for the data portion determined based on observed or collected metric for the four hour time step period).

For each time step, a persistence rate may also be determined. Generally, the persistence rate may be characterized as a longer term duration calculation of the selected metric where the time interval is longer than the duration of the time step. For example, the time step duration may be four hours and the persistence rate with respect to the selected metric may be one day. It is possible to calculate a simple average of the selected metric over the longer term duration time period. As a further variation, it is possible to calculate and use as the persistence rate the short term or long term version of the selected metric. Short term and long term metrics using an exponential decay rate are described elsewhere herein. To further illustrate, the selected metric may be the RRM density which is exponentially decayed over a time period of one day, like the short term metrics described elsewhere herein, or a longer period of time such as associated with the long term metrics described herein (see, for example, EQUATION 2 or EQUATION 3 and the corresponding description).

For each time step with respect to a single data portion, an activity ratio for the data portion may generally be determined and expressed as follows:

Activity ratio=time step rate/persistence rate  EQUATION A1

A value ARdpcalc may be used to represent the activity ratio determined using EQUATION A1 for a single data portion in an existing group for a time step.

If the time step rate is less than a specified threshold and the persistence rate is also less than the specified threshold, then the activity ratio may be forced or set to a default value such as one. Additionally, it is possible to impose a maximum value on the activity ratio determined using EQUATION A1 so that if the activity ratio exceeds the specified maximum value, the activity ratio may be set or forced to the maximum value. The maximum value may be selected to reflect known limits. For example, if the time step length is four hours, and the effective averaging interval of the persistence measure is twenty-four hours (one day), then the maximum ratio that can occur in a sustained fashion is six, since even if all of the activity tends to occur in one particular four hour period, the maximum ratio that would result is six to one.

A calculation of affinity between each data portion and a group (cluster) to which the data portion belongs may be performed at the end of each time step. As described below, the affinity may be calculated after each time step using EQUATION A1 along with an activity ratio determined for the data portion and an activity ratio determined for the group. The resulting affinity calculation for a particular data portion may be used to determine whether the particular data portion still belongs in the group.

The total activity ratio (ARgrp) for a group may be determined as follows:

$$ARgrp = \frac{\sum_{i=1}^{N} \text{Time step rate } i}{\sum_{i=1}^{N} \text{Persistance rate } i} \qquad \text{EQUATION A2}$$

where N is the number of data portions for the group.

The numerator of EQUATION A2 is the sum of all the time step rates over all the data portions in the group determined for the current time step. The denominator of EQUATION A2 is the sum of all persistence rates over all data portion in the group. The persistence rates may be determined to reflect data observed through the end of the current time step. It should be noted that the ARgrp calculation of EQUATION A2 may be subject to the same threshold and maximum values as noted above in connection with EQUATION A1.

The activity ratio ARdpcalc for a data portion for which the affinity measurement is being calculated is determined using EQUATION A1, as described above. If neither ARdpcalc nor ARgrp is above a threshold for the ratios (e.g., both are less than the threshold), then there is no change to the affinity for the data portion for the current time step. The threshold may be, for example, a real value greater than 1.0 such as 1.2. Alternatively, if either one or both of ARdpcalc nor ARgrp is above the threshold specified for the ratios, the affinity for the data portion for the current time step, Acalc, may be determined as the minimum of the two activity ratios, ARdpcalc and ARgrp. More formally, the affinity of a data portion in a group for a time step, Acalc, may be expressed as:

Acalc=MIN(ARdpcalc,ARgrp)  EQUATION A3

As a final operation for the current time step for the data portion, a smoothed or average affinity, Asmooth, for the data portion may be determined. Asmooth may be determined using Acalc values over multiple time steps. The smoothed affinity value, Asmooth, for the data portion of the group (cluster) may be stored and maintained rather than Acalc for each data portion and may be formally expressed as:

Asmooth=Aprev+alpha*(Acalc−Aprev)  EQUATION A4 where

Asmooth is the calculated smoothed affinity value for the data portion;

Aprev is the previous smoothed affinity value for the data portion from the previous time step (e.g., previously saved Asmooth value for the data portion determined from the immediately prior time step); and alpha is a weight that may be a real value between zero and one.

In this manner, the affinity value saved for each data portion included in a group may be Asmooth as in EQUA- TION A4. Asmooth may be characterized as a time averaged or weighted measurement of affinity for the data portion over multiple time steps. Asmooth may be determined using other appropriate techniques such as using a decayed value as described in EQUATION 2. The foregoing may be performed for each such data portion of an existing group for each time step that elapses.

A data portion associated with a group (cluster) may be removed from the group if the data portion's smoothed affinity, Asmooth, drops below a minimum affinity threshold. Such a data portion removed from an existing group becomes an unassociated data portion (e.g., data portion not associated with an existing group). Thus, Asmooth may represent the degree of affinity of a data portion with respect to the group to which the data portion belongs. In other words, the value of the affinity measurement Asmooth represents a similarity of behavior of the data portion with respect to the behavior of the group to which the data portion belongs. In some embodiments, a group may be deleted or dissolved if the number of data portions in the group drops below a minimum threshold number of group members. Data portions of a dissolved group become unassociated data portions.

As mentioned elsewhere herein, if a data portion does not belong to a group, the data portion may be characterized as unassociated. At predetermined time periods (e.g., once per day, once per every four hours, etc.), automatic group formation processing may be performed to determine whether to form a group of unassociated data portions. Initially, a list of unassociated data portions may be traversed to determine whether there are a specified or sufficient number of data portions meeting one or more group formation criteria. For a data portion to be included in a group, the criteria may require each data portion to have an activity ratio, ARdpcalc, greater than a specified threshold for one of the time steps included in the elapsed predetermined time period.

For a data portion to be included in a group (cluster), the criteria may also require that the data portion have an associated time step rate for the selected time step and/or persistence rate above a minimum absolute value or minimum threshold level. It is possible to randomly select one or more particular time steps in an elapsed time period for which the activity ratios of the unassociated data portions are examined or to perform group formation processing for each time step in the elapsed time period. The specified number of data portions indicating the minimum number of data portions meeting the criteria required to form a group may be predetermined and/or configurable. The threshold may be, for example, the threshold for the ratios described above used in connection with determining an affinity value for a data portion.

If there are a sufficient number of data portions having an activity ratio ARdpcalc greater than the specified threshold for a time step, a new group may be created that includes the data portions. In a similar manner, multiple groups may be formed where each group may be associated with a different time step in the elapsed time period. When a new group is formed, each data portion in the newly formed group may be assigned an initial affinity value similar to the affinity values described above (e.g., Asmooth). It is possible to assign a default initial affinity value, such as 2.0, to each data portion. Alternatively, it is possible to calculate the affinity, Acalc, for each data portion of the newly formed group by performing processing as described elsewhere herein. As another alternative, it is possible to assign an initial affinity value for Asmooth a data portion of a newly formed group that is the maximum of 2.0 and Acalc.

The system described herein may provide for automatically merging any two existing groups using the affinity measurement described above. For example, the system described herein may collect and maintain information on two groups for a minimum amount of time, such as a day, several days, and the like. Such minimum amount of time may be a multiple of the current time step and may, for example, be at least the time period over which the persistence rate is determined. For example, Asmooth may be determined with respect to two data storage entities that are two existing groups. At the end of the minimum amount of time, the affinity measurement Asmooth with respect to the two groups may be examined. If the Asmooth value with respect the two groups is more than a specified threshold, the two groups may be merged into a single group for purposes of subsequent processing in accordance with the system described herein.

It is also possible to automatically determine an affinity measurement, Asmooth, between two data portions. At the end of a minimum amount of time, the affinity measurement Asmooth with respect to the two data portions may be examined. If the Asmooth value with respect the two data portions is more than a specified threshold, the two data portions may be merged or included in the same group for purposes of subsequent processing, as described herein.

It is also possible to determine and maintain a set of bias values for each existing group (cluster). The bias values may be used to adjust workload predictions for a data portion of the group based on the persistence rate for the data portion. For example, a short term or long term metric determined for a data portion may be used as the persistence rate for the data portion when performing affinity calculation processing. The long term or short term metrics used as the persistence rate may be used in predicting future workload for the data portion and for modeling data movements between tiers of the data storage system. In this manner, the bias values for a group may be used to further adjust or revise the short term or long term metrics used in connection with modeling data movements and predicting future workload of the data portion and data storage system.

A set of bias values may be maintained per group of N data portions for each time step included in a larger time period where the time step may represent the time span over which the time step rate described above is determined and where the larger time period may represent the time span over which the persistence rate is determined. For example, the time step may be four hours and a short term rate is the persistence rate determined with respect to a time span of one day. In this case, there are six time steps in each twenty four hour day and a bias may be calculated for each of the six time steps, for each group.

The time step rate for the group (cluster) of N data portions for a single time step may be expressed as:

$$\sum_{i=1}^{N} \text{Time step rate } i \qquad \text{EQUATION A5}$$

where Time step rate i denotes the time step rate (for the single time step) of each data portion in the group (e.g., the numerator portion of the activity ratio as described elsewhere herein in connection with EQUATION A2).

The persistence rate for the group of N data portions may be expressed as:

$$\sum_{i=1}^{N} \text{Persistence rate } i \qquad \text{EQUATION A6}$$

where Persistence rate i denotes the persistence rate of each data portion in the group (e.g., the denominator portion of the activity ratio as described elsewhere herein in connection with EQUATION A2).

For a time span equal to the duration of a single time step, the bias for the single time step, BIAScalc, may be calculated using the time step rate for the group (e.g., EQUATION A5) and the persistence rate for the group (e.g., EQUATION A6) with respect to the single time step as follows:

if the time step rate for the group>persistence rate for the group, then

BIAScalc=(time step rate for the group/persistence rate for the group)−1 else if time step rate for the group<persistence rate for the group then

BIAScalc=1−(persistence rate for the group/time step rate for the group)

It should be noted that if the time step rate and the persistence rate are the same, then the bias may be zero.

In a manner similar to that as described herein with respect to Asmooth, a smoothed bias value BIASsmooth may be maintained for each period of the day or time step (e.g., each four hour window) for each group (cluster). BIASsmooth may be determined in any suitable manner as described herein for determining a smoothed affinity value, Asmooth. For example, BIASsmooth for a time step for a group may be determined using EQUATION A4. BIASsmooth may be determined, for example, as an average of multiple BIAScalc values for a particular time period spanning many days, weeks, etc., as a weighted average (e.g., different weights may be given to different bias values where those which are most recent are assigned a higher weight), using a rate of decay similar to the rate decay used with EQUATION 2. In this manner, a BIAScalc value may be determined for a current time period for each of six time periods in a day. For each of the six time periods, a revised smoothed bias, BIASsmooth, may also be determined and saved in a manner similar to that as described for Asmooth for each data portion with the difference that the BIASsmooth values are determined with respect to an existing group of data portions.

At different points in time, such as on a daily basis, an assessment may be made to determine whether a group (cluster) should be eliminated (disbanded) based on an insufficient level of bias. If a maximum bias across all time periods for the day is below a specified bias threshold level, then the group may be eliminated. The foregoing may be used, for example, in connection with tracking only groups having a high bias. The maximum bias value may be determined with respect to the BIAScalc values across all six time periods for a single day, and/or with respect to BIASsmooth values across all six time periods for a single day. Alternatively, it is possible to choose not to utilize the BIAScalc and/or the BIASsmooth values to eliminate a group if there is interest in tracking and using groups with low biases. Note that groups with low values indicate data portions that closely follow the group persistence measure.

It is also possible to perform an assessment at each time step to determine whether a group should be eliminated based on an insufficient level of bias. In this case, the group may be eliminated if, for any single time period, BIASsmooth is less than a specified bias threshold level.

In some embodiments, a group may be eliminated for an insufficient bias value only after the group has been in existence for a predetermined amount of time.

Figure 32:
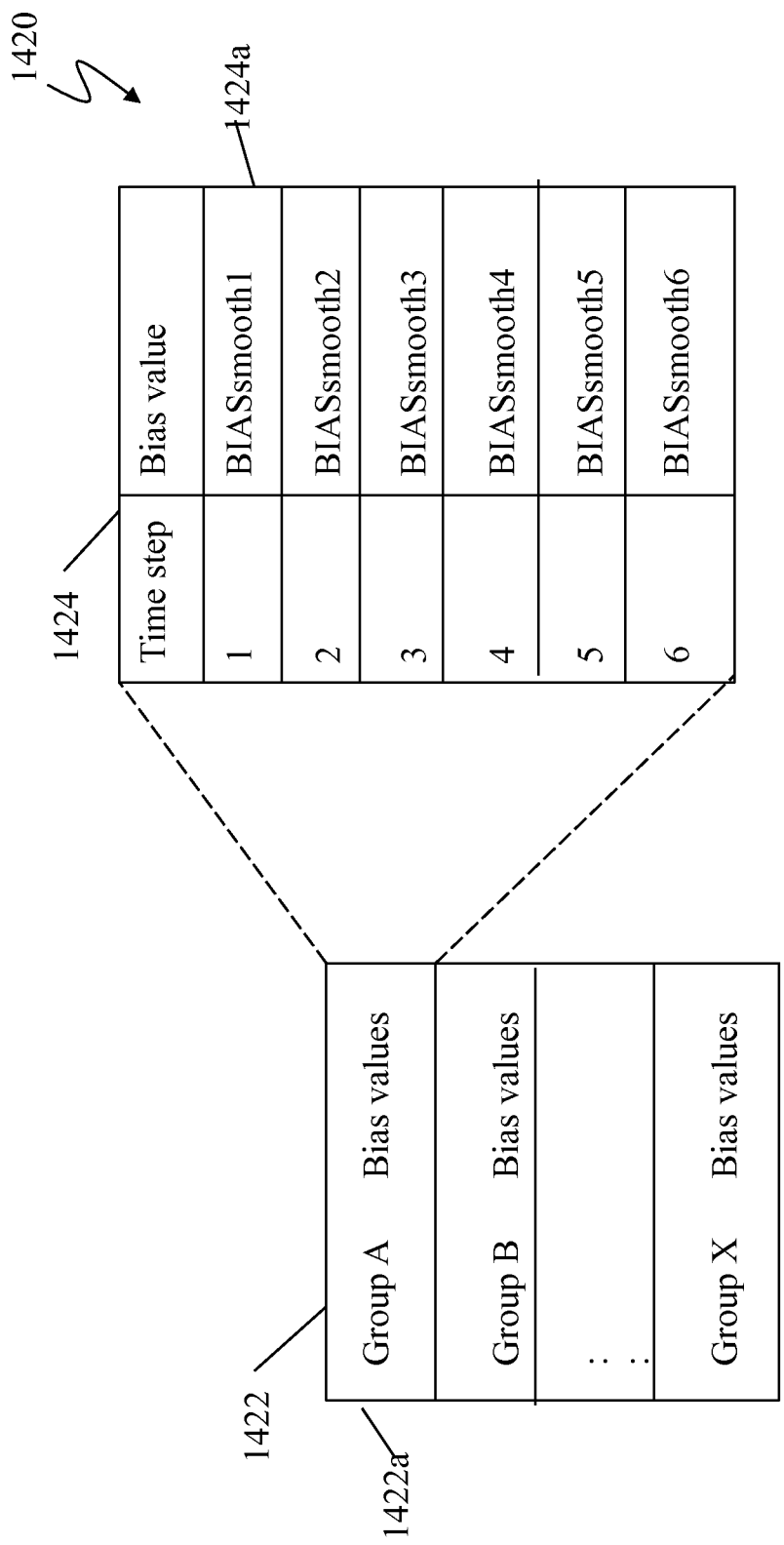
FIG. 32 shows a table including sets of bias values that may be maintained for existing groups according to an embodiment of the system described herein.

Referring to FIG. 32, a diagram 1420 illustrates bias values that may be maintained for each group of data portions. The diagram 1420 includes a table 1422 with an entry (row) for each existing group and an associated set of bias values for each group. For example, a row 1422a indicates that a set of bias values are maintained for a first group of data portions, denoted as Group A. An element 1424 illustrates in further detail bias values that may be included in a single entry of table 1422 for each group. In an embodiment of the system described herein, six smooth bias values, BIASsmooth, may be maintained and stored for each existing group. For example, the entry 1424a indicates that a first BIASsmooth value, BIASsmooth1, may be maintained for time step one. Each of the six time steps may correspond to a different four hour time period in a day so that, for example, time step one corresponds to the first four hours of a day (midnight to 3:59 am), time step two corresponds to the second set of four hours in a day (4 am to 7:59 am), etc.

Figure 33:
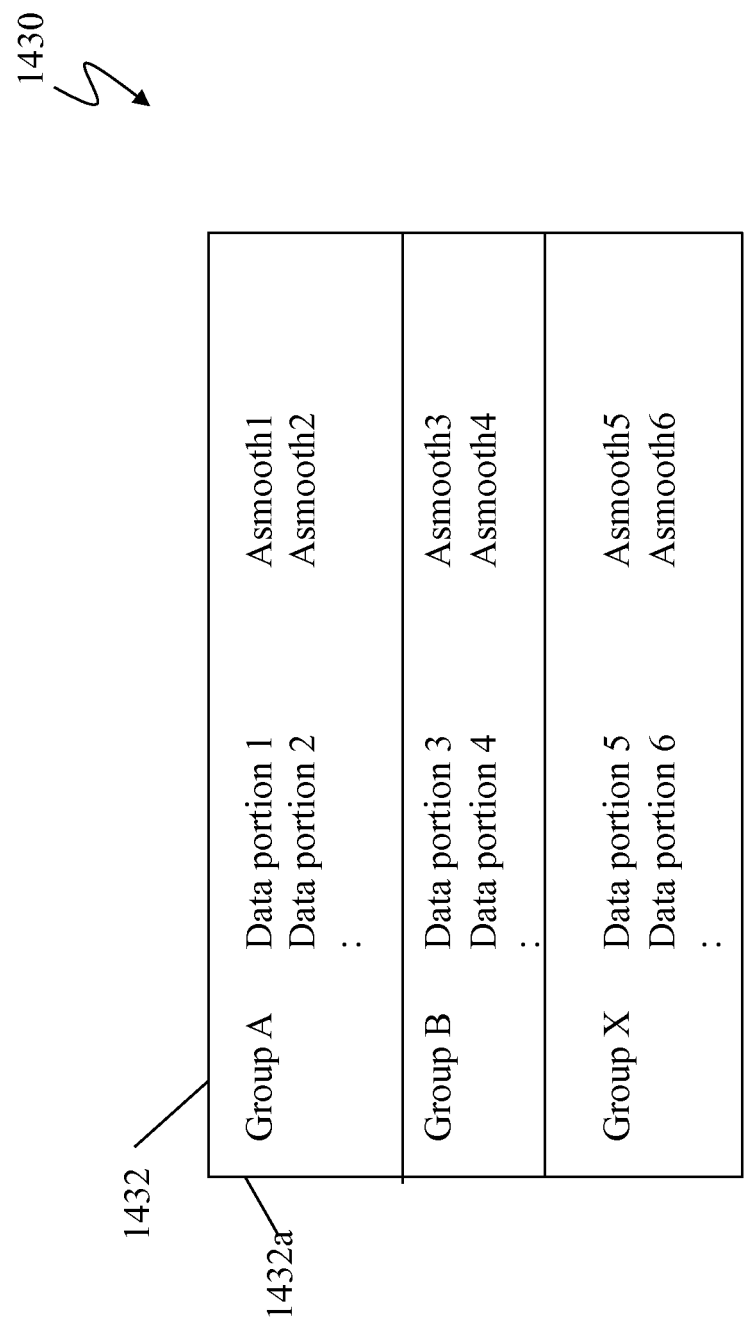
FIG. 33 shows a table including affinity measurements that may be maintained for data portions of existing groups according to an embodiment of the system described herein.

Referring to FIG. 33, a diagram 1430 illustrates Asmooth values and affinity measurements that may be maintained for each data portion included in a group. The diagram 1430 includes a table 1432 with an entry for each group. For example, the table 1432 includes an entry 1432a for group A. The entry for a group may identify particular data portions included in the group and may also include smoothed affinity measurements (Asmooth values) for the data portions in the group. For example, the entry 1432a indicates that data portion 1 and data portion 2 are included in group A and that affinity measurements Asmooth1 and Asmooth 2 may be respectively maintained for the data portions. It should be noted that the Asmooth values for data portions may be stored with other information that may be maintained for each data portion such as the different metrics for each data portion described in connection with FIG. 14. Each of the Asmooth values of the table 1432 may be determined as described above (e.g., EQUATION A4).

When making a prediction regarding extent or data portion level activity at different times of the day, the system described herein may determine a revised workload prediction using a selected bias value. For example, the system described herein may be used to model data storage system performance based on predicted or modeled workloads for data portions determined using scores and/or metrics such as illustrated in FIG. 14, etc. A bias value, BIASsmooth, determined with respect to one of the particular metrics for a particular time of day, may be used to determine a revised workload represented by the metric. For example, if processing is performed to determine scores for data portions at a particular time of day, workload for the data portions and associated scores may be determined using the short term and long term metrics of FIG. 14. Additionally, current values for the short term and long term metrics used in determining the scores may be further revised using selected bias values for such metrics.

As described herein, the exemplary use of biases maintained at fixed times of day is merely one example of how to identify and predict activity patterns of a group at a given time step compared to the aggregate persistence measure for the group (measured as a bias). The group level bias may also be predicted in other ways (e.g., spectral analysis), and once predicted, may be applied at an extent or data portion level as described.

For each data portion, processing may be performed to track and maintain data portion level metrics such as various short term and long term metrics described herein in connection with FIG. 14. It is possible to determine a bias value with respect to a persistence rate that is one of the short term or long term metrics or scores (determined as an aggregate of a combination of the short term and long term metrics) for the data portion. In this manner, the bias may be determined with respect to a particular one of the long term metrics, short term metrics, or score. When processing is performed to determine a modeled or predicted workload using one of the metrics for which a bias is determined, the bias may be used to further revise or modify the workload prediction for a particular time of day. In this manner, the persistence rate as described herein may be, for example, one of the metrics, such as random read miss (RRM) rate density (random read miss rate/GB or unit of storage) for which a corresponding short term metric is calculated (such as using EQUATION 2 and/or 3 with suitable decay rates and other values for this RRM rate density metric). The bias may be used to determine a revised value that is an updated version of the persistence rate representing a predicted workload used to model the workload of the data portion and also model or predict performance aspects of the data storage system.

For example, with reference to FIG. 14, it is possible to determine for each group of data portions a set of bias values (e.g., set of BIASsmooth values such as in FIG. 32) for each of the different short term and long term metrics used in calculating the score as in EQUATION 4. When calculating the score for the data portion, each of the short term and long term metrics used in calculating the score may be revised. For a data portion belonging to a group, one of the bias values may be selected based on the current time of day for which the score or predicted workload is determined. For example, with reference to FIG. 32, if a score is being determined for a data portion at 1 a.m., the bias value BIASsmooth1 for time step 1 (1424a) may be used. In a similar manner, the time at which the data storage system modeling is performed may be mapped to a corresponding four hour time step interval to select one of the BIASsmooth values associated with the time step. Using such a selected one of the bias values for the group to which the data portion belongs, the particular metric representing a predicted revise metric used to predict workload may be revised. The predicted revised metric represents an expected workload bias such as a revised workload for the short term RRM rate density metric of the data portion. The predicted revised metric is determined as follows:

If the bias>0, then the predicted revised metric value used in the score is modified to be current metric*(1+bias)

if the bias is <0, then the predicted revised metric value used in the score is modified to be current metric/(1+|bias|)

where
bias is the selected bias value, BIASsmooth, for the particular metric for the particular time step;
|bias| is the absolute value of the selected bias for the particular metric for the particular time step; and current metric represents the currently stored value for the metric such as described in FIG. 14 (e.g., such as the short term RRM rate density metric).

Thus, in the example above, a set of smooth bias values may be determined per group, for each long term and short term metric used in calculating a score, such as the promotion score of EQUATION 4. For each data portion in one of the groups, processing may determine revised values for each long term and short term metric used in calculating the score for the data portion. The revised metric values may be determined in accordance with a selected one of the group bias values. The bias value selected may be for a time step corresponding to the particular time for which modeling is being performed using the score. In this manner, the workload prediction for the data portion may be adjusted based on an expected bias for that group at that particular time of the day. As a variation to the foregoing, rather than determine a set of bias values for each metric used in calculating the score, it is possible to use the score per data portion as the single metric for which affinity based group processing is performed and for which the set of bias values per group is determined.

It should be noted that the affinity measurements and processing and bias measurements and processing described above may be performed generally with respect to any suitable metric. A bias value may be used to further modify expected or predicted workload of a data portion used to model performance of the data storage system, such as in connection with data movement optimizations as described herein. The metric may be, for example, a density metric selected for use that is based on the short term or long term metric and number of active subextents such as in EQUATION 4 (e.g., activity or workload for the data portion may be determined with respect to the number of active subextents or with respect to some unit of storage such as per GB). It is also possible to use metrics based on pure I/O rates (e.g., number of reads/second, number of writes/second, number of RRM/second, number of sequential read misses/second) without considering a density with respect to a unit of storage. The system described herein may use different bias values determined to predict workloads at different points in time of the day using appropriately selected bias values. In this manner, the system described herein may be used to form affinity based groupings and group-based bias values used to perform data portion level workload forecasting and prediction when modeling data storage system performance. Thus, the system described herein provides for identifying groups of data portions which may be characterized as exhibiting an aspect of similar behavior useful in an automated storage tiering environment for data storage movement optimizations.

The system described herein may also be used in modeling aspects of data storage systems which are external with respect to the data storage system including the data storage optimizer and code performing the techniques herein. For example, the system described herein may be used in connection with modeling aspects of an external data storage system described in U.S. Pat. No. 8,688,878, issued on Apr. 1, 2014 and titled DATA STORAGE SYSTEM MODELING and U.S. patent application Ser. No. 13/729,680, filed Dec. 28, 2012, entitled DATA STORAGE SYSTEM MODELING, both of which are incorporated by reference herein.

As described herein, a determination of similarity of behavior of a given pair of storage elements (note that either element could be an individual extent, or a group of extents) at a given time is based on a rate of activity at a current time step (time step rate) compared to the persistence rate (e.g., a timed averaged measure of recent storage access activity). The minimum timeframe over which the similarity assessment is evaluated is referred to as a 'time step'. The length of a time step may be chosen to be shorter than the characteristic averaging time frame of the persistence measure—but long enough to smooth out noise. So, for example, as described above, the length of the time step may be four hours and the characteristic time frame is one day for the persistence rate (e.g., such as with short term metrics). The similarity comparison for two elements for a given time step may be assessed as follows:

- If the time step rates for the time step for both elements are both well above their respective persistence rates (e.g. more than a threshold amount above persistence rates), then the elements may be considered to be behaving in a significantly similar way.
- If both elements had time step rates that were close to (e.g., within a threshold amount of), or below, their respective persistence rates, then no significant presence of (or lack of) similarity is considered to have been demonstrated. It should be noted that as a variation, it is possible to attach some level of significance to the case in which both elements are near their persistence level or both extents are below their persistence levels at the same time. However, there may be less significance attached in these cases than in the case in which both elements have current time step rates that are well above their persistence rates.
- If one element had a time step rate that was well above its persistence rate and the other element does not, then the elements may be considered to be behaving in a significantly dissimilar way.

Note that the persistence rate may be characterized as the reference level from which to judge the significance of deviations when determining a measurement of affinity and similarity.

This affinity measurement, such as Asmooth described herein, may be used to enable the a grouping strategy. For each data portion, an affinity measure is maintained that reflects the similarity of the behavior of the data portion with respect to the behavior of the group to which the data portion belongs. The value of the affinity measure for a data portion may be used to determine whether the data portion should remain in the group.

Figure 34:
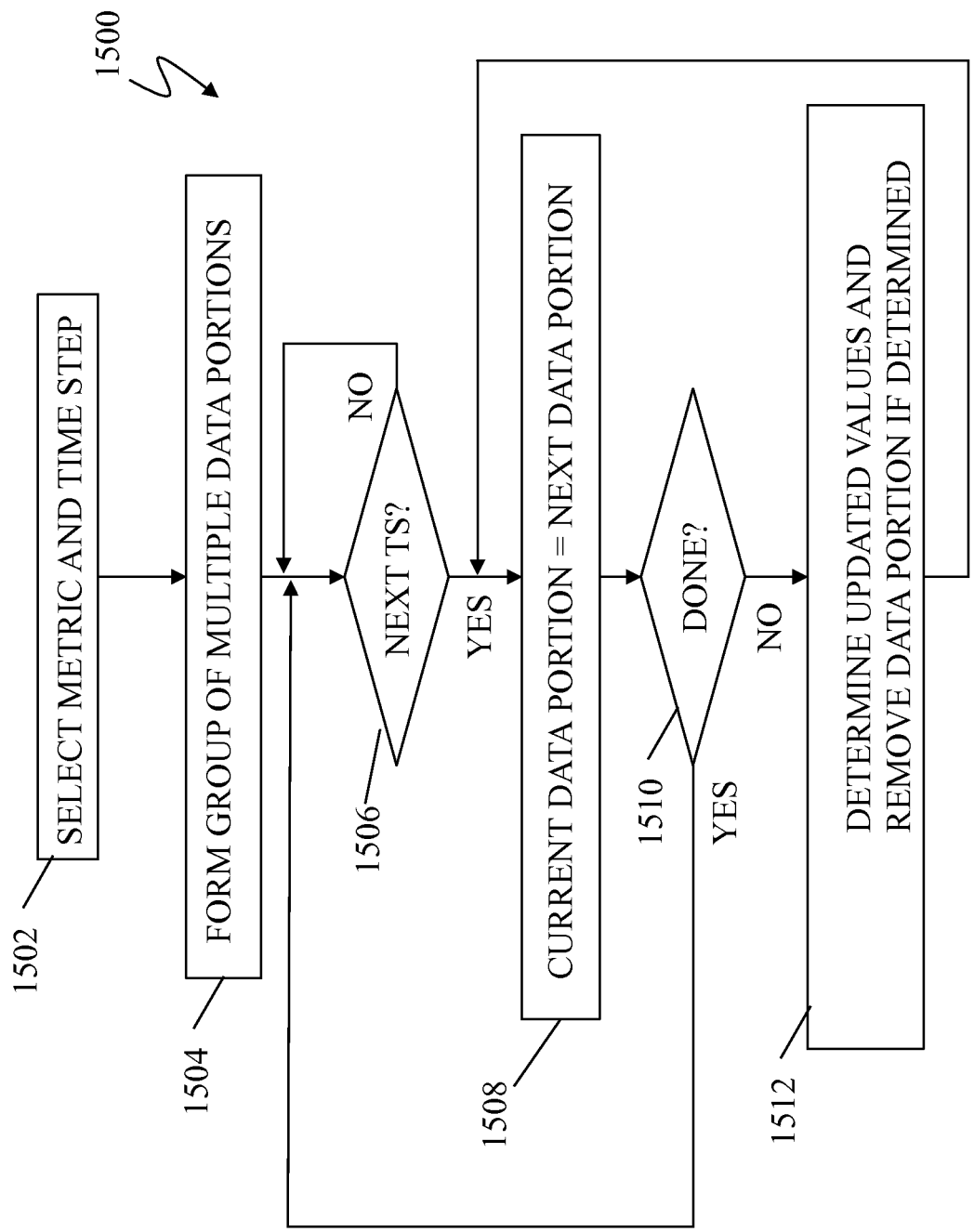
FIG. 34 is a flowchart illustrating processing that may be performed in connection with determining updated values and adjusting group membership according to an embodiment of the system described herein.

Referring to FIG. 34, a flowchart 1500 indicates processing that may be performed in connection with determining updated values and adjusting group membership. Processing begins at step 1502 where a metric is selected for which the affinity measurement or calculation is performed and a time step for assessment (time step) is also selected. Following the step 1502 is a step 1504 where a group of multiple data portions may be formed as described elsewhere herein. Each group may include a number of data portions. As also described herein, an initial set of groups may be formed at the step 1504 and additionally the set of existing groups and associated data portions may be updated at various points in time.

Following the step 1504 is a step 1506 where a determination is made as to whether a next time step (TS) has elapsed for performing affinity calculations for a group. The step 1506 essentially represents a polling step where processing loops back to the step 1506 until an amount of time has elapsed for another time step, at which point control proceeds to a step 1508 where a variable current data portion is assigned a next data portion in the group. Following the step 1508 is a step 1510 where a determination is made as to whether affinity-based processing for the group is complete for the current time step. If so, control transfers back to step 1506 to wait for the next time step.

If it is determined at the step 1510 that affinity-based processing is not complete, then control proceeds to a step 1512 to determine an update value for the smoothed or average affinity, Asmooth, with respect to the current data portion and the group to which the current data portion belongs. At the step 1512, a determination is made as to whether the Asmooth value for the current data portion is less than a minimum affinity threshold and, if so, the data portion is removed from the group. Following the step 1512, control transfers back to the step 1508 to process a next data portion of the group.

Figure 35:
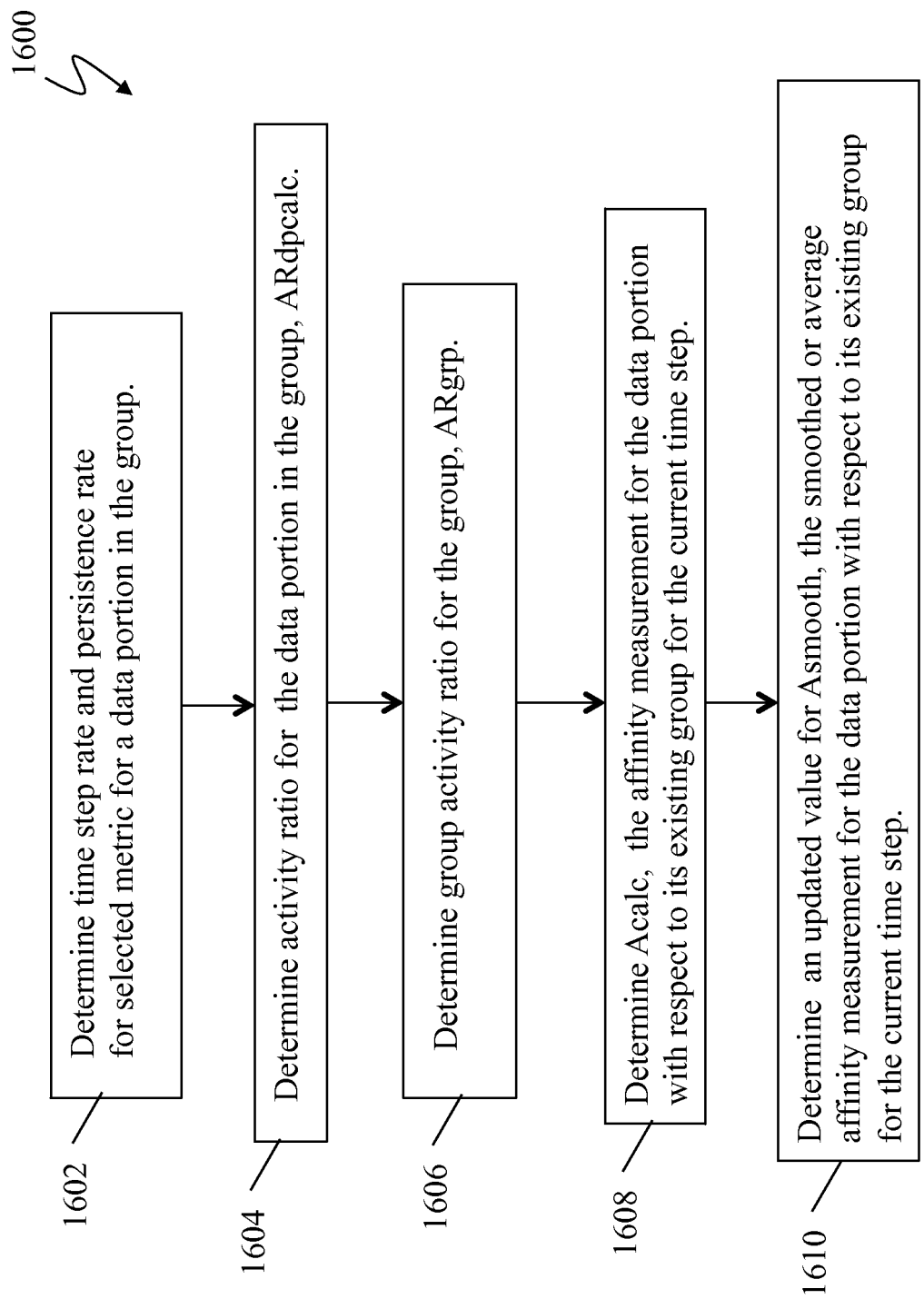
FIG. 35 is a flowchart illustrating processing performed in connection with calculating and updating an affinity measurement according to an embodiment of the system described herein.

Referring to FIG. 35, a flowchart 1600 illustrates processing performed in connection with calculating and updating the affinity measurement, Asmooth, for a current time step for a single data portion in an existing group with respect to a selected metric. Processing begins at a first step 1602 where a time step rate and persistence rate for the selected metric for the data portion in the group is determined. Following the step 1602 is a step 1604 where the activity ratio for the data portion, ARdpcalc, is determined. Following the step 1604 is a step 1606 where a group activity ratio, ARgroup, is determined. Following the step 1606 is a step 1608 where Acalc is determined. As discussed elsewhere herein, Acalc is a measure of the affinity at the current time step for the data portion with respect to the group containing the data portion. Following the step 1608 is a step 1610 where an updated value for Asmooth is determined. As discussed elsewhere herein, Asmooth is a smoothed or average affinity value at the current time step for the data portion with respect to the group containing the data portion.

Figure 36:
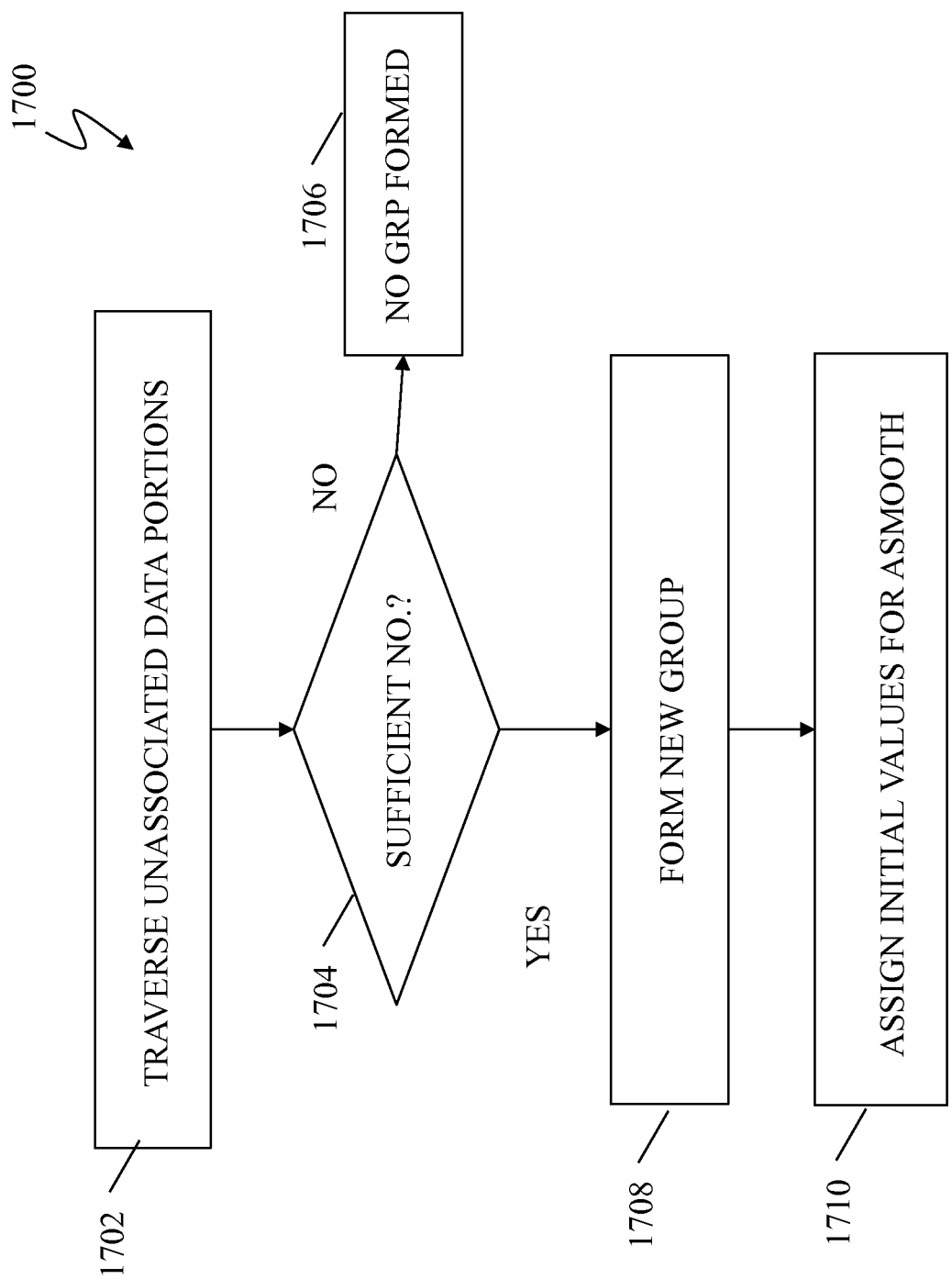
FIG. 36 is a flowchart illustrating processing for forming a group according to an embodiment of the system described herein.

Referring to FIG. 36, a flowchart 1700 illustrates processing for forming a group. The processing illustrated by the flowchart 1700 may be performed at any time interval, such as at each time step, or may be performed aperiodically. Processing begins at a step 1702 where a list of unassociated data portions is traversed to select a set of data portions meeting group formation criteria, as described elsewhere herein. Following the step 1702 is a step 1704 where it is determined whether there are a sufficient number of data portions that meet group formation criteria, as described elsewhere herein. If not, then control proceeds to a step 1706 indicating that no group is formed. Alternatively, if it is determined at the step 1704 that there are sufficient number of data portions to form a group, then control proceeds to a step 1708 to form a new group that includes the set of data portions meeting the group formation criteria as determined in step 1702. Following the step 1708 is a step 1710 where each data portion in the new group is assigned an initial affinity value that may be used as an initial value for Asmooth with respect to each data portion of the newly formed group.

Figure 37:
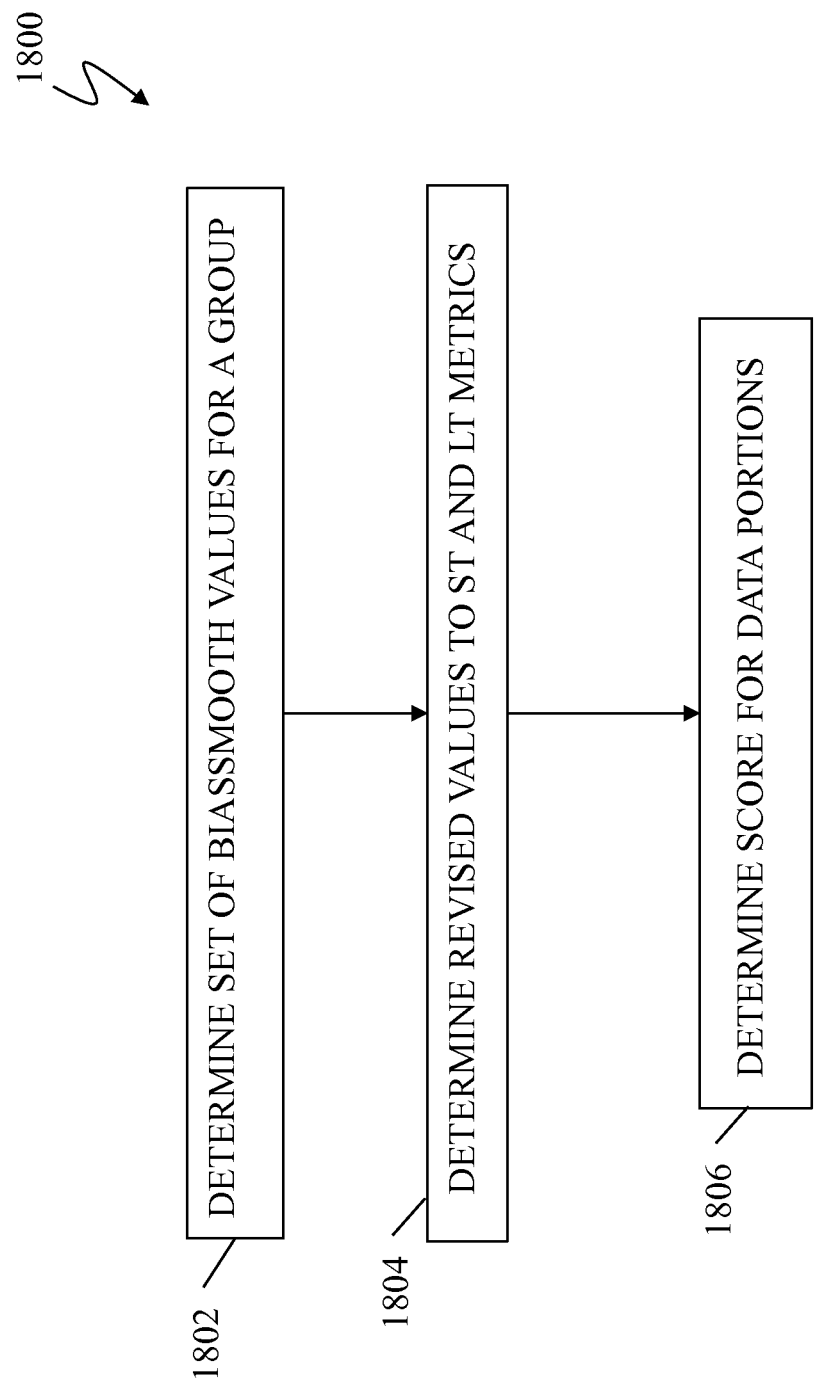
FIG. 37 is a flowchart illustrating processing performed that may be performed to determine a set of bias values for a group per time step and for selected metrics for which affinity-based groups are determined according to an embodiment of the system described herein.

Referring to FIG. 37, a flowchart 1800 illustrates processing that may be performed to determine a set of bias values for a group per time step and for selected metrics for which affinity-based groups are determined. A set of bias values may be determined for each metric used in calculating a score, such as the promotion score of EQUATION 4. Processing begins at a step 1802 where a set of BIASsmooth values for each metric (e.g. short term or long term-based), used in calculating a data portion score, is determined for each group. Each short term or long term metrics may be used as the persistence rate for the data portions in the group. In each set of BIASsmooth values, there may be one BIASsmooth value per time step (e.g., every different four hour time interval) within a time period (e.g., a day). Following the step 1802 is a step 1804 where, for each data portion in the group, processing is performed to determine revised values for each short term and long term metric used in calculating the score of the data portion. The revised metric value may be determined using a selected one of the group BIASsmooth values for the group where the particular value selected from the set may be based on the time at which a workload prediction or score for the data portion is being determined. Following the step 1804 is a step 1806 where a score for the data portions may be determined using the revised biased metric values for the data portion. In some cases, it is possible to use a score, such as a score determined using EQUATION 4, which represents a collective result of weighted metrics as the single metric for which the affinity-based groups are formed and from which a set of bias values per group are determined. Of course, any other suitable metric may be used in connection with the system described herein.

In some cases, data usage patterns follows business cycles for accessing the data so that data may be accessed more frequently during one part of the business cycle as opposed to another part of the business cycle. For example, data corresponding to documents created and edited by employees of a company may be considerably accessed on Monday through Friday and infrequently accessed on weekends. In such a case, updating the cluster information for the data over the weekend may not be so useful since the access during the Monday through Friday part of the business cycle is independent of access during the weekend part of the business cycle. Note also that, there may be multiple, overlapping, business cycles. For example, there could be first business cycle corresponding to a weekend/weekday division and a second, independent, business cycle corresponding to a pre-planned event, such as processing performed in connection with weekly payroll.

In an embodiment of the system described herein, separate, independent, sets of cluster parameters and corresponding groupings may be maintained for each of a plurality of pre-determined business cycles. For example, it is possible to identify weekends and weekdays as a possible business cycle and thus maintain a first set of cluster parameters for weekday activity only, a second set of cluster parameters for weekend activity only, and a third set of cluster parameters for all of the days of the week. A decision to move data from one tier to another can take into account all of the cluster parameters and determinations using, for example, a weighted formula. Note that, as discussed elsewhere herein, it is possible to use different cluster metrics. Thus, it is possible to use different metrics for each business cycle. In an embodiment of the system described herein, the system maintains cluster parameters and calculations for the read miss (RM) metric, the serial read (SR) metric, and the write (WR) metric, for each of the weekend, weekday, and every day business cycles, thus maintaining nine separate sets of cluster parameters and calculations (i.e., nine different sets of values for Asmooth, nine different sets of values for BIASsmooth, etc.).

Figure 38:
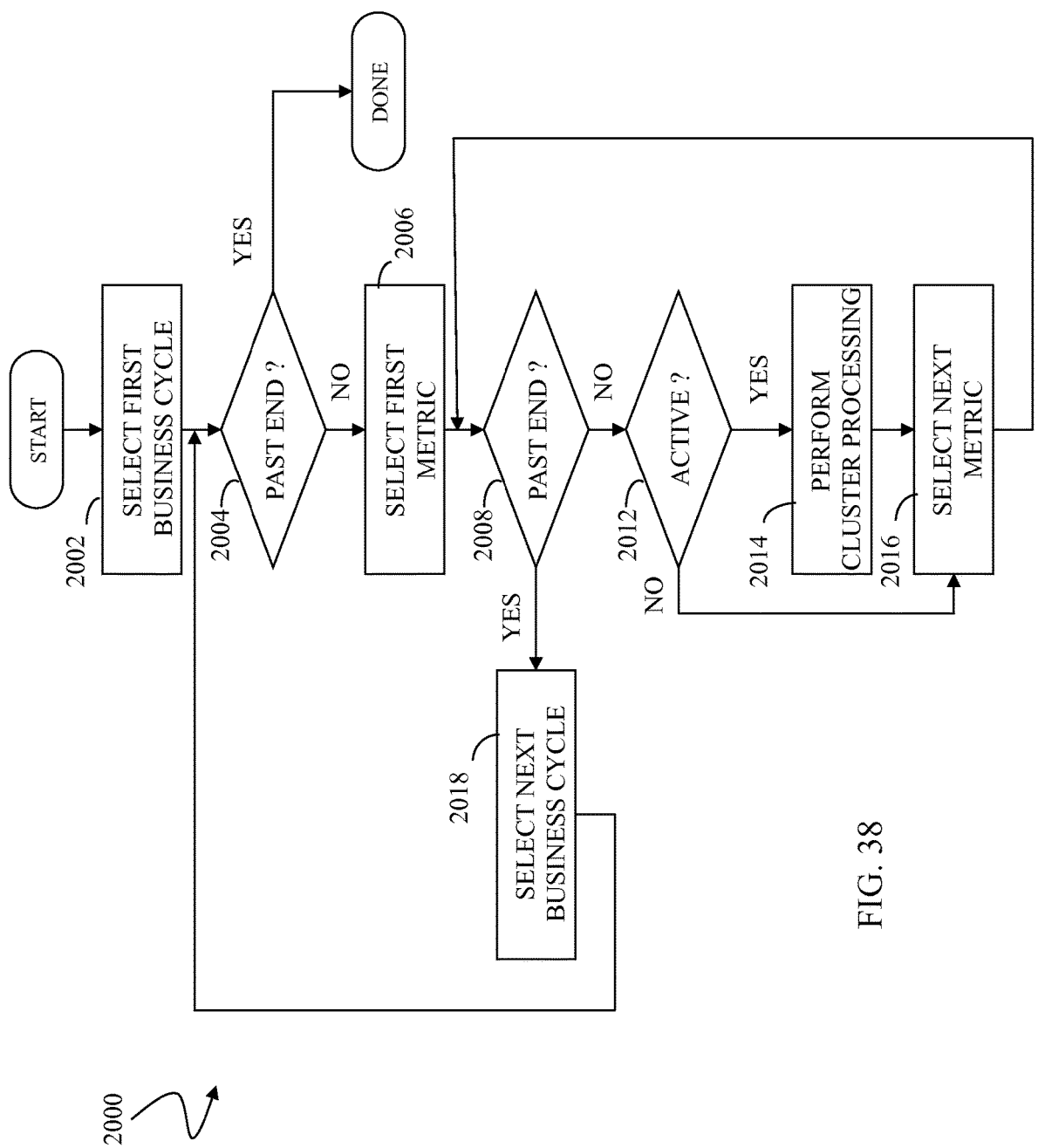
FIG. 38 is a flowchart illustrating processing performed during each time step in connection with handling a plurality of cluster metrics during different business cycles according to an embodiment of the system described herein.

Referring to FIG. 38, a flowchart 2000 illustrates processing performed during each time step in connection with handling a plurality of cluster metrics during different business cycles. Processing begins at a first step 2002 where an iteration counter that iterates through different business cycles is set to point to a first one of the business cycles. Following the step 2002 is a test step 2004 where it is determined whether all of the business cycles have been processed (i.e., if the iteration counter points past the end of a list of business cycles). If so, then processing is complete. Otherwise, control transfers from the test step 2004 to a step 2006 where a different iteration counter, used to iterate through all of the cluster metrics being used (e.g., read miss, write, etc.) is set to point to the first of the metrics. Following the step 2006 is a test step 2008 where it is determined whether all of the metrics have been processed (i.e., if the iteration counter points past the end of a list of cluster metrics). If not, then control transfers from the test step 2008 to a test step 2012 where it is determined whether the current time step is an active time step for the business cycle indicated by the business cycle iteration counter. For example, if the iteration counter indicates that the weekday business cycle is being processed, then the current time step is considered active if it is within a weekday and is otherwise not active.

If it is determined at the step 2012 that the current time step being processed is active, then control transfers from the test step 2012 to a step 2014 where cluster process, as described elsewhere herein, is performed. The cluster processing performed at the step 2014 includes updating Asmooth, updating BIASsmooth, etc. Following the step 2014 is a step 2016 where the iteration counter used for iterating through the metrics is incremented. Note that the step 2016 is reached directly from the test step 2012 if the current time step is not active for the business cycle being processed. Thus, for example, if the current time step is part of a Saturday, and the business cycle being processed corresponds to weekdays, then the current time step is not active for the business cycle being processed and control would transfer from the step 2012 directly to the step 2016. Following the step 2016, control transfers back to the step 2008, described above, for another iteration. Note that, if it is determined at the test step 2008 that the iteration counter that iterates through the metrics has iterated through all of the metrics (i.e., points past the end of a list of metrics), then control transfers from the test step 2008 to a step 2018 where the iteration counter that iterates through the different business cycles is incremented. Following the step 2018, control transfers back to the step 2004, described above, for another iteration.

It is possible to determine a coherence value for a cluster that corresponds to how consistently the data portions are active and inactive together at each of the time steps. A relatively high coherence value for a cluster indicates that all of the data portions of the cluster tend to become active and inactive at the same time within a particular time step. Note that the cluster coherence may be somewhat separate from the affinity determination(s) used to form clusters and manage membership thereof. This is because of inherent delays built in to the calculations used to determine cluster membership. Thus, for example, a cluster might be not coherent during a time step even though membership of the cluster is maintained constant throughout the incoherent time step. For example, a time step that includes employee lunch time could see otherwise coherent clusters become incoherent during lunch time because employees are not accessing data or are accessing different data during their break.

In an embodiment of the system described herein, overall cluster coherence may be calculated at each time step using the mean weighted activity ratio of each data portion and the weighted variance of the activity ratios of the data portions, where the weighting used for each particular one of the data portions is the time step rate for the particular data portion. The weighted variance may be determined using convention weighted variance determination mechanisms, such as a single-pass weighted variance calculation technique, which is known in the art.

The cluster coherence may be used as a measure of confidence in values determined for a cluster during a particular time step. Note also that, since the system described herein is using clusters to move a group of data portions based on algorithms applied to one or a subset of the data portions, then decreasing the coherent of the cluster reduces the effectiveness of this. Accordingly, in an embodiment of the system described herein, it is possible to establish a predetermined threshold that is compared with the cluster coherence value and, if the cluster coherence value is less than the pre-determined threshold, none of the data portions of the cluster are promoted or demoted based on any algorithm application to the cluster and/or data portions thereof. Alternatively, depending upon the promotion/demotion mechanism that is used, the cluster coherence value can be used to weight any score or other value that is used to determine whether to promote or demote data portions in the cluster so that a relative low cluster coherence would tend to inhibit data movement.

It is also possible to use the cluster coherence determination to dynamically adjust the value of alpha in EQUATION A4 (above) so that Asmooth tends to change less as the cluster coherence decreases. In an embodiment of the system described herein, alpha is proportional to the value of the cluster coherence, although other relationships are possible so long as, generally, alpha increases as cluster coherence increases and vice versa.

The cluster coherence values may also be useful in connection with detecting business cycles. Note that the processing illustrated by the flowchart 2000 is useful when a business cycle corresponding to specific data access can be anticipated and pre-programmed into the system. Some business cycles are predictable, such as weekend/weekday cycles, days when payroll is run, etc. However, there may be other business cycles that are dynamic and become apparent after the system becomes operational and that possibly change over time while the system is running. The cluster coherence value can be used to detect the dynamic business cycles. The dynamic business cycles may be used to manage clusters and predict future data usage. Thus, in addition to the pre-determined business cycles, such as the weekend and weekday cycles, the system described herein may also detect and maintain cluster information for dynamic business cycles based on cluster coherence determinations.

Figure 39:
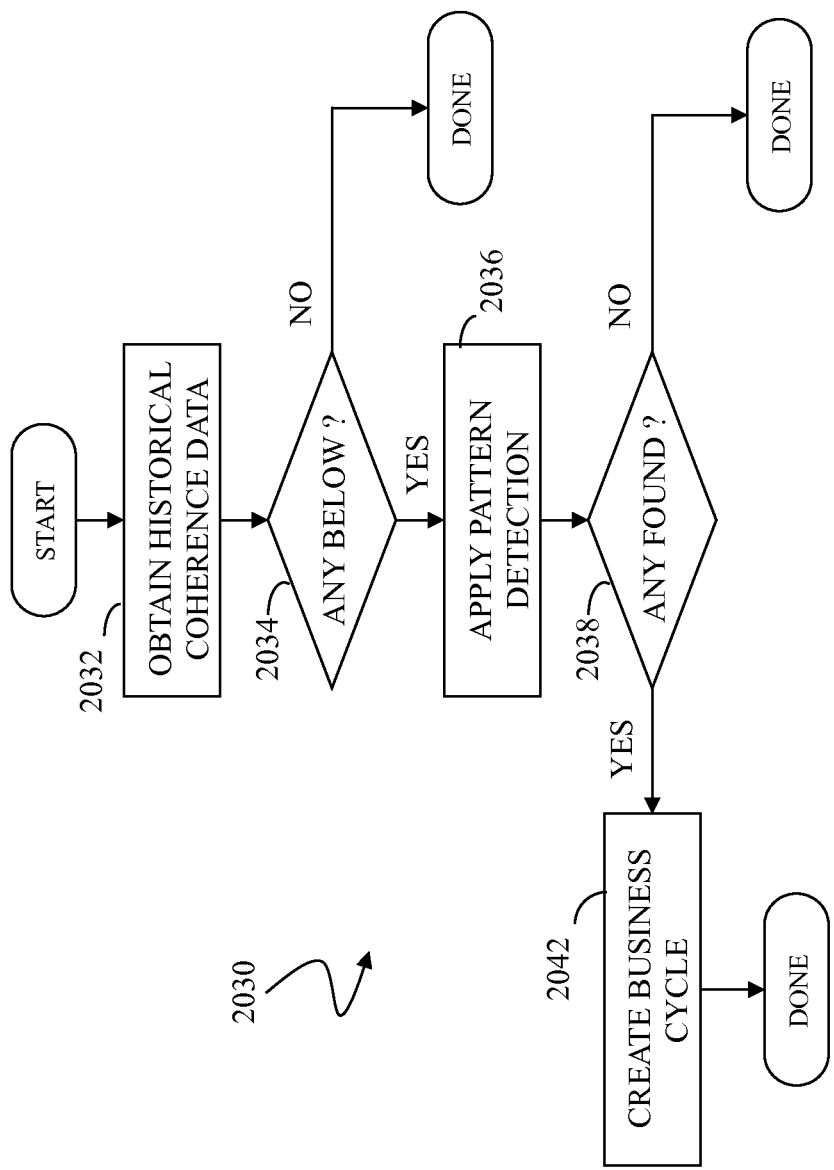
FIG. 39 is a flowchart illustrating processing performed in connection with detecting dynamic business cycles according to an embodiment of the system described herein.

Referring to FIG. 39, a flowchart 2030 illustrates processing performed in connection with detecting dynamic business cycles. Processing begins at a first step 2032 where historical cluster coherence data is obtained. Note that detection of a dynamic business cycle using cluster coherence data includes detecting a repeatable pattern in the cluster coherence values for a particular cluster. Thus, for example, to detect a pattern with a period of ten days, it may be useful to have thirty to forty days worth of data. In any event, an appropriate amount of data needed to detect patterns of interest is obtained at the step 2032.

Following the step 2032 is a test step 2034 where it is determined if any of the data is below a pre-determined threshold. Note that, if all of the data in the sample that is obtained at the step 2032 is relatively coherent (all above the predetermined threshold), then there are no dynamic business cycles that can be detected by changes in the cluster coherence. Accordingly, if it is determined at the test step 2034 that none of the data obtained at the step 2032 is below a predetermined threshold (the data is never relatively incoherent), then processing is complete and no dynamic business cycles are created. Otherwise, control transfers from the test step 2034 to a step 2036 where pattern detection is performed to detect any periodic patterns (e.g., one per week, every nine days, every other day at three pm, etc.) in the value of cluster coherence for a cluster. Pattern detection at the step 2036 may be performed using conventional pattern detection algorithms.

Following the step 2036 is a test step 2038 where it is determined if any patterns were successfully detected. If not, then processing is complete and no dynamic business cycles are created. Otherwise, control transfers from the test step 2038 to a step 2042 where one or more dynamic business cycle(s) are created, depending on the number of patterns detected at the step 2036. The dynamic business cycle created at the step 2042 is similar to the pre-determined business cycle(s) discussed above in that there is an active period when cluster parameters are obtained and determined and an inactive period when the cluster parameters are not modified. There is also a dynamic set of cluster parameters assigned to each of the dynamic business cycles. Note that the number of dynamic business cycles that can be created is limited by available resources of the system (i.e., available memory for storing cluster parameters, available processing power for performing the necessary processing, etc.). Following the step 2042, processing is complete.

There are other mechanisms available for predicting activity of a particular unit of storage. In an embodiment of the system described herein, activity level of a particular unit of storage, such as an extent, a cluster, a LUN, a set of LUNs, etc., which is referred to herein as a "target", is predicted by activity level of precursor storage. The precursor storage is a unit of storage (e.g., extent, cluster, LUN, set of LUNs, etc.) that may or may not be different than the target. Whenever the precursor storage demonstrates a signature activity level, the system promotes the target storage based on an anticipated increase in access activity level. The precursor/target relationship(s) may be established by pre-defined rules, may be externally supplied, or may be discovered. Precursor/target relationship(s) established by pre-defined rules or externally supplied are provided by a system designer or technician with knowledge of the storage system. For example, a rule may be externally supplied based on the knowledge that access to storage corresponding to employee hourly data (precursor storage) precedes access to storage used for payroll process (target storage).

The precursor may be a sequence of specific access activity rates that occur in a specified order within some period of time prior to increased activity of the target storage. In some cases, the starting time of a first element of the precursor sequence can be any time because the precursor may be defined based on an order in which accesses take place. The sequence of activity rates that define the precursor may be specified as absolute access rates or as rates relative to a baseline rate for the unit of precursor storage.

Figure 40:
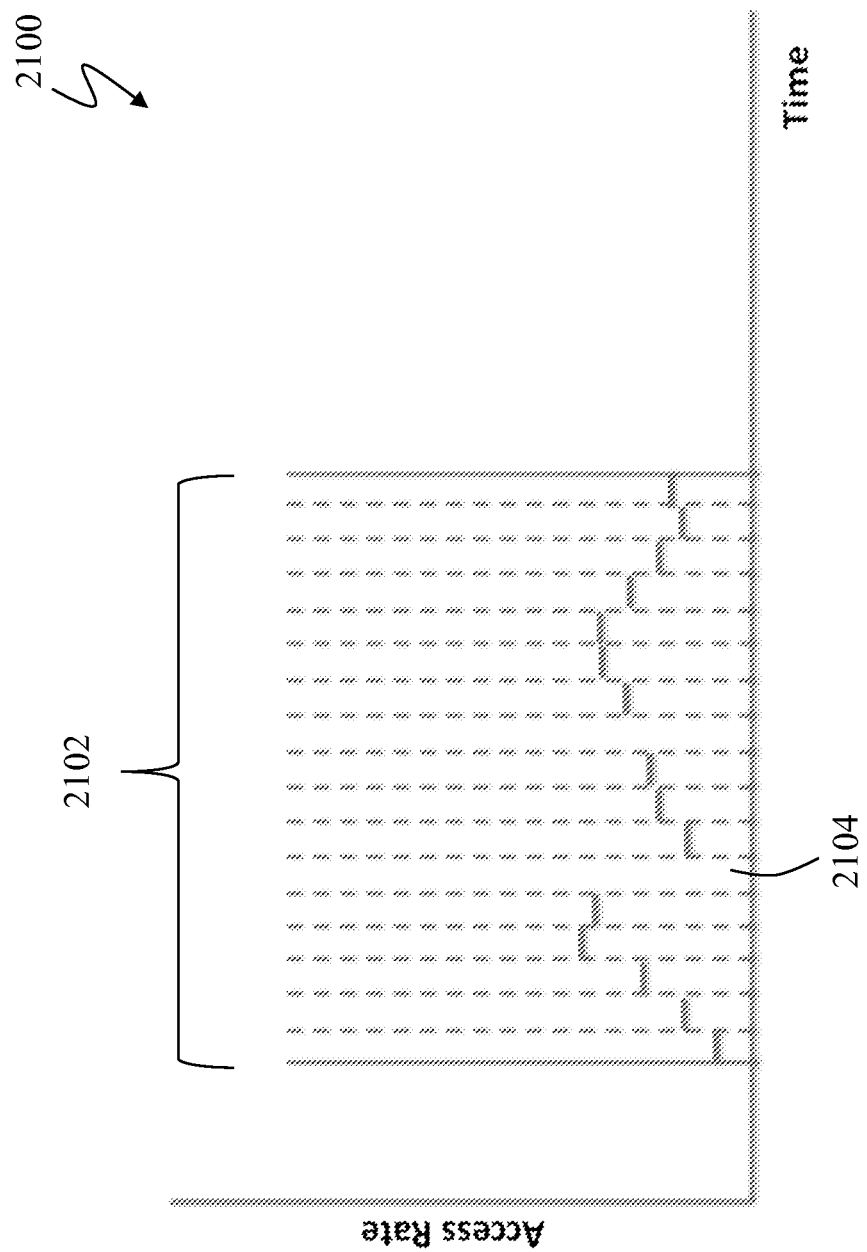
FIG. 40 is a diagram illustrating a precursor rate profile according to an embodiment of the system described herein.

Referring to FIG. 40, a diagram 2100 illustrates a precursor rate profile 2102. An interval corresponding to the precursor rate profile 2102 is subdivided into a plurality of sub-intervals, most of which have a defined access level, indicated by a horizontal line across each of the sub-intervals. A particular sub-interval 2104 does not have a defined access level, indicating that any access level that is observed for the sub-interval 2014 is considered a perfect match for the sub-interval 2104.

The degree to which the access rates of observed accesses match a particular precursor rate profile may be measured by first calculating observed access rates for each sub-interval, beginning at a start time corresponding to the first sub-interval in a sequence of sub-intervals, and for each of the subsequent sub-intervals. Then, for each sub-interval, a difference (error) between the observed access rate and the defined rate for each sub-interval may be calculated. As indicated by the sub-interval 2104, it is possible to have particular sub-interval(s) in a precursor be specified to always score as a perfect match (wild carded) so that a calculated error(s) for the particular sub-interval(s) are always zero.

Strength of a match between observed access rates and defined access rates in a precursor interval may be reduced to a single number using any one of a plurality of possible techniques. For example, a Euclidian distance between vectors may be calculated using observed and defined precursor rates for each sub-interval (the square root of the sum of the squares of the sub-interval errors). Note that the availability of a strong match for a given precursor depends on a length of the precursor interval, the number of sub-intervals, and how many sub-intervals are wild-carded. Longer intervals are desirable to reduce the chance of false positives, but as the length of the intervals increases, the chance of matching observed access rates decreases. In an embodiment of the system described herein, a sub-interval time of a few hours and a precursor interval of twelve to thirty-six hours is used.

Predictions associated with a precursor relate to a future workload of target storage which may be the same storage that contains the precursor storage and/or different storage. Thus, the target storage may be the same as the precursor storage, may be completely different from the precursor storage, or may partially include some of the precursor storage and/or different storage. Note that a precursor may have more than one target. Generally, when a precursor access pattern is observed with a strong enough match between observed access rates and defined access rates, then forecasts can be made for the prediction target storage. The confidence and preciseness of the forecasts may depend on how consistent workload activity has been on the prediction target following past occurrences of the precursor (especially more recent past occurrences) with similarly close matches. If the storage access rates on the target storage have had a wide range of behaviors following occurrences of the precursor, the predictive power of the precursor may be limited or null. However, in cases where the target storage exhibits a consistent access rate pattern following occurrences of the precursor, it may be possible to make confident, precise predictions.

Figure 41:
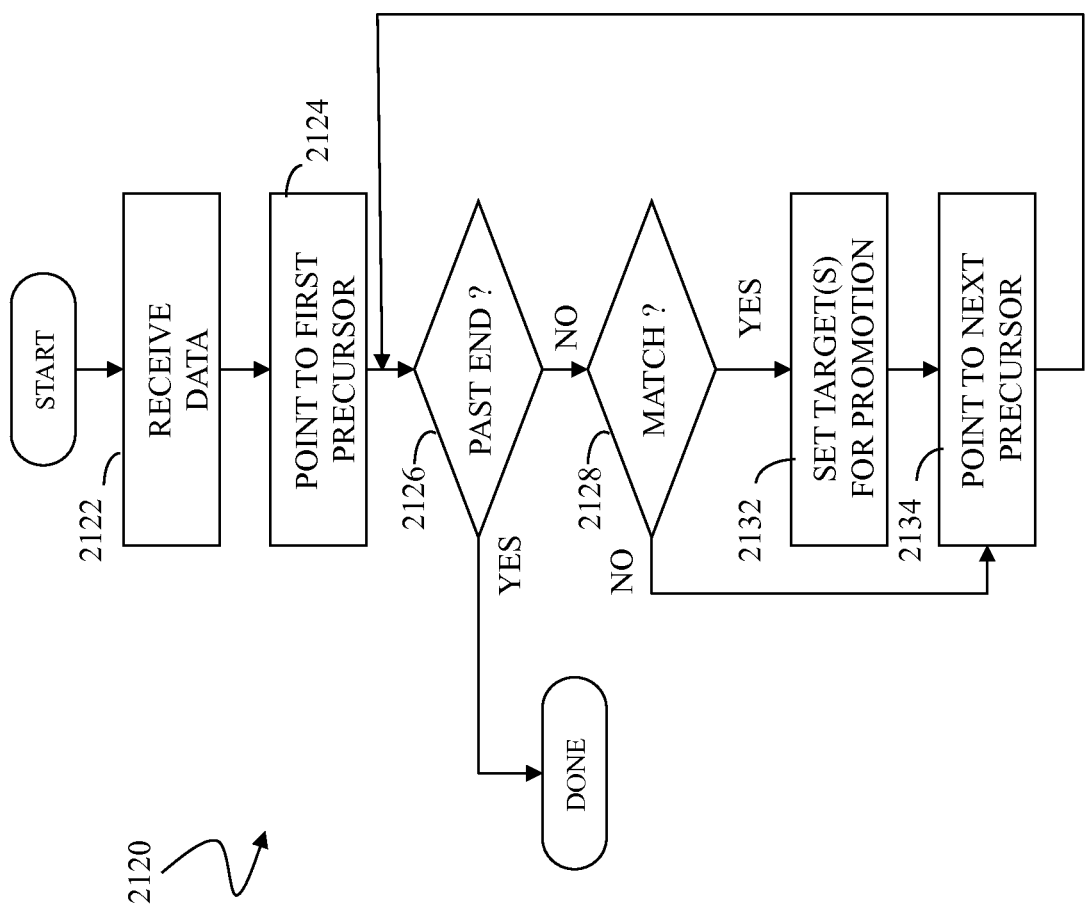
FIG. 41 is a flowchart illustrating processing performed in connection with precursors and targets according to an embodiment of the system described herein.

Referring to FIG. 41, a flowchart 2120 illustrates processing performed in connection with precursors and targets. Processing begins at a first step 2122 where access rate data is received. The access rate data corresponds to accesses for storage and could be per extent, per cluster, per LUN or group of LUNs, etc. Also, the access metric could be any appropriate metric, discussed elsewhere herein, such as read misses, writes, etc. Following the step 2122 is a step 2124 where an iteration counter, used to iterate through all of the precursors, is set to point to a first one of the precursors.

Following the step 2124 is a test step 2126 where it is determined if the iteration counter points past the end of a list of precursors (i.e., all of the precursors have been processed). If so, then processing is complete. Otherwise, control transfers from the test step 2126 to a test step 2128 where it is determined if the current precursor being processed (as indicated by the iteration counter) is a match for the data received at the step 2122. If so, then control transfers from the test step 2128 to a step 2132 where the target storage is scheduled for promotion. Note that there may be a time delay between when the observed data matches a precursor patters and when the target storage experiences increased activity. Scheduling the target storage for promotion at an appropriate time may take this into account. Following the step 2132 is a step 2134 where the iteration counter is incremented to point to a next precursor pattern. Note that the step 2134 is reached directly from the step 2128 if the observed data does not match the precursor being processed. Following the step 2134, control transfers back to the step 2126, discussed above, for another iteration.

As mentioned above, precursor storage and corresponding target storage may be defined externally based on knowledge of the system and data stored therein. However, it is also possible to automatically discover and maintain precursor storage and corresponding target storage. Note that precursor storage and corresponding target storage may be discovered by the system during operation or may be discovered by a separate computing device that uses data access information of the system to discover precursor/target relationships.

Discovering precursor/target relationships includes initially identifying candidate precursor storage for which historical access data is available. New recurring precursor rate profiles (described above) are then identified by considering each time in the past (at a sub-interval granularity) as a start time of a precursor interval and measuring how closely the observed access rates align with defined access rates of candidate precursor storage using, for example, the Euclidian distance measure mentioned above. How far back in the past to look depends on much historical data is available and whether relatively old data is relevant. Data beyond a certain age may have little value in some cases. In an embodiment of the system described herein, a month or two of historical data is used.

If no strong matches are found (i.e., the single number used to measure the match strength is below a pre-determined threshold), then no precursor/target relationships are created. If one or more strong matches are detected, then the matches are used to form a refined profile. In some cases, sub-intervals that vary significantly (per some threshold) between match instances are designated as noise and wild-carded in the precursor profile. At this point a precursor known to have had a few recent occurrences has been identified.

Following identifying one or more precursor(s), the system attempts to identify one or more prediction target(s) for which a strong prediction can be made based on the detected precursor(s). The prediction target(s) that are considered must be units of storage for which historical access rate data is available. Note that the precursor storage is a possible candidate for possible target storage. However, it is also possible to look at interesting events (such as a significant multi-hour increase in access rates) in one or more other unit(s) of storage that occur immediately following any past occurrences of a precursor. The other unit(s) of storage are possible prediction target(s).

Once a prediction target has been identified, the prediction for that target associated with the precursor can be determined. For each of past occurrence of the precursor, determine activity rates that the prediction target experienced immediately following the precursor. A similarity of the time between the precursor and the candidate target activity level may be determined in a manner similar to determining whether data matches a precursor profile (i.e., the square root of the sum of the squares of each of the sub-interval errors), except in the case of examining a potential precursor/target relationship, the comparison is of the workload activity for the target storage following different occurrences of the precursor. The length of a measurement interval for comparison may be adjusted and need not be the same the length as the precursor interval. The more closely a sequence of access rates experienced by the prediction target storage is across different recent occurrences of the precursor, the higher the confidence in the prediction.

The system described herein may use precursor storage and target storage that corresponds to individual extents of storage, clusters of extents, entire LUNs or groups of LUNs. Note that a possible to use clusters as described herein where cluster membership is updated only during the period of time following occurrences of a precursor. In some cases, this may allow more accurate extent level predictions for prediction targets that include many extents.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of forecasting workload activity for data stored on a data storage device, comprising:
    selecting at least one metric for measuring workload activity;
    grouping a plurality of portions of the data into at least one grouping of portions of the data according to a workload affinity determination provided for each of the portions for a subset of a plurality of time steps, wherein the workload affinity determination is based on a similarity of values determined for the metric for each of the data portions, including each of the data portions in the at least one grouping experiencing above-average workload activity relative to a reference level of workload activity for the respective data portion only, independent of workload activity levels of others of the plurality of data portions, during same ones of the subset of the plurality of time steps, the subset corresponding to at least one business cycle for accessing the data;
    for a first of the plurality of portions, for each time step of the subset of time steps:
        determining a first workload activity ratio indicative of a workload activity of the first portion during the time step relative to a reference level of workload activity for the first portion;
        determining a group workload activity ratio indicative of a workload activity of the at least one grouping collectively during the time step relative to a reference level of workload activity for the at least one grouping collectively;
        determining whether to adjust a first workload affinity determination of the first portion based at least in part on the first workload activity ratio and the group workload activity ratio; and
        if it is determined to adjust the first workload affinity determination, adjusting the first workload affinity determination; and
    forecasting workload activity for all of the portions of data in the at least one grouping based on forecasting workload activity for a subset of the data portions that is less than all of the data portions.

2. A method, according to claim 1, wherein the at least one business cycle for accessing the data corresponds to particular days of a week.

3. A method, according to claim 1, wherein the at least one business cycle for accessing the data corresponds to a pre-planned event.

4. A method, according to claim 1, wherein there are at least two business cycles and different groupings of data portions are maintained for each of the business cycles.

5. A method, according to claim 1, wherein the at least one metric is selected from a group consisting of: a read miss metric, a serial read metric, and a write metric.

6. A method, according to claim 1, wherein the at least one business cycle for accessing the data corresponds to detecting repeatable patterns in workload activity coherence of the at least one grouping of data.

7. A method, according to claim 6, wherein the workload activity coherence is based on a mean weighted activity ratio of each data portion and a weighted variance of activity ratios of the data portions at each time step, wherein weighting used for each particular one of the data portions is an activity workload for the particular one of the data portions at each time step.

8. A method, according to claim 1, wherein the workload affinity determination for each data portion is a time-weighted average.

9. A non-transitory computer readable medium containing software that forecasts workload activity for data stored on a data storage device, the software comprising:
    executable code that groups a plurality of portions of the data into at least one grouping of portions of the data according to a workload affinity determination provided for each of the portions for a subset of a plurality of time steps, wherein the workload affinity determination is based on a similarity of values determined for the metric for each of the data portions, including each of the data portions in the at least one grouping experiencing above-average workload activity relative to a reference level of workload activity for the respective data portion only, independent of workload activity levels of others of the plurality of data portions, during same ones of the subset of the plurality of time steps, the subset corresponding to at least one business cycle for accessing the data and wherein the workload activity is based on at least one metric selected for measuring workload activity;

executable code that, for a first of the plurality of portions, for each time step of the subset of time steps:
- determines a first workload activity ratio indicative of a workload activity of the first portion during the time step relative to a reference level of workload activity for the first portion;
- determines a group workload activity ratio indicative of a workload activity of the at least one grouping collectively during the time step relative to a reference level of workload activity for the at least one grouping collectively;
- determines whether to adjust a first workload affinity determination of the first portion based at least in part on the first workload activity ratio and the group workload activity ratio; and
- if it is determined to adjust the first workload affinity determination, adjusts the the first workload affinity determination; and executable code that forecasts workload activity for all of the portions of data in the at least one grouping based on forecasting workload activity for a subset of the data portions that is less than all of the data portions.

10. A non-transitory computer readable medium, according to claim 9, wherein the at least one business cycle for accessing the data corresponds to particular days of a week.

11. A non-transitory computer readable medium, according to claim 9, wherein the at least one business cycle for accessing the data corresponds to a pre-planned event.

12. A non-transitory computer readable medium, according to claim 9, wherein there are at least two business cycles and different groupings of data portions are maintained for each of the business cycles.

13. A non-transitory computer readable medium, according to claim 9, wherein the at least one metric is selected from a group consisting of: a read miss metric, a serial read metric, and a write metric.

14. A non-transitory computer readable medium, according to claim 9, wherein the at least one business cycle for accessing the data corresponds to detecting repeatable patterns in workload activity coherence of the at least one grouping of data.

15. A non-transitory computer readable medium, according to claim 14, wherein the workload activity coherence is based on a mean weighted activity ratio of each data portion and a weighted variance of activity ratios of the data portions at each time step, wherein weighting used for each particular one of the data portions is an activity workload for the particular one of the data portions at each time step.

16. A non-transitory computer readable medium, according to claim 9, wherein the workload affinity determination for each data portion is a time-weighted average.

* * * * *

UNITED STATES PATENT AND TRADEMARK OFFICE
CERTIFICATE OF CORRECTION

PATENT NO. : 10,671,431 B1
APPLICATION NO. : 14/496441
DATED : June 2, 2020
INVENTOR(S) : Sean C. Dolan et al.

Page 1 of 1

It is certified that error appears in the above-identified patent and that said Letters Patent is hereby corrected as shown below:

In the Claims

Column 77, Line 21, Claim 9, should read:
-- adjusts the first workload --

Signed and Sealed this
Twentieth Day of July, 2021

Drew Hirshfeld
*Performing the Functions and Duties of the
Under Secretary of Commerce for Intellectual Property and
Director of the United States Patent and Trademark Office*